United States Patent
Satyamurti et al.

(10) Patent No.: US 6,418,405 B1
(45) Date of Patent: Jul. 9, 2002

(54) METHOD AND APPARATUS FOR DYNAMIC SEGMENTATION OF A LOW BIT RATE DIGITAL VOICE MESSAGE

(75) Inventors: Sunil Satyamurti; Jian-Cheng Huang, both of Lake Worth; Floyd Simpson, Lantana; Kenneth Finlon, Wellington, all of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/410,140

(22) Filed: Sep. 30, 1999

(51) Int. Cl.[7] ............................................. G10L 19/00
(52) U.S. Cl. ........................ 704/206; 704/222; 704/230
(58) Field of Search ................................. 704/221, 222, 704/230, 200, 201, 223, 205, 206, 207

(56) References Cited

U.S. PATENT DOCUMENTS

| | | | | |
|---|---|---|---|---|
| 4,752,956 A | * | 6/1988 | Sluijter | 704/219 |
| 5,682,462 A | | 10/1997 | Huang et al. | |
| 5,751,903 A | * | 5/1998 | Swaminathan et al. | 704/230 |
| 5,790,978 A | * | 8/1998 | Olive et al. | 704/205 |
| 5,806,027 A | * | 9/1998 | George et al. | 704/230 |
| 6,154,499 A | * | 11/2000 | Bhaskar et al. | 704/200 |
| 6,161,086 A | * | 12/2000 | Mukherjee et al. | 704/222 |
| 6,260,010 B1 | * | 7/2001 | Gao et al. | 704/230 |
| 6,292,777 B1 | * | 9/2001 | Inoue et al. | 704/207 |
| 6,330,533 B2 | * | 12/2001 | Su et al. | 704/219 |

* cited by examiner

*Primary Examiner*—Marsha D. Banks-Harold
*Assistant Examiner*—Martin Lerner
(74) *Attorney, Agent, or Firm*—Randi L. Dulaney

(57) ABSTRACT

A system controller (106) includes a speech encoder (107) that dynamically segments frames of a low bit rate digital voice message. Speech model parameters have been generated in a sequence of frames. The speech model parameters include quantized speech spectral parameter vectors. The speech encoder selects (1820) a first quantized speech spectral parameter vector as a current anchor vector, selects (1820, 1830) a second quantized speech spectral parameter vector located a predetermined number of frames ($L_{MAX}$) from the current anchor vector as a target speech parameter vector, and perturbs (1840) the target speech parameter vector to derive a plurality (K) of perturbed speech parameter vectors.

17 Claims, 21 Drawing Sheets

METHOD AND APPARATUS FOR DYNAMIC SEGMENTATION OF A LOW BIT RATE DIGITAL VOICE MESSAGE

FIELD OF THE INVENTION

This invention relates generally to voice communication systems, and more specifically to a compressed voice digital communication system using a very low bit rate speech vocoder for voice messaging.

BACKGROUND OF THE INVENTION

Communications systems, such as paging systems, have had to compromise the length of messages, number of users and convenience to the user in order to operate the systems profitably. The number of users and the length of the messages have been limited to avoid over crowding of the channel and to avoid long transmission time delays. The user's convenience has thereby been directly affected by the channel capacity, the number of users on the channel, system features and type of messaging. In a paging system, tone only pagers that simply alerted the user to call a predetermined telephone number offered the highest channel capacity but were some what inconvenient to the users. Conventional analog voice pagers allowed the user to receive a more detailed message, but severally limited the number of users on a given channel. Analog voice pagers, being real time devices, also had the disadvantage of not providing the user with a way of storing and repeating the message received. The introduction of digital pagers with numeric and alphanumeric displays and memories overcame many of the problems associated with the older pagers. These digital pagers improved the message handling capacity of the paging channel, and provided the user with a way of storing messages for later review.

Although the digital pagers with numeric and alpha numeric displays offered many advantages, some user's still preferred pagers with voice announcements. In an attempt to provide this service over a limited capacity digital channel, various digital voice compression techniques and synthesis techniques have been tried, each with their own level of success and limitation. Voice compression methods, based on vocoder techniques, currently offer a highly promising technique for voice compression. Of the low data rate vocoders, the multi band excitation (MBE) vocoder is among the most natural sounding vocoder.

The vocoder analyzes short segments of speech, called speech frames, and characterizes the speech in terms of several parameters that are digitized and encoded for transmission. The speech characteristics that are typically analyzed include voicing characteristics, pitch, frame energy, and spectral characteristics. Vocoder synthesizers used these parameters to reconstruct the original speech by mimicking the human voice mechanism. Vocoder synthesizers modeled the human voice as an excitation source, controlled by the pitch and frame energy parameters followed by a spectrum shaping controlled by the spectral parameters.

The voicing characteristic identifies the repetitiveness of the speech waveform within a frame. Speech consists of periods where the speech waveform has a repetitive nature and periods where no repetitive characteristics can be detected. The periods where the waveform has a periodic repetitive characteristic are said to be voiced. Periods where the waveform seems to have a totally random characteristic are said to be unvoiced. The voiced/unvoiced characteristics are used by the vocoder speech synthesizer to determine the type of excitation signal which will be used to reproduce that segment of speech. Due to the complexity and irregularities of human speech production, no single parameter can determine in a fully reliable manner when a speech frame is voiced or unvoiced.

Pitch is the fundamental frequency of the repetitive portion of the voiced wave form. Pitch is typically measured in terms of the time period of the repetitive segments of the voiced portion of the speech wave forms. The speech waveform is a highly complex waveform and very rich in harmonics. The complexity of the speech waveform makes it very difficult to extract pitch information. Changes in pitch frequency must be smoothly tracked for an MBE vocoder synthesizer to smoothly reconstruct the original speech. Most vocoders employ a time-domain auto-correlation function to perform pitch detection and tracking. Auto-correlation is a very computationally intensive and time consuming process. It has also been observed that conventional auto-correlation methods are unreliable when used with speech derived from a telephone network. The frequency response of the telephone network (300 Hz to 3400 Hz) causes deep attenuation to the low frequencies of a speech signal that has a low pitch frequency (the range of the fundamental pitch frequency of the human voice is 50 Hz to 400 Hz). Because of the deep attenuation of the fundamental frequency, pitch trackers can erroneously identify the second or third harmonic as the fundamental frequency. The human auditory process is very sensitive to changes in pitch and the perceived quality of the reconstructed speech is strongly effected by the accuracy of the pitch derived, so when a pitch tracker erroneously identifies the second or third harmonic as the fundamental frequency, the synthesized signal can be misunderstood.

Frame energy is a measure of the normalized average RMS power of the speech frame. This parameter defines the loudness of the speech during the speech frame.

The spectral characteristics define the relative amplitude of the harmonics and the fundamental pitch frequency during the voiced portions of speech and the relative spectral shape of the noise-like unvoiced speech segments. The data transmitted defines the spectral characteristics of the reconstructed speech signal. Non optimum spectral shaping results in poor reconstruction of the voice by an MBE vocoder synthesizer and poor noise suppression.

The human voice, during a voiced period, has portions of the spectrum that are voiced and portions that are unvoiced. MBE vocoders produce natural sounding voice because the excitation source, during a voiced period, is a mixture of voiced and unvoiced frequency bands. The speech spectrum is divided into a number of frequency bands and a determination is made for each band as to the voiced/unvoiced nature of each band. The MBE speech synthesizer generates an additional set of data to control the excitation of the voiced speech frames. In conventional MBE vocoders, the band voiced/unvoiced decision metric is pitch dependent and computationally intensive. Errors in pitch will lead to errors in the band voiced/unvoiced decision that will affect the synthesized speech quality. Transmission of the band voiced/unvoiced data also substantially increases the quantity of data that must be transmitted.

Conventional MBE synthesizers require information on the phase relationship of the harmonic of the pitch signal to accurately reproduce speech. Transmission of phase information further increases the data required to be transmitted.

Conventional MBE synthesizers can generate natural sounding speech at a data rate of 2400 to 6400 bit per second. MBE synthesizers are being used in a number of commercial mobile communications systems, such as the INMARSAT (International Marine Satellite Organization) and the ASTRO™ portable transceiver manufactured by Motorola Inc. of Schaumburg, Ill. The standard MBE vocoder compression methods, currently used very successfully by two way radios, fail to provide the degree of compression required for use on a paging channel. Voice messages that are digitally encoded using the current state of the art would monopolize such a large portion of the paging channel capacity that they may render the system commercially unsuccessful.

Accordingly, what is needed for optimal utilization of a channel in a communication system, such as a paging channel in a paging system or a data channel in a non-real time one way or two way data communications system, is an apparatus that simply and accurately determines the voiced and unvoiced portions of speech, accurately determines and tracks the fundamental pitch frequency when the frequency spectrum of the fundamental pitch components is severely attenuated, and significantly reduces the amount of data necessary for the transmission of the voiced/unvoiced band information. Also what is needed is a method or apparatus that digitally encodes voice messages in such a way that the resulting data is very highly compressed while maintaining acceptable speech quality and can be mixed with the normal data sent over the communication channel.

DESCRIPTION OF A PREFERRED EMBODIMENT

1. Communication System

Figure 1:
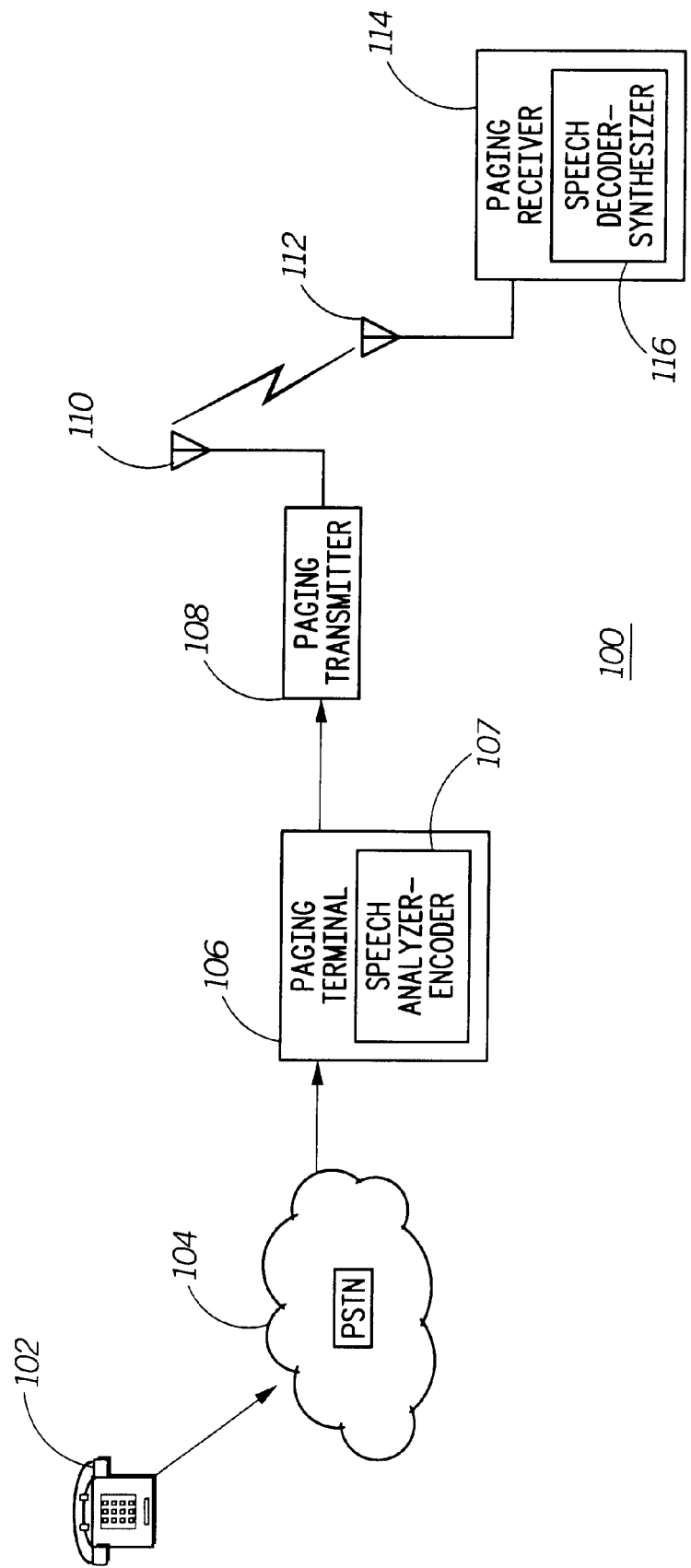
FIG. 1 is an electrical block diagram showing a communication system, in accordance with the preferred embodiment of the present invention.

FIG. 1 shows a block diagram of a communications system, such as a paging or data transmission system, utilizing very low bit rate speech vocoding for voice messaging in accordance with the present invention. As will be described in detail below, the paging terminal 106 uses a unique multi-band excitation (MBE) speech analyzer-encoder 107 (which is alternativey referred to as simply a speech encoder 107, or encoder 107) to generate excitation parameters and spectral parameters in quantized or un-quantized form, hereafter called speech model parameters, or more simply, model parameters, that represent the speech data. A communication receiver 114, such as a paging receiver uses a unique MBE based speech decoder-synthesizer 116 (which is alternatively referred to as simply a speech decoder 116 or decoder 116) to reproduce the original speech.

By way of example, a paging system will be utilized to describe the present invention, although it will be appreciated that other digital voice communication or voice storage system will benefit from the present invention as well. A paging system is designed to provide service to a variety of users, each requiring different services. Some of the users may require numeric messaging services, other users alphanumeric messaging services, and still other users may require voice messaging services. In a paging system, the caller originates a page by communicating with a paging terminal 106 via a telephone 102 through a public switched telephone network (PSTN) 104. The paging terminal 106 prompts the caller for the recipient's identification, and a message to be sent. Upon receiving the required information, the paging terminal 106 returns a prompt indicating that the message has been received by the paging terminal 106. The paging terminal 106 encodes the message and places the encoded message into a transmission queue. In the case of a voice message the paging terminal 106 compresses and encodes the message using the speech analyzer-encoder 107. At an appropriate time, the message is transmitted using a radio frequency transmitter 108 and transmitting antenna 110. It will be appreciated that in a simulcast transmission system, a multiplicity of transmitters covering different geographic areas can be utilized as well.

The signal transmitted from the transmitting antenna 110 is intercepted by a receiving antenna 112 and processed by a communication receiver 114, shown in FIG. 1 as a paging receiver, although it will be appreciated that other communication receivers can be utilized as well. Voice messages received are decoded and reconstructed using an MBE based speech decoder-synthesizer 116. The person being paged is alerted and the message is displayed or annunciated depending on the type of messaging being employed.

The digital voice encoding and decoding process used by the speech analyzer-encoder 107 and the MBE based decoder-synthesizer 116, is readily adapted to the non-real time nature of paging, and any non-real time digital communications system, and is also sufficiently efficient to be also used with some modifications in certain real time systems. Non-real time digital communication systems provide time to perform the significant computational compression process on the voice message as described herein, using a processor of modest cost today. Delays of up to two minutes can be reasonably tolerated in paging systems, whereas delays of two seconds are unacceptable in real time communication systems. The asymmetric nature of the digital voice compression process described herein minimizes the processing required to be performed at the communication receiver 114, making the process ideal for paging applications and other similar non-real time digital voice communications. The highly computational portion of the digital voice compression process is typically performed in the fixed portion of the system, i.e. at the paging terminal 106. The voice analyzer-encoding process is efficient enough to be accomplished by processing power that is available in currently produced non-portable computers, but the process will undoubtedly become cost effective in a personal portable receivers (such as pagers) in due time. The asymmetric operation, together with the use of an MBE synthesizer that operates almost entirely in the frequency domain, greatly reduces the computation required to be performed in the decoder-synthesizer, and is thereby usable with processing power that is typical in currently produced personal portable receivers. The speech analyzer-encoder 107 can be included in the paging terminal 106 as a portion of a combined speech vocoder (not shown in FIG. 1) that performs both analysis-encoding and decoding-synthesis functions.

The speech encoder 107 analyzes the voice message and generates the speech model parameters (spectral parameters and excitation parameters), as described below. The speech encoder 107 is uniquely designed to transform the voice information into spectral information on a frame by frame basis and perform all the analyses on the transformed information. For a speech signal, most of its spectral information is present at multiples of a fundamental frequency defined as pitch. The spectral parameters generated include information describing the magnitude of harmonics of the speech signal that fall within the communication system's pass band. Pitch changes significantly from speaker to speaker and will change to a lesser extent while a speaker is talking. A speaker having a low pitch voice, such as a man, will have more harmonics than a speaker with a higher pitch voice, such as a woman. In a conventional MBE synthesizer the speech encoder 107 must derive the magnitude and phase information for each harmonic in order for the MBE synthesizer to accurately reproduce the voice message. The varying number of harmonics results in a variable quantity of data required to be transmitted. As will be described below, the present invention uses fixed dimension linear predictive (LP) analysis and a spectral code book to vector quantize the data into indexes for transmission. In the present invention the speech encoder 107 does not generate harmonic phase information as in prior art analyzers, but instead the MBE synthesizer in the decoder 116 uses a unique frequency domain technique to artificially regenerate phase information at the communication receiver 114. The frequency domain technique also reduces the quantity of computation performed by the decoder 116.

The excitation parameters include a pitch parameter, a root mean square (RMS) parameter (gain), and a frame voiced/unvoiced parameter. The frame voiced/unvoiced parameter describes the repetitive nature of the sound. Segments of speech that have a highly repetitive waveform are described as voiced, whereas segments of speech that have a random waveform are described as being unvoiced. The frame voiced/unvoiced parameter generated by the speech encoder 107 determines whether the decoder 116 uses a periodic signal as an excitation source or a noise like signal source as an excitation source. The present invention uses a highly accurate nonlinear classifier at the speech encoder 107 to determine the frame voiced/unvoiced parameter.

Frames, or segments of speech, that are classified as voiced often have spectral portions that are unvoiced. The speech encoder 107 and decoder 116 produce excellent quality speech by dividing the voice spectrum into four sub-bands and including information describing the voiced/unvoiced nature of the spectrum in each sub-band.

The pitch parameter defines the fundamental frequency of the repetitive portion of speech. Pitch has a dimension of frequency in the formulas given herein, and as such is the fundamental frequency of the speech being characterized, either for a short duration or a long duration. However, it is often characterized as the number of speech samples and thus sometimes referred to as a period. The human auditory function is very sensitive to pitch, and errors in pitch have a major impact on the perceived quality of the speech reproduced by the decoder-synthesizer 116. Communication systems, such as paging systems, that receive speech input via the telephone network have to detect pitch when the fundamental frequency component has been severely attenuated by the network. Conventional pitch detectors determine pitch information by use of a highly computational auto-correlation calculations in the time domain, and because of the loss of the fundamental frequency components, sometimes detect the second or third harmonic as the fundamental frequency. In the present invention, a unique method is employed to estimate the pitch, even when the fundamental frequency has been attenuated by the network. A frequency domain calculation is used to limit the search range of the auto-correlation function to a predetermined range, greatly reducing the auto-correlation calculations. Pitch information from past and future frames, and a limited auto-correlation search provide a robust pitch detector and tracker capable of detecting and tracking pitch under adverse conditions.

The gain parameter is a measurement of the total energy of all the harmonics in a frame. The gain parameter is generated by the speech analyzer-encoder 107 and is used by the decoder-synthesizer 116 to establish the volume of the reproduced speech on a frame by frame basis.

2. Paging Terminal and RF Transmitter

Figure 2:
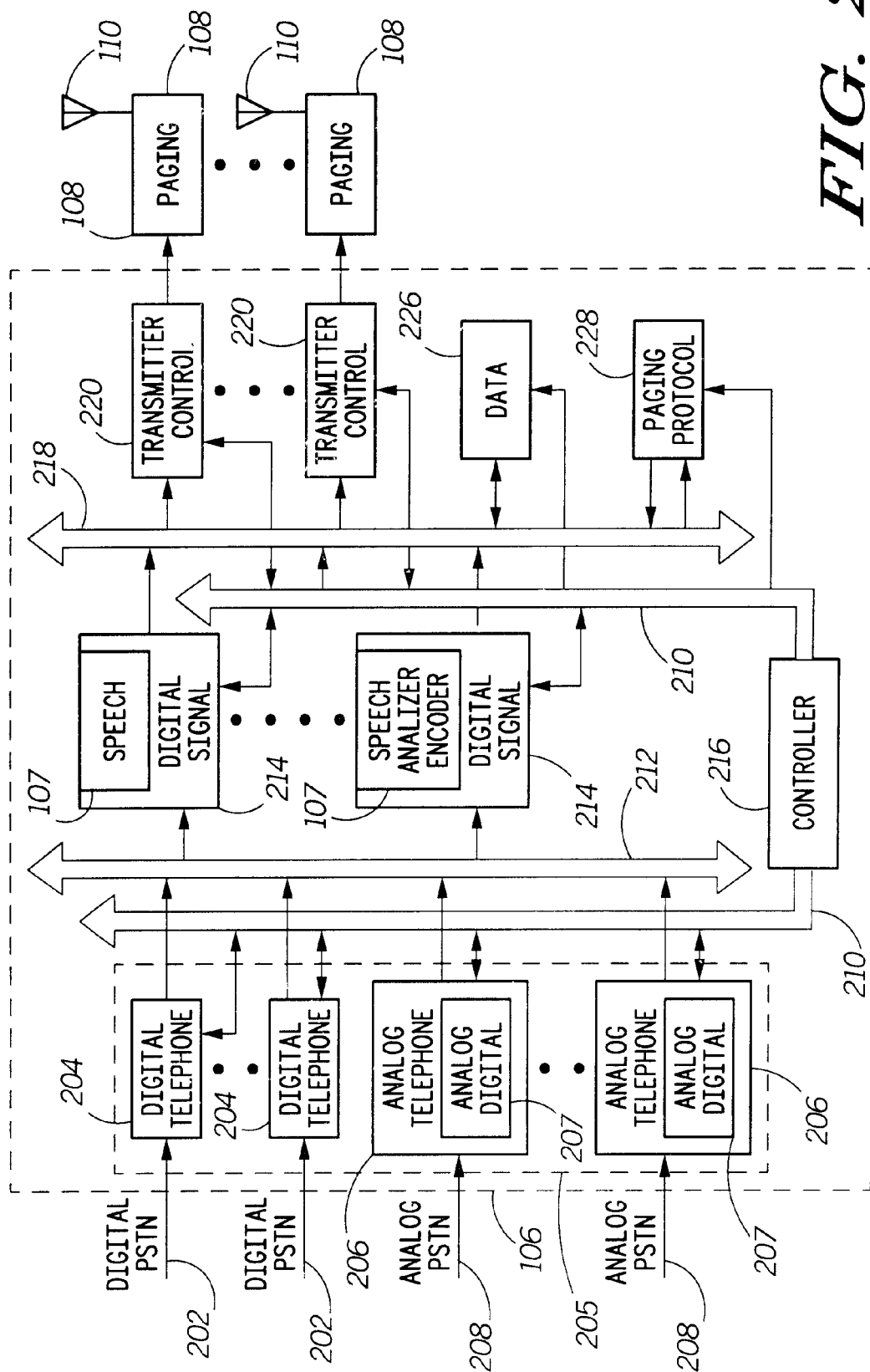
FIG. 2 is an electrical block diagram showing a paging terminal used in the communication system, in accordance with the preferred embodiment of the present invention.

An electrical block diagram of the paging terminal 106 and the radio frequency transmitter 108 utilizing the digital voice compression process in accordance with the present invention is shown in FIG. 2. The paging terminal 106 shown is of a type that would be used to serve a large number of simultaneous users, such as in a commercial Radio Common Carrier (RCC) system. The paging terminal 106 utilizes a number of input devices, signal processing devices and output devices controlled by a controller 216. Communication between the controller 216 and the various devices that make up the paging terminal 106 are handled by a digital control bus 210. Distribution of digitized voice and data is handled by an input time division multiplexed highway 212 and an output time division multiplexed highway 218. It will be appreciated that the digital control bus 210, input time division multiplexed highway 212 and output time division multiplexed highway 218 can be extended to provide for expansion of the paging terminal 106.

An input speech processor section 205 provides the interface between the PSTN 104 and the paging terminal 106. The PSTN connections can be either a plurality of multi-call per line multiplexed digital connections shown in FIG. 2 as a digital PSTN connection 202 or plurality of single call per line analog connections shown in FIG. 2 as an analog PSTN connection 208.

Each digital PSTN connection 202 is serviced by a digital telephone interface 204. The digital telephone interface 204 provides the necessary signal conditioning, synchronization, de-multiplexing, signaling, supervision, and regulatory protection requirements for operation of the digital voice compression process in accordance with the present invention. The digital telephone interface 204 can also provide temporary storage of the digitized voice frames to facilitate interchange of time slots and time slot alignment necessary to provide an access to the input time division multiplexed highway 212. As will be described below, requests for service and supervisory responses are controlled by the controller 216. Communication between the digital telephone interface 204 and the controller 216 passes over the digital control bus 210.

Each analog PSTN connection 208 is serviced by an analog telephone interface 206. The analog telephone interface 206 provides the necessary signal conditioning, signaling, supervision, analog to digital and digital to analog conversion, and regulatory protection requirements for operation of the digital voice compression process in accordance with the present invention. The frames, or segments of speech, digitized by the analog to digital converter 207 are temporarily stored in the analog telephone interface 206 to facilitate interchange of time slots and time slot alignment necessary to provide an access to the input time division multiplexed highway 212. As will be described below, requests for service and supervisory responses are controlled by a controller 216. Communication between the analog telephone interface 206 and the controller 216 passes over the digital control bus 210.

When an incoming call is detected, a request for service is sent from the analog telephone interface 206 or the digital telephone interface 204 to the controller 216. The controller 216 selects a digital signal processor (DSP) 214 from a plurality of DSPs. The controller 216 couples the analog telephone interface 206 or the digital telephone interface 204 requesting service to the DSP 214 selected via the input time division multiplexed highway 212.

The DSP 214 can be programmed to perform all of the signal processing functions required to complete the paging process, including the function of the speech analyzer-encoder encoder 107. Typical signal processing functions performed by the DSP 214 include digital voice compression using the speech analyzer-encoder 107 in accordance with the present invention, dual tone multi frequency (DTMF) decoding and generation, modem tone generation and decoding, and pre-recorded voice prompt generation. The DSP 214 can be programmed to perform one or more of the functions described above. In the case of a DSP 214 that is programmed to perform more then one task, the controller 216 assigns the particular task needed to be performed at the time the DSP 214 is selected, or in the case of a DSP 214 that is programmed to perform only a single task, the controller 216 selects a DSP 214 programmed to perform the particular function needed to complete the next step in the process. The operation of the DSP 214 performing dual tone multi frequency (DTMF) decoding and generation, modem tone generation and decoding, and pre-recorded voice prompt generation is well known to one of ordinary skill in the art. The operation of the DSP 214 performing the function of speech analyzer-encoder 107 in accordance with the present invention is described in detail below.

In the descriptions of the present invention referenced to FIGS. 3–32 and FIG. 35, some operations of the DSP 214 are described as steps, functions or processes. It will be recognized by one of ordinary skill in the art that the steps, functions, or processes described in FIGS. 3–32 and FIG. 35 represent steps of a method, functions, or processes performed by electrical hardware that, in general, comprises a segment of program instructions, uniquely arranged to accomplish the steps, functions, or processes that typically are permanently stored as sets of binary states in a conventional bulk memory, such as a hard disk, and copied as necessary to conventional temporary memory locations, such as locations in fast read write parallel access memory, and also comprises a conventional central processing unit (CPU), conventional input/output logic, and other conventional processing functions of the DSP that are controlled by the segment of program instructions. The processing functions of the DSP generate and manipulate data words stored in random access memory and/or bulk memory. It will be further appreciated that the central processing unit could replaced by a standard multi-purpose processor having appropriate peripheral circuits. Thus, each step, function or process described herein with reference to the speech analyzer-encoder 107 can alternatively be described as an apparatus that is a combination of at least a central processing unit and a memory, wherein the central processing unit is coupled to the memory and is controlled by programming instructions in the memory to perform the step, function, or process.

It will be further appreciated that the paging terminal is representative of system controllers of other types of communication systems in which the analyzer-encoder 107 described herein in accordance with the preferred embodiment of the present invention could be used for analyzing, encoding, and transferring low bit rate digital voice messages.

The processing of a page request, in the case of a voice message, proceeds in the following manner. The DSP 214 that is coupled to an analog telephone interface 206 or a digital telephone interface 204 then prompts the originator for a voice message. The DSP 214 compresses the voice message received using a process described below. The compressed digital voice message generated by the compression process is coupled to a paging protocol encoder 228, via the output time division multiplexed highway 218, under the control of the controller 216. The paging protocol encoder 228 encodes the data into a suitable paging protocol. One such encoding method is the inFLEXion™ protocol, developed by Motorola Inc. of Schaumburg, Ill., although it will be appreciated that there are many other suitable encoding methods that can be utilized as well, for example the Post Office Code Standards Advisory Group (POCSAG) code. The controller 216 directs the paging protocol encoder 228 to store the encoded data in a data storage device 226 via the output time division multiplexed highway 218. At an appropriate time, the encoded data is downloaded into the transmitter control unit 220, under control of the controller 216, via the output time division multiplexed highway 218 and transmitted using the radio frequency transmitter 108 and the transmitting antenna 110.

In the case of numeric messaging, the processing of a page request proceeds in a manner similar to the voice message with the exception of the process performed by the DSP 214. The DSP 214 prompts the originator for a DTMF message. The DSP 214 decodes the DTMF signal received and generates a digital message. The digital message generated by the DSP 214 is handled in the same way as the digital voice message generated by the DSP 214 in the voice messaging case.

The processing of an alpha-numeric page proceeds in a manner similar to the voice message with the exception of the process performed by the DSP 214. The DSP 214 is programmed to decode and generate modem tones. The DSP 214 interfaces with the originator using one of the standard user interface protocols such as the Page Entry Terminal (PET™) protocol. It will be appreciated that other communications protocols can be utilized as well. The digital message generated by the DSP 214 is handled in the same way as the digital voice message generated by the DSP 214 in the voice messaging case.

3. System Operation

Figure 3:
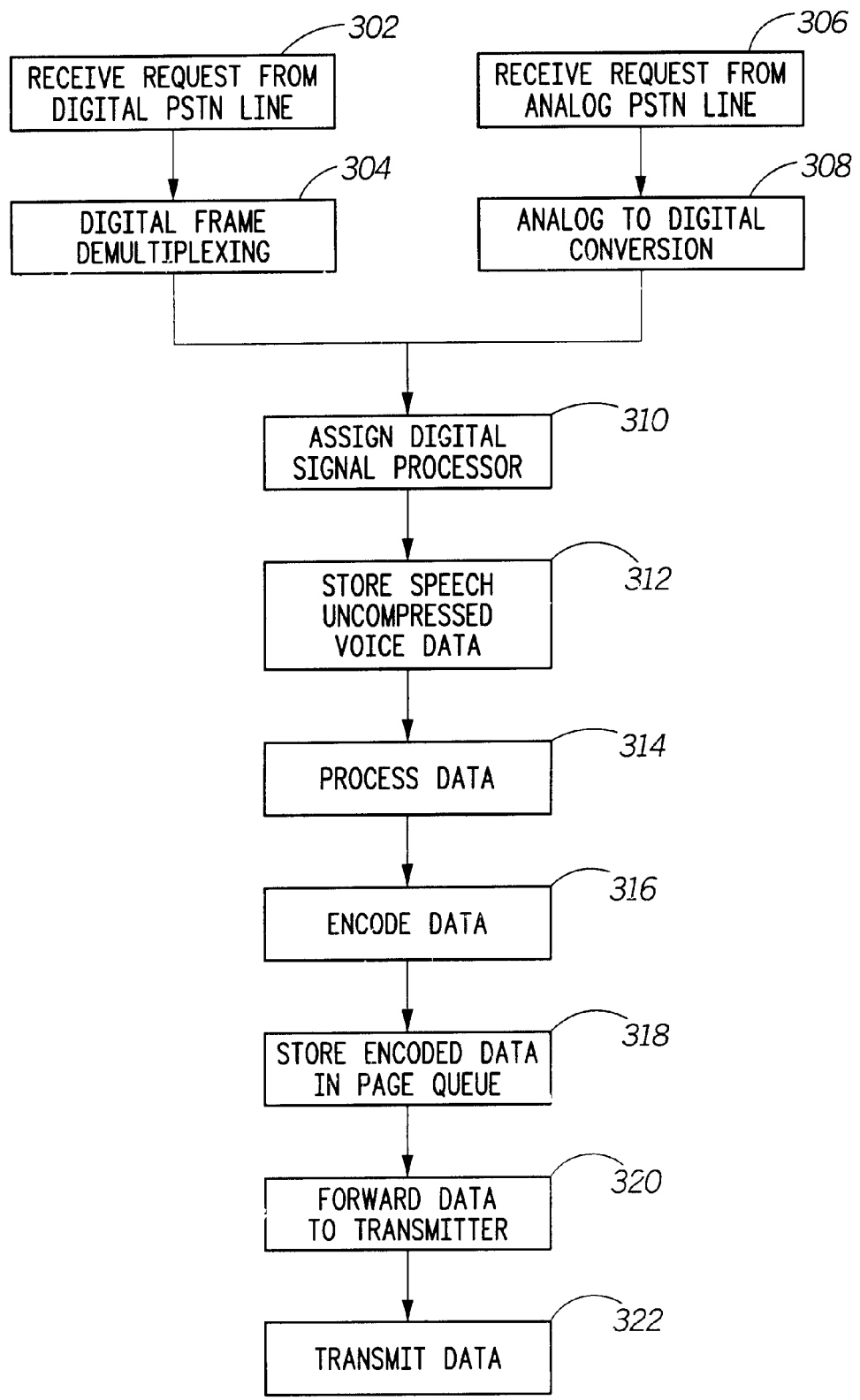
FIG. 3 is a flow chart showing the operation of the paging terminal, in accordance with the preferred embodiment of the present invention.

FIG. 3 is a flow chart which describes the operation of the paging terminal 106 and the speech analyzer-encoder 107 shown in FIG. 2 when processing a voice message. There are shown two entry points into the process 300. The first entry point is for a process associated with the digital PSTN connection 202 and the second entry point is for a process associated with the analog PSTN connection 208. In the case of the digital PSTN connection 202, the process starts with step 302, receiving a request over a digital PSTN line.

Requests for service from the digital PSTN connection 202 are indicated by a bit pattern in the incoming data stream. The digital telephone interface 204 receives the request for service and communicates the request to the controller 216.

In step 304, information received from the digital channel requesting service is separated from the incoming data stream by digital frame de-multiplexing. The digital signal received from the digital PSTN connection 202 typically includes a plurality of digital channels multiplexed into an incoming data stream. The digital channel requesting service is de-multiplexed and the digitized speech data, which preferably comprises 16 bit samples representing an analog value of a voice message taken at 8,000 samples per second, is then stored temporarily to facilitate time slot alignment and multiplexing of the data onto the input time division multiplexed highway 212. A time slot for the digitized speech data on the input time division multiplexed highway 212 is assigned by the controller 216. Conversely, digitized speech data generated by the DSP 214 for transmission to the digital PSTN connection 202 is formatted suitably for transmission and multiplexed into the outgoing data stream.

For the analog PSTN connection 208, the process starts with step 306 when a request from the analog PSTN line is received. On the analog PSTN connection 208, incoming calls are signaled by either low frequency AC signals or by DC signaling. The analog telephone interface 206 receives the request and communicates the request to the controller 216.

In step 308, the analog voice message is converted into a digital data stream by the analog to digital converter 207 which functions as a sampler for generating voice message samples and a digitizer for digitizing the voice message samples. The analog signal received over its total duration is referred to as the analog voice message. The analog signal is sampled, generating voice samples, preferably at a rate of 8,000 samples per second, and then digitized, preferably using a quantization level of 16, generating digitized input speech samples, by the analog to digital converter 207. The samples of the analog signal are referred to as input speech samples. The digitized speech samples are referred to as digital speech data, and are preferably quantized with a precision of at least sixteen bits. The digital speech data is multiplexed onto the input time division multiplexed highway 212 in a time slot assigned by the controller 216. Conversely any voice data on the input time division multiplexed highway 212 that originates from the DSP 214 undergoes a digital to analog conversion before transmission to the analog PSTN connection 208.

As shown in FIG. 3, the processing path for the analog PSTN connection 208 and the digital PSTN connection 202 converge in step 310, when a DSP is assigned to handle the incoming call. The controller 216 selects a DSP 214 programmed to perform the digital voice compression process. The DSP 214 assigned reads the data on the input time division multiplexed highway 212 in the previously assigned time slot.

The data read by the DSP 214, is stored as frames, or segments, of uncompressed speech data into a read write memory, such as random access memory (RAM) or disk memory, for subsequent processing, in step 312. The stored uncompressed speech data is processed by the speech analyzer-encoder 107 at step 314, which will be described in detail below. The compressed voice data derived from the speech analyzer-encoder 107 at step 314 is encoded suitably for transmission over a paging channel, in step 316. In step 318, the encoded data is stored in a paging queue for later transmission. At the appropriate time the queued data is sent to the radio frequency transmitter 108 at step 320 and transmitted, at step 322.

4. Voice Encoder

Figure 4:
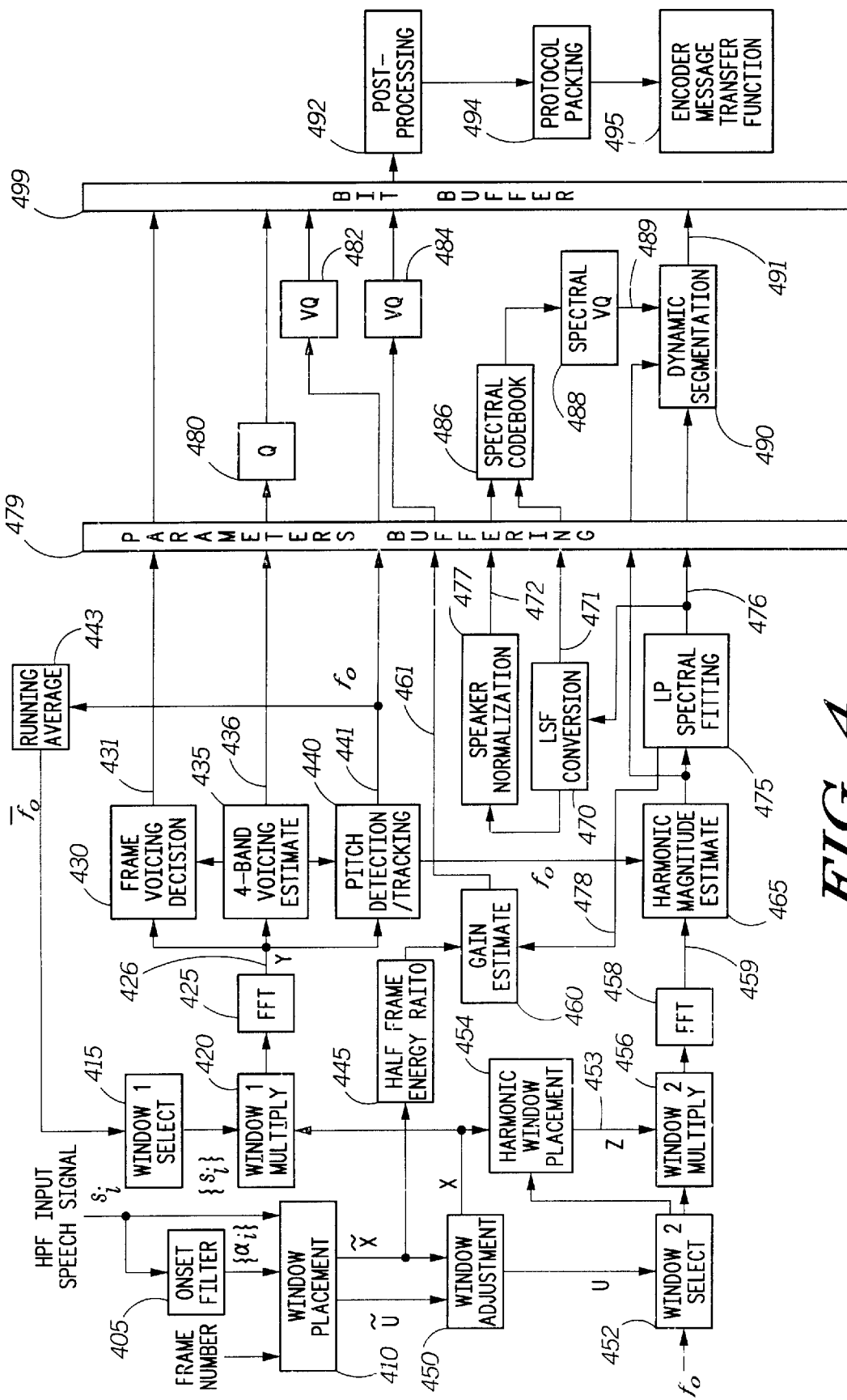
FIG. 4 is a functional block diagram of processing performed by a speech analyzer-encoder of the paging terminal, in accordance with the preferred embodiment of the present invention.

Referring to FIG. 4, a functional block diagram of an overview of the processing performed by the speech analyzer-encoder 107 at step 314 is shown, in accordance with the preferred embodiment of the present invention. As stated above, the incoming speech signal is in a digital format. A sampling rate of $f_s$=8000 samples/second is preferably used. The digital samples are preferably scaled such that the minimum and maximum sample values are in the range [−32768, 32767]. Additionally, any non-linear companding which is introduced by the sampling process (such as a-law or u-law) is removed prior to coupling the speech signal samples, identified as $s_i$, to the speech analyzer-encoder 107.

The speech analyzer-encoder 107 preferably provides three average bit-rates, herein named vocoding rates 1, 2, and 3, although more or fewer could be used in alternative embodiments. Vocoding rate 1 encoding provides the lowest number of bits per second of speech and provides the lowest quality encoding, and vocoding rate 3 encoding provides the highest number of bits per second of speech and the highest quality. Vocoding rate 1 is designed to provide a message that is understandable in a relatively benign environment, while vocoder rate 3 encoded message is understandable in harsher conditions (such as higher error rates and/or higher ambient noise conditions). In a typical voice message, the average bit rates for vocoding rates 1, 2, and 3 are approximately 627 bits per second (bps), 1010 bps, and 1183 bps, respectively, when all the features of non-speech activity reduction described herein in accordance with the preferred embodiment of the present invention are implemented. The speech signal is analyzed to determine unquantized speech model parameters that represent analog values of speech parameters, which are quantized appropriately, depending on the required average bit rate, and the quantized speech model parameters are encoded and packed into a voice protocol bit-stream for transmission or storage.

The model parameters used in the speech analyzer-encoder 107 are the typical MBE model parameters of pitch, frame voicing, band voicing, and spectral harmonic magnitudes. In the speech analyzer-encoder 107, spectral harmonic magnitudes are represented by 10 line spectral frequencies (LSFs), a gain, and harmonic residues. Depending on the speech analyzer-encoder 107 bit-rate, these parameters may or may not be computed and encoded for every frame.

The samples of the input speech signal are, in this example, stored as a file in disk, or as 16 bit data in memory. This input speech signal is first high-pass filtered using a single-pole filter to eliminate any low frequency hum. The high pass filtered (HPF) speech samples are then processed by an onset filter 405, to obtain corresponding onset decisions on a sample by sample basis. After this stage the speech samples are processed on a frame by frame basis by placing a window on the input high pass filtered sequence. After a frame of speech has been processed, the window placement is shifted by 200 samples on the sequence to process a new set of samples. A quantity of samples other than 200 can be used, consistent with other frame durations and processing capabilities.

The description of the processing flow can be broadly divided into two categories for better understanding. These two categories are, processing type and processing stage. Processing type describes the encoder from a computational aspect whereas processing stage describes the encoder from a functional aspect.

Processing type can be further divided into four broad categories, namely, modeling, encoding, post processing and protocol packing. Modeling can be described as the process of obtaining model parameters from the input speech on a frame by frame basis. Encoding is the process of quantizing the model parameters. Post processing eliminates excessive silence frames at the beginning, middle and end of the message. Finally protocol packing packs the quantized model parameters in an encoded protocol for transmission or storage.

The speech analyzer-encoder 107 functionality can be divided into five processing stages. Each processing stage includes one or more processing types. In the first stage, the encoder does parameter modeling, and buffers the model parameters. Some long term parameters that are required for encoding the message are determined here. This stage lasts for the first five seconds of the message. If the message is shorter than five seconds then the long term and model parameters for the entire message are buffered. During the second stage the buffered model parameters are encoded to generate a bit stream which is buffered. After the second stage of processing the entire parameter buffer can be erased. During the third stage, model parameters for any additional speech frames are generated and encoded directly from an input speech file. The fourth stage of processing is initiated after the bit stream for the entire message is buffered. This stage does post processing of the buffered bit stream. During the fifth stage, the post processed bit stream is packed according to the encoder protocol and transmitted.

The various processing types and processing stages are described below.

4.1.1. Parameter Modeling

The model parameters computed by the speech analyzer-encoder 107 can be classified into excitation parameters and spectral parameters. In FIG. 4, the processing blocks in the upper path 415–445 and 460 determine the excitation parameters and the processing blocks on the lower path 450–458 and 465–475 determine the spectral parameters. Prior to computation of the model parameters, the input speech signal is high pass filtered and a portion of the speech signal (an unshifted window) is chosen by using a Window Placement function 410.

The excitation parameters computed are pitch, frame voicing, band voicing parameter vector and gain. The pitch parameter refers to the fundamental frequency of the speech frame being analyzed. To compute these excitation parameters, each unshifted window is shifted, if necessary, by a Window Adjustment function 450 and then appropriately weighted in a Window 1 Multiply function 420 by a Kaiser window function selected by a Window 1 Select function 415, the selection being based on a long term pitch average (designated herein as $\bar{f}_0$). A Fast Fourier Transform (FFT) spectrum is computed by an FFT function 425, resulting in an FFT vector 426 representing the spectrum. The excitation model parameters are obtained from the FFT vector 426. A frame voicing parameter 431, determined by the Frame Voicing Decision function 430, identifies whether there is enough periodicity in each speech frame to indicate the presence of "voiced" speech. The spectrum represented by the FFT vector 426 of each speech frame is divided into four frequency bands and the degree of periodicity in the signal in each one of these bands is determined by a 4-Band Voicing Estimate function 435 and indicated by band voicing parameters 436. A running average of the fundamental frequency is computed by a Pitch Detection function 440 and is referred to as the pitch estimate 441, and identified herein as $f_0$. The gain parameter 461 is computed in a Gain Estimation process 460 for each speech frame by using an output of a Half Frame Energy Ratio function 445 and a frame gain parameter 478 that is obtained from computations involved in generating the spectral model parameters.

The spectral parameters are obtained as follows. An onset detection is computed by the Onset Filter function 405 for each sample and the window that has been shifted by the Window Adjustment function 450 is lengthened as necessary by a Harmonic Window Placement function 454 in response to a length determined by a Window 2 Select function 452. The length is determined from the pitch estimate 441, $f_o$, for the frame of speech and an onset window, u, determined from the onset parameters. The Window 2 Select function 452 generates a weighting function that is determined by the length of the window. The resulting window 453 is now appropriately weighted by the Window 2 Multiply function 456 prior to computation of a harmonic FFT spectrum 459 by a FFT function 458. The spectral parameters are obtained from this harmonic FFT spectrum 459 by first computing harmonic magnitudes in a Harmonic Magnitude Estimate function 465. Ten linear predictive coefficients (LPCS) 476 are then computed from the harmonic magnitudes using an LP Spectral Fitting function 475 and converted to line spectral frequency (LSF) vectors 471 by an LSF conversion function 470. The LSF vectors 471 from the first stage of processing are then used by a Speaker Normalization function 477 to generate a speaker normalization vector 472, which represents average characteristics of the speech samples during the first processing stage (approximately 5 seconds in this example of the present invention).

4.1.2. Parameter Encoding

Parameter encoding is a process performed by functions 480–490 that includes quantizing the model parameters to achieve the required vocoding rate. This is done by buffering 8 frames worth of parameters at a time in a parameter buffer 479. This process also includes dynamic segmentation of LSF vectors over several frames, which is used only for vocoding rates 1 and 2. Also, certain of the model parameters are quantized to different number of bits depending on whether vocoding rate 1, 2 or 3 is chosen. During every call to the parameter encoding process only one encoded LSF vector will be computed for buffering in a bit stream buffer 499. This is done because of a Dynamic Segmentation function 490, which will be described in detail later. After determining an encoded LSF vector 491, the parameter encoding process requests additional frames to fill the already processed frames of data from the parameter buffer during processing stage 2. After stage 2, when the parameter encoding process requests additional frames of parameters, frames of input speech are processed from the input speech file to provide necessary frames of parameters.

The pitch parameters are buffered for 4 frames and then vector quantized in a vector quantizing function 482. The gain parameters are buffered for either 2 (vocoder rates 2 and 3) or 4 frames (vocoder rate 1) and then vector quantized in a vector quantizing function 484. The quantized pitch and gain values are later dequantized during the spectral parameter quantization process. The quantization functions for the different parameters are described in more detail below. The frame voicing parameters are stored in the bit stream buffer 499 without any modification since they are already binary decisions. The 4 band voicing binary decisions are quantized based on the vocoding rate and stored in the bit stream buffer by a quantizing function 480 that uses a voicing codebook. If the vocoding rate is 1 then the $4^{th}$ band voicing decision is discarded before it is stored in the bit stream buffer 499. If the vocoding rate is 2 or 3 then all four band voicing decisions are stored in the bit stream buffer 499.

The spectral parameters represented by LSF vectors 471 for every frame vector are speaker normalized and then quantized using 22 bits in a Spectral Codebook function 486 and a Spectral Vector Quantization function 488. Once the LSF vectors 471 have been normalized and quantized, some of these quantized values, called encoded LSF vectors 491 are stored in the bit stream buffer 499 whereas the quantized values for some frames are discarded. This process of eliminating quantized LSF vectors 489 for some frames is performed by the Dynamic Segmentation process 490. This is done based on a distortion measure. The frames for which the quantized LSF vectors 489 are stored are referred to as anchor frames and the frames for which the quantized LSF vectors 489 are discarded are referred to as interpolated frames. A one bit flag is also stored in the bit stream buffer, for every frame, to indicate whether a frame is an anchor frame or is an interpolated frame. Even though the quantized LSF vectors 489 for some frames are discarded, an estimate of an LSF vector for the interpolated frames is also obtained. These quantized and interpolated LSFs are then sampled at the harmonic positions by using the quantized pitch parameter for that frame and then compared to the harmonic magnitudes originally obtained from the FFT in the logarithmic domain. The difference between these two vectors is referred to as the harmonic residue. The harmonic residue is computed only for vocoding rates 2 and 3. The harmonic residue vector is then vector quantized using 8 bits for vocoding rate 3 and vocoding rate 2 and stored in the bit stream buffer by the dynamic segmentation function 490.

4.1.3. Processing Stage 1

Processing stage 1 reads the input speech file one frame at a time, after an initial buffering delay, and does model parameter modeling on a frame by frame basis. No parameter encoding is done during this stage. The model parameters are buffered for up to 5 seconds worth of frames. If the length of the message is less than 5 seconds, all model parameters for the message are buffered. This initial buffering is done to compute some long term parameter estimates. Two long term parameters are computed: pitch average and spectral normalization vector. The spectral normalization vector is determined by computing the average of odd LSF values for all voiced frames.

4.1.4. Processing Stage 2

Processing stage 2 quantizes all the model parameters that have been buffered during stage 1 according to the vocoding rate and buffers the bits into the bit stream buffer. Once all the parameters from stage 1 have been encoded the stage 1 parameter buffer can be eliminated. This saves a lot of memory space during the following stages.

4.1.5. Processing Stage 3

During processing stage 3, only the 8 frame buffer required for segmentation needs to be maintained. During this stage, parameters are modeled and encoded as the frames of speech samples are read from the input speech file.

4.1.6. Processing Stage 4

This stage is performed after the quantized parameters for the entire speech message have been stored in the bit stream buffer 499 The bit stream is post processed by Post Processing function 492 to eliminate non-speech activity frames at the beginning, middle and end of the speech file.

4.1.7. Processing Stage 5

This is the final stage in the encoding process. The post processed bit stream is packed into a digital message protocol by a Protocol Packing function 494 and transferred to a communication receiver 114 according to a unique message transfer method that includes a Encoder Message Transfer function 495 in the speech analyzer-encoder and a Decoder Message Transfer function 3600 (FIG. 36) in the speech decoder-synthesizer 116 of the communications receiver 114.

4.2. Bit Allocation

The format of the speech encoding performed in stage 5 uses a relatively complex scheme with rate dependent, variable length data structures. To maximize compression efficiency, some model parameter data is not encoded for non-voice frames and some model parameter data is block coded. Block encoding means that certain parameters are calculated for groups of consecutive frames instead of for every frame, with the size of the groups determined by the vocoding rate. The coding scheme of any given frame is indicated within each frame by a combination of frame status bits and implicit counters. The following tables summarize the bit allocations used in a message encoded by the speech analyzer-encoder 107, in accordance with the preferred embodiment of the present invention, for a typical message, in which 40% of the frames are non-voice frames and 60% are voice frames. More detail about the speech encoding is given in section 5.11.1, Protocol Packing. Table 2 shows that the average vocoder bit rates without speech activity reduction are approximately 696, 1122, and 1314 bps for vocoder rates 1, 2, and 3 encoding, respectively, and approximately 627, 1010, and 1183 bps, respectively with non-speech activity reduction, for a typical voice message.

TABLE 1

Message header bit allocation.

| Header Parameter | Encoded Bits |
| --- | --- |
| Rate | 2 |
| Number of Frames | 12 |
| Number of Voiced Frames | 12 |
| Average Pitch | 7 |
| Average LSF | 25 |
| CRCs* | 24 |

*Although the second CRC is not in the header, it is counted here because it occurs only once per message.

TABLE 2

Average frame data bit allocation - Typical Message

| Frame Parameters | Rate 1 (Bits per Frame) | | Rate 2 (Bits per Frame) | | Rate 3 (Bits per Frame) | |
| --- | --- | --- | --- | --- | --- | --- |
| | Voiced Frames | Unvoiced Frames | Voiced Frames | Unvoiced Frames | Voice Frames | Unvoiced Frames |
| Frame Voicing | 1 | 1 | 1 | 1 | 1 | 1 |
| Interpolation | 1 | 1 | 1 | 1 | 0 | 0 |
| Line Spectral Frequency Vectors | 11 | 6 | 14.33 | 6 | 22 | 9 |
| Gain | 3.25 | 3.25 | 6.5 | 6.5 | 6.5 | 6.5 |
| Band Voicing | 2 | 0 | 3 | 0 | 3 | 0 |
| Pitch | 3.25 | 0 | 3.25 | 0 | 3.25 | 0 |
| Harmonic Residue Vector | 0 | 0 | 8 | 0 | 8 | 0 |
| Average bits per frame | 21.5 | 11.25 | 37.08 | 14.5 | 43.75 | 16.5 |
| Average bits per frame (combined) | 17.4 | | 28.048 | | 32.85 | |
| Average bit rate (bps) - no non-speech activity reduction | 696 | | 1122 | | 1314 | |
| Average bit rate (bps) - with non-speech activity reduction | 627 | | 1010 | | 1183 | |

5. Functional Description of the Encoder 5.1. Preprocessing

The digital input speech signal is first high-pass filtered to remove any D.C. components before doing any parameter estimation. This is accomplished by passing the input speech signal through a high-pass filter (not shown in FIG. 4) with the following transfer function:

$$H(z) = \frac{1 - z^{-1}}{1 - 0.99z^{-1}}$$

Figure 5:
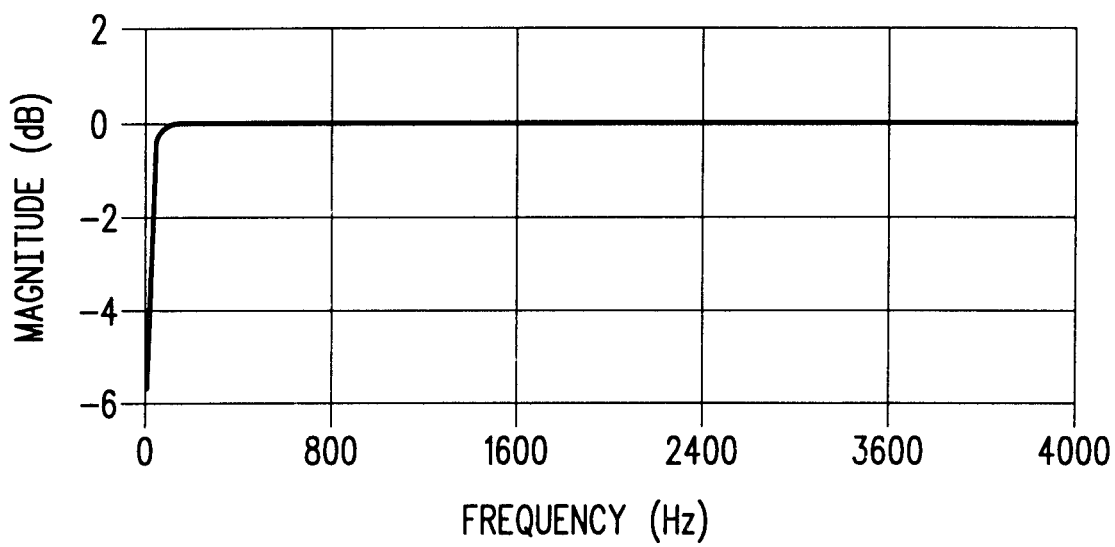
FIGS. 5 and 6 are, respectively, a gain and a phase plot of a high pass filter used in the speech analyzer-encoder, in accordance with the preferred embodiment of the present invention.
Figure 6:
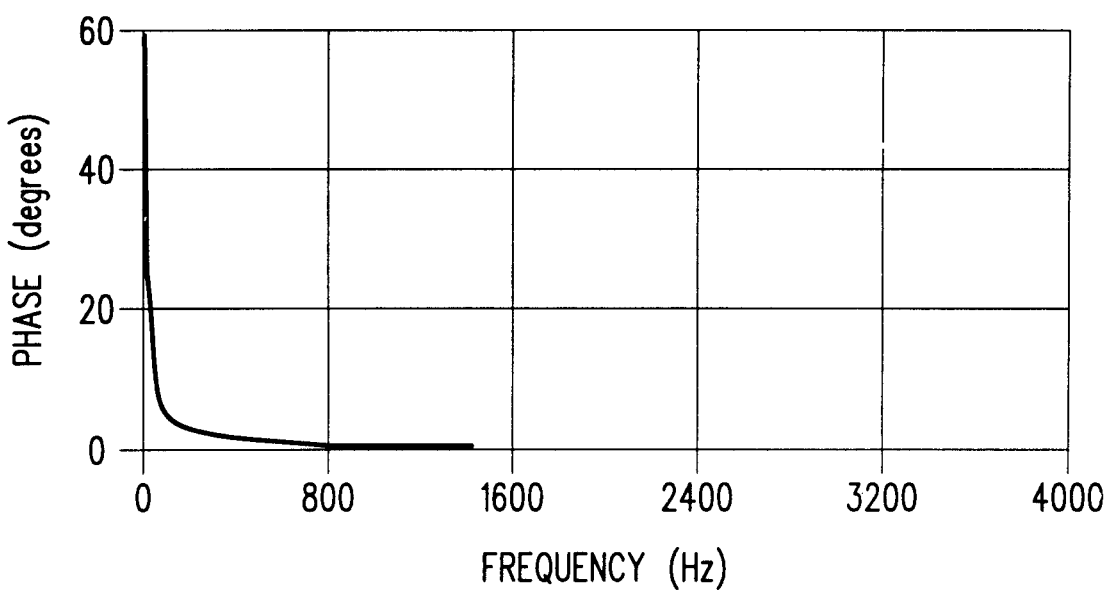

Gain and phase plots of the high pass filter, using an 8 kHz sampling rate, are shown in FIGS. 5 and 6, respectively, in accordance with the preferred embodiment of the present invention. Data samples generated by the high pass filter speech signal are hereafter denoted by $s_i$.

5.2. Framing and Windowing

Framing and windowing are fundamental techniques used in analyzer-encoders. One underlying assumption of speech coding is that a typical speech signal is stationary over a short time period (on the order of 10–30 ms), and therefore the speech signal can be advantageously processed on an evolving short time period basis. Framing and windowing refer to methods used in analyzer-encoders wherein parametric analysis is done on an ordered sequence of individual short time segment of the speech signal. The speech analyzer-encoder 107 uses a framing and windowing process similar to that used in conventional analyzer-encoders, but adds a step to determine a possible adjustment to the location of the unadjusted windows found by the conventional method.

Figure 7:
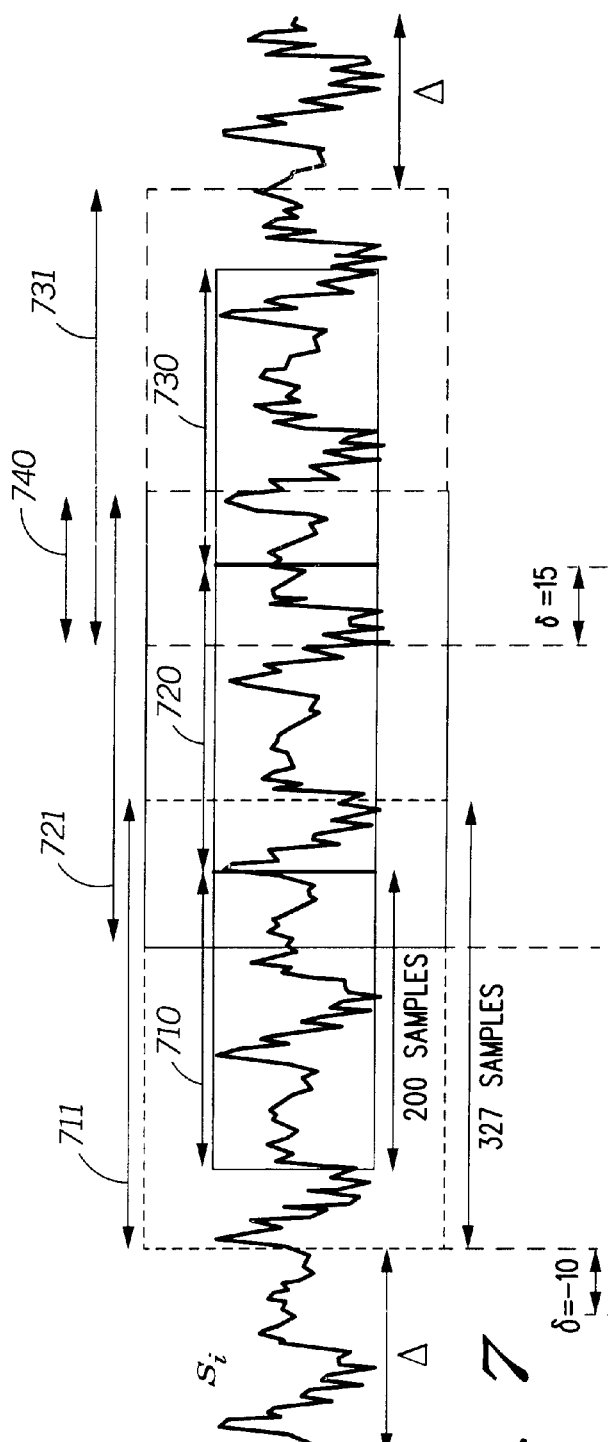
FIGS. 7 and 8 are timing diagrams that illustrate window placement and adjustment of voice samples received by the speech analyzer-encoder, in accordance with the preferred embodiment of the present invention.
Figure 8:
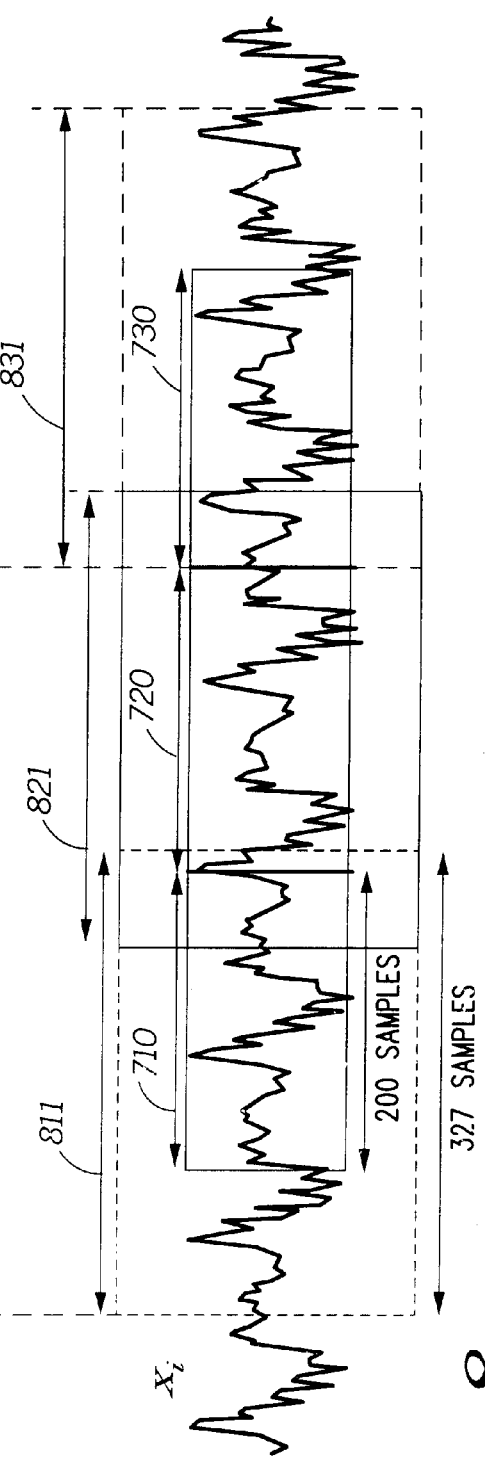

FIGS. 7 and 8 are timing diagrams that illustrate window placement and adjustment, in accordance with the preferred embodiment of the present invention. Individual short time segments of the speech signal are identified as either windows or frames. A frame or a window is a set of consecutive speech signal samples defined by its duration (i.e., quantity of samples) and a frame sequence number, $\eta$. The distinctions between a frame and a window are that the window has a larger duration than the frame and that while there are no speech samples in common between adjacent frames, there are speech samples in common between adjacent windows. This is best understood by looking at FIG. 7, which shows a windowing placement in the speech analyzer-encoder 107 for frame sequence numbers 1, 2, and 3. Therein, the speech signal to be processed is represented as $\{s_i, i=0, \ldots 1^W-1\}$. The three frames 710, 720, 730, having frame sequence numbers 1, 2, and 3, are shown, along with corresponding unshifted windows 711, 721, 731. The duration of all frames, including frames 710, 720, 730, is $1^F$, and the nominal duration of all windows, including windows 711, 721, 731, is $1^W$. The values of $1^F$ and $1^W$ are 200 samples and 327 samples, respectively.

In general, a placement of an unshifted window, $\tilde{x}^{[\eta]}$, for the $\eta^{th}$ frame by the Window Placement function 410 is given by:

$$\tilde{x}_i^{[\eta]} = s_{\Delta+(\eta-1)l^W+i}, i=0, \ldots, l^W,$$

wherein $\tilde{x}_i$ represents one sample of an unshifted window, and wherein $\Delta$ is the number of samples immediately to the left of the beginning and to the right of the end of each unshifted analysis window. $\Delta$ is a predetermined number, for example 63, that determines the maximum number of samples available for possible adjustments to the location of the window.

$\{j: \Delta+(\eta-1)l^F \leq j \leq \Delta+(\eta-1)l^F+1^W\}$ defines the location of the $\eta^{th}$ unshifted window. For example, when $\Delta=63$ and the values of $1^F$ and $1^W$ are 200 and 327, then the location of the window having sequence number 2 is from 263 to 590. The location of the $\eta^{th}$ frame is defined to be the center $1^F$ samples of the $\eta^{th}$ unshifted window. Hence, there is an overlap region 740 between adjacent unshifted windows of $1^W-1^F$ samples. This overlapping of adjacent unshifted windows serves to reduce edge effects, such as spectral sidelobe leakage in a short time period spectral analysis.

In the speech analyzer-encoder 107, the location, or placement, of each unshifted window, $\tilde{x}$, is first generated by the Window Placement function 410 as described above. The location is then shifted by an amount $\delta$ that is computed by the Window Adjustment function 450 for each window. This window shift value is either positive, negative, or zero. A positive shift value shifts the location of the windows to the right, a negative window shift value shifts it to the left, and the zero window shift value corresponds to no window shift. The range of the window shift value is limited such that adjacent windows will always have an overlapping region.

The window shift value, $\delta$, for the $\eta^{th}$ unshifted window is determined by the Window Adjustment function 450 using only a mean square value, $\xi$, of the unshifted window, which is given by:

$$\xi = \frac{1}{327} \sum_{i=0}^{326} \tilde{x}_i^2$$

Time indexes, $i^M$, $i^L$, and $i^R$ are then found as follows:

$$i^M = \arg\max_{0 \leq i \leq 326}(\tilde{x}_i^2)$$

$$i^L = \min_{0 \leq i \leq 326}(i: \tilde{x}_i^2 > 3\xi)$$

$$i^R = \max_{0 \leq i \leq 326}(i: \tilde{x}_i^2 > 3\xi)$$

The window shift value is then determined as follows:

$$\delta = \begin{cases} \max[-64, \min(0, i^L - 265)] & \text{if } i^L > 228 \text{ and } i^R > 283 \\ \min[63, \max(0, i^R - 64)] & \text{else if } i^L < 44 \text{ and } i^R < 100 \\ \max[-64, \min(63, i^M)] & \text{else if } 113 < i^M < 213 \\ \max[-64, \min(63, \lfloor(i^L + i^R - l^W - 1)/2 + 0.5\rfloor)] & \text{otherwise} \end{cases}$$

Once $\delta$ has been determined, the shifted window for frame $\eta$ is then given by:

$$x_i = s_{\Delta+(\eta-1)l^F+\delta+i}, i=0, \ldots, l^W,$$

wherein $x_i$ represents one sample of a shifted window.

FIG. 8 shows examples of a negative shift of 10 samples for the window 811 corresponding to frame 1, no shift for the window 821 corresponding to frame 2, and a positive shift of 15 samples for the window 831 corresponding to frame 3, in accordance with the preferred embodiment of the present invention.

Once the shifted window for frame $\eta$ has been determined, it is used as an input for the Window 1 and Window 2 Multiply function 420, 454. The Window 1 Multiply function 420 corresponds to a "pitch and voicing" path and the Window 2 Multiply function corresponds to a "harmonic magnitudes" path of the block diagram of FIG. 4. Along the "pitch and voicing" path, the shifted window is multiplied in a Window 1 Multiply function 420 by a first window shaping function determined by a Window 1 Select function 415, and zero padded before a 512 point FFT is performed by a FFT function 425. Along the "harmonic magnitudes" path, the shifted window is multiplied in a Window 2 Multiply function 456 by a second window shaping function determined by Window Select 2 function 456 and zero padded before a conventional 512 point FFT is performed by a FFT function 458. The first and second window shaping functions are different. Both window shaping functions are dynamic because they both may vary in shape from frame to frame. Furthermore, the length of the second window shaping function along the "harmonic magnitudes" path is variable; the window length is adjusted using an onset adjustment procedure before multiplying by the second window shaping function. The onset adjustment procedure serves to concentrate the second window shaping function for harmonic magnitudes on the most relevant part of each shifted window.

The dynamic window shaping functions used for both the "pitch and voicing" path and the "harmonic magnitudes" path are explained below.

5.2.1. Pitch and Voicing Dynamic Window Shaping

The first window shaping function, used along the "pitch and voicing" path, is a Kaiser window function, which is well known to one of ordinary skill in the art. This window vector is dynamic because the β ("beta") parameter of the Kaiser function for the $\eta^{th}$ frame is chosen based on a conditional running average of a normalized fundamental frequency determined by pitch detection and tracking in a Running Average function 443. Letting $\bar{f}_0$ symbolize the value of the long term average of the pitch at the $\eta^{th}$ frame, the β for the Kaiser function is chosen as follows:

$$\beta = \begin{cases} 5 & \text{if } \bar{f}_0 > 50 \\ 3 & \text{otherwise} \end{cases}$$

The value of β determines a shape of a Kaiser function, as is well known to one of ordinary skill in the art. The length of the Kaiser function used along this path is $l^W$, the length of the window. The product of the Kaiser function and the window serves as input to the FFT function 458. The predetermined $l^W$ point Kaiser functions for β=3 and β=5, are denoted by $\chi^{[3]}$, and $\chi^{[5]}$, respectively.

5.2.2. Harmonic Magnitudes Dynamic Window Shaping

The second window shaping function, used along the "harmonic magnitudes" path is determined in the Window 2 Select function 452 by the occurrence of onsets and the fundamental frequency for the frame. Some prior art low data rate analyzer-encoders exhibit deficiencies in the reproduction of some abrupt voice onsets, including the spoken letters b, d, and g. The window shaping performed by multiplying the second window shaping function and a harmonic shifted window generated by a Harmonic Window Placement function 454 helps to ensure that spectral analysis is performed on a region of the speech signal which is free from effects such as improper location, and/or spectral smearing.

The occurrence of speech onsets is determined by filtering the speech signal using a first order predictor in the onset filter 405. At each sample time interval, i, if the total change in the prediction coefficient over the past 16 sampling time intervals exceeds a prescribed threshold, then an output binary onset signal, $\alpha_i$, is set to one, otherwise it is set to zero. This "onset filter" process begins by first filtering the input speech signal by a first order predictor. A prediction error from the first order predictor is given by $s_i - \kappa_i s_{i-1}$, where $\kappa_i$ is a prediction coefficient which minimizes the error in the mean square sense. The prediction coefficient is given by:

$$\kappa_i = \frac{\overline{s_i s_{i-1}}}{\overline{s_i^2}}$$

where the bar signifies low-pass filtering by a single pole filter with the following transfer function:

$$H(z) = \frac{1}{1 - \frac{63}{64}z^{-1}}$$

The binary onset signal is then created as follows:

$$\alpha = \begin{cases} 1 & \text{if } \sum_{j=i-7}^{i} \kappa_j - \sum_{j=i-15}^{i-8} \kappa_j > 2 \\ 0 & \text{otherwise} \end{cases}$$

This binary onset signal has a sample-to-sample correspondence with the input speech signal so that the onsets for a window can be found by simply examining the binary onset signal at the location of the shifted window. An onset window, $\tilde{u}^{[n]}$, and a shifted onset window, $u^{[n]}$, are defined corresponding to each unshifted window, $\tilde{x}^{[n]}$, and each shifted window, $x^{[n]}$, and are given by $$\tilde{u}_i^{[n]} = \alpha_{\Delta+(\eta-1)t^F+i}, i=0, \ldots, l^W,$$

$$u_i^{[n]} = \alpha_{\Delta+(\eta-1)t^F+a+i}, i=0, \ldots, l^W,$$

For each frame, the second window shaping function is selected in the Window 2 Select function 452 based on the onset window, $\tilde{u}^{[n]}$, and the fundamental frequency, $\bar{f}_0$. This window shaping function varies only in its length, $l^W$, which is chosen from a Kaiser function with a fixed β of 6. The length of this second window shaping function, $l^W$ is set to 127 in this example if at least one onset occurs in the $\eta^{th}$ shifted onset window, $u^{[n]}$. Specifically, $l^W$ is set to 127 in this example if $$\sum_{i=64}^{263} u_i > 0,$$

otherwise, $l^W$ is determined using the fundamental frequency of the $\eta^{th}$ frame by the following procedure, in which constants are shown for the present example of frames of 200 samples, and an FFT having 512 points.

$$l^W = \begin{cases} 127 & \text{if } \left\lfloor \frac{512}{6f_0} + 0.5 \right\rfloor < 32 \\ 163 & \text{if } 32 < \left\lfloor \frac{512}{6f_0} + 0.5 \right\rfloor < 40 \\ 255 & \text{if } 40 < \left\lfloor \frac{512}{6f_0} + 0.5 \right\rfloor < 62 \\ 327 & \text{otherwise} \end{cases}$$

5.2.3. Harmonic Window Placement

The window shaping function determined above by the Window 2 Select function 452 is coupled as an input to the Harmonic Window Placement function 454, which generates a corresponding length $l^W$ window z as $z=[x_j, x_{j+1} \ldots x_{j+l_w}]$ where, $$j = \left\lfloor \frac{327 - l^W}{2} + 0.5 \right\rfloor$$

(i.e., z is the center $l^W$ samples of x)

5.3. Half Frame Gain Ratio

In order to better match the rms energy contour of the original signal, the voice Half Frame Gain Ratio function 445 encodes the rms energy of the left half and the right half of each speech frame at vocoding rates 2 and 3. Since the speech analyzer-encoder 107 obtains the energy, or gain, for each speech frame from a frequency domain linear predictive (LP) analysis, the rms energy for the left and right half of a speech frame is estimated by multiplying the LP gain by the rms energy ratio in the left and right half of the speech frame, respectively. The rms energy ratio of the left half, $e^L$, and the right half, $e^R$, of the $\eta^{th}$ speech frame is computed as follows:

$$e^L = \frac{\sqrt{\frac{1}{100}\sum_{i=64}^{163} \tilde{x}_i^2}}{\sqrt{\frac{1}{200}\sum_{i=64}^{263} \tilde{x}_i^2}}, \text{ and}$$

$$e^R = \frac{\sqrt{\frac{1}{100}\sum_{i=164}^{263} \tilde{x}_i^2}}{\sqrt{\frac{1}{200}\sum_{i=64}^{263} \tilde{x}_i^2}}$$

Wherein the samples in the left half of the $\eta^{th}$ are identified by i=64 to 163 and the samples in the right half are identified by i=164 to 263, when the window length is 327 and the frame length is 200.

5.4. Pitch Estimation

Figure 9:
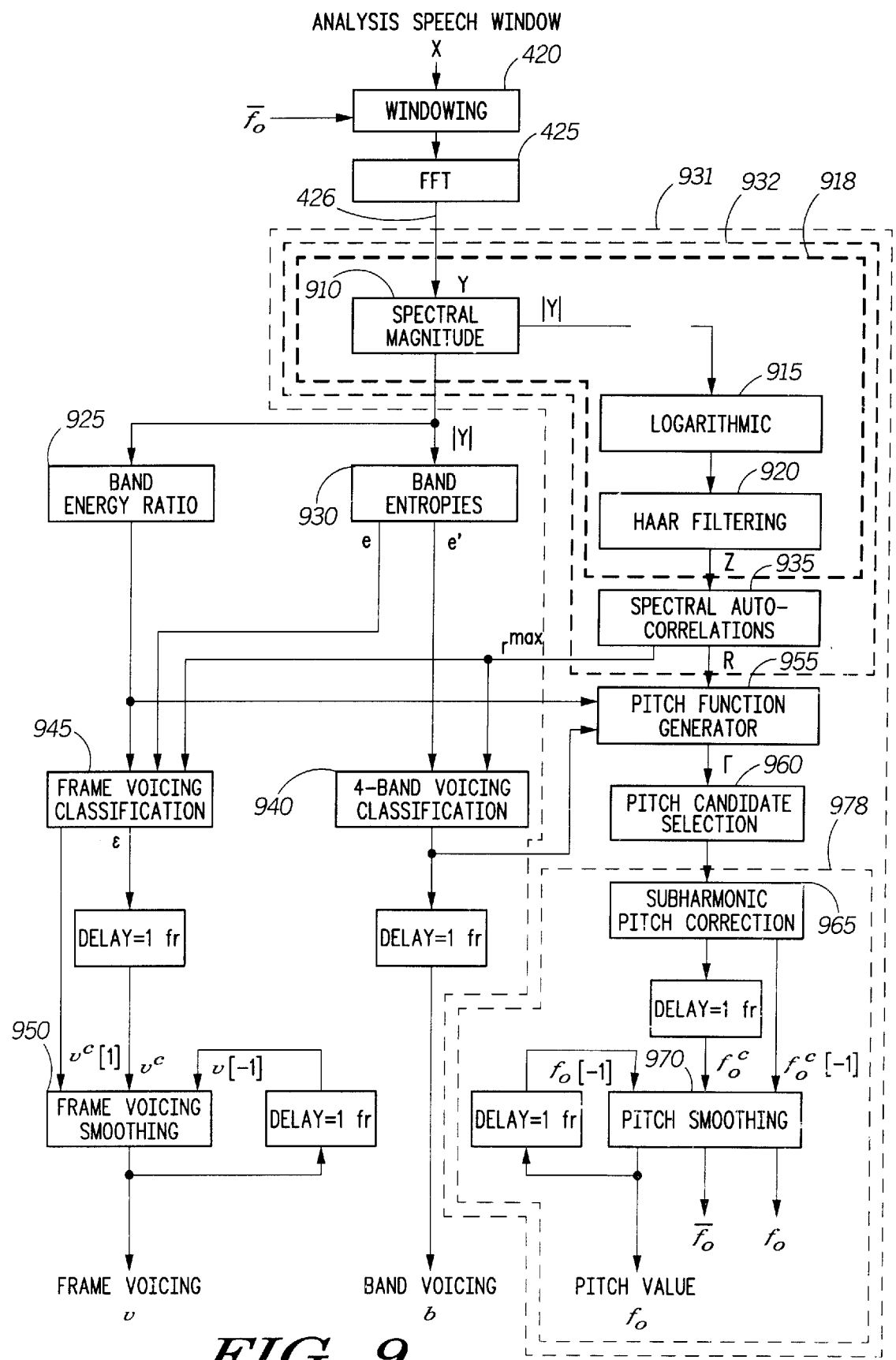
FIG. 9 is a functional block diagram of pitch estimation performed by the speech analyzer-encoder, in accordance with the preferred embodiment of the present invention.

Pitch, 4-band voicing, and frame voicing are estimated by the Frame Voicing Decision function 430, the 4-Band Voicing Estimate function 435, and the Pitch Detection function 440. These three parameters are based on the processing of a common 512 point FFT by FFT function 425. Referring to FIG. 9, a functional block diagram shows in more detail the pitch estimation that takes place in these three functions 430, 435, 440, in accordance with the preferred embodiment of the present invention. The Pitch Detection function 440 can be generally described as being performed by a Pitch Determiner 931 that determines a smoothed pitch value for each frame of digital samples of a voice signal. The Pitch Determiner 931 comprises a Band Autocorrelator 932, a Pitch Function Generator 955, a Pitch Candidate Selector 960, and a Pitch Adjuster 978. The Band Autocorrelator 932 determines a plurality of band autocorrelations that correspond to a plurality of bands of a frequency transformed window of the digital samples, the frequency transformed window corresponding to a future frame of digital samples, and comprises: a Window Filter 918 that generates a reverse filtered spectrum by performing a magnitude transform, a logarithmic transform, and a reverse spectral filtering of the frequency transformed window; and a Spectral Autocorrelator 935 that generates the band autocorrelations by applying a spectral autocorrelation function to each band of the reverse filtered spectrum. The Pitch Function Generator 955 determines a pitch detection function using the plurality of band autocorrelations, the Pitch Candidate Selector 960 selects a future frame pitch candidate from the pitch detection function, and the Pitch Adjuster 978 generates a smoothed pitch value from the future frame pitch candidate and the pitch detection function. The Pitch Adjuster 978 comprises a Subharmonic Pitch Correction function 965 that determines a corrected future frame pitch value by performing pitch subharmonic correction of the future frame pitch candidate using a roughness measure of the frequency transformed window and a Pitch Smoother 970 that determines a smoothed pitch value from the corrected future frame pitch value, the current frame pitch value, and a past frame pitch value.

5.4.1. Pitch and Voicing Estimation

The FFT function 425 computes a 512 point short time FFT vector 426 representing a spectrum of a window. This FFT spectrum is denoted by vector Y in FIGS. 4 and 9, and it is computed as follows:

$$Y_k = \sum_{i=0}^{511} x_i \exp\left(\frac{2\pi ik}{512}\right) \quad k = 0, 1, \ldots, 511$$

wherein $x_i=0$ for i>327, and $Y_k$ is the $k^{th}$ element of the vector $Y=[Y_0, Y_1, \ldots, Y_{511}]$, and wherein i now denotes an index having values from 0 to $1^W$ for the $\eta^{th}$ analysis window.

The FFT spectrum is converted to band autocorrelations by the Band Autocorrelation unction 932 comprising the Vector Filtering function 918 and the Spectral Autocorrelation unction 935. In the Vector Filtering function 918, the FFT spectrum is transformed by a Spectral Magnitude function 910, a Logarithmic function 915, and a Linear Filter function 920. An absolute value spectrum, denoted as vector |Y| is generated from the FFT spectrum by the Spectral Magnitude function 910. The Linear Filter function 920, in accordance with the preferred embodiment of the present invention, is a reverse filtering process that performs a spectral filtering from a highest frequency to a lowest frequency of the absolute value spectrum, preferably using a reverse Haar filter. The absolute value spectrum is converted by the Logarithmic function 915 and the reverse Haar filter function 920 into a reverse Haar filtered vector, Z, also described more generally as a reverse filtered spectrum, Z . The Haar filter used for the reverse Haar filter function 920 has an impulse response vector with elements $h_k^H$ that are given by the following transfer function:

$$H^H(z) = \frac{1 - 2z^{-2} + z^{-4}}{1 - z^{-1}}$$

Figure 10:
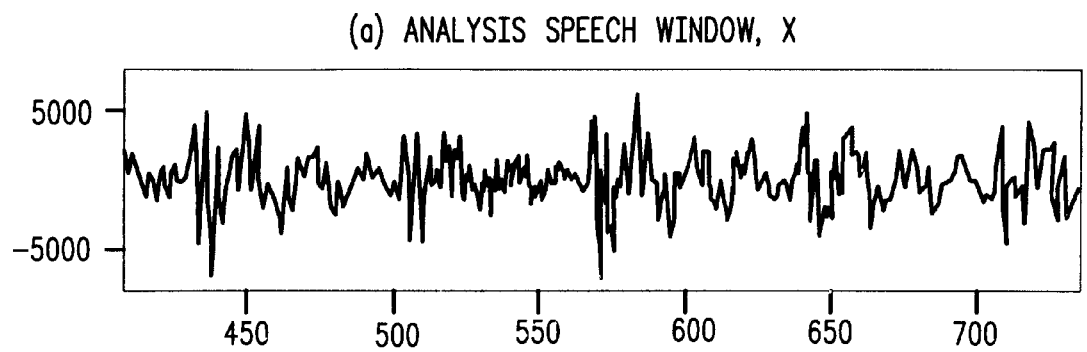
FIG. 10 is a timing diagram showing speech samples of a typical segment of speech processed by the speech analyzer-encoder, in accordance with the preferred embodiment of the present invention.
Figure 11:
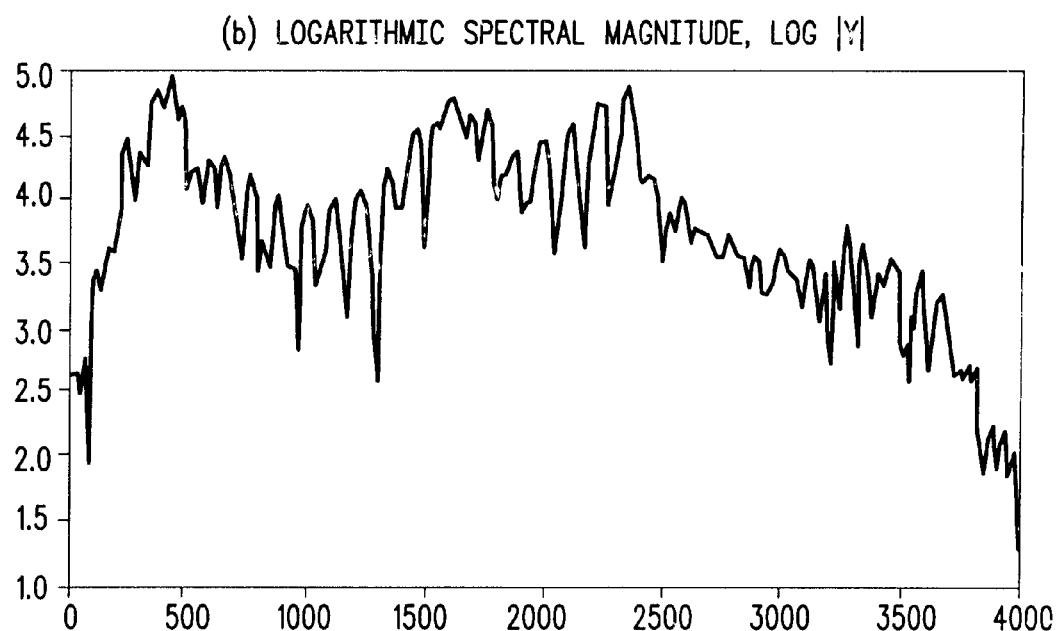
FIG. 11 is a frequency spectral plot showing a frequency spectrum generated by a Logarithmic function of the speech analyzer-encoder, in accordance with the preferred embodiment of the present invention.
Figure 12:
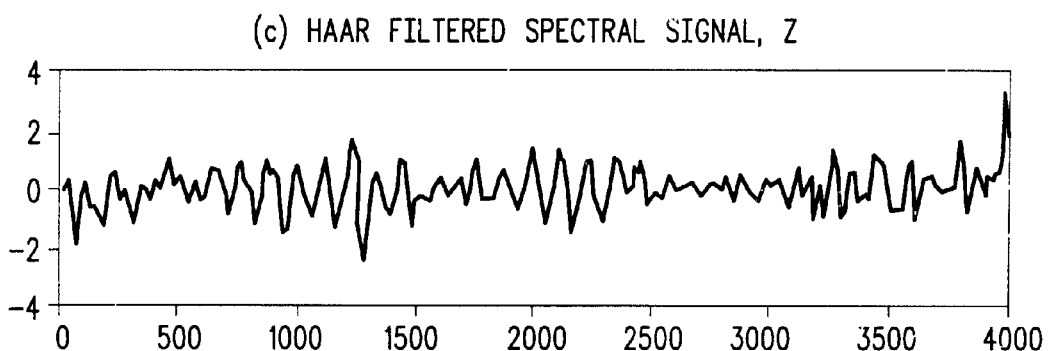
FIG. 12 is a frequency spectral plot showing a frequency spectrum generated at an output of a Haar filter function of the speech analyzer-encoder, in accordance with the preferred embodiment of the present invention.
Figure 13:
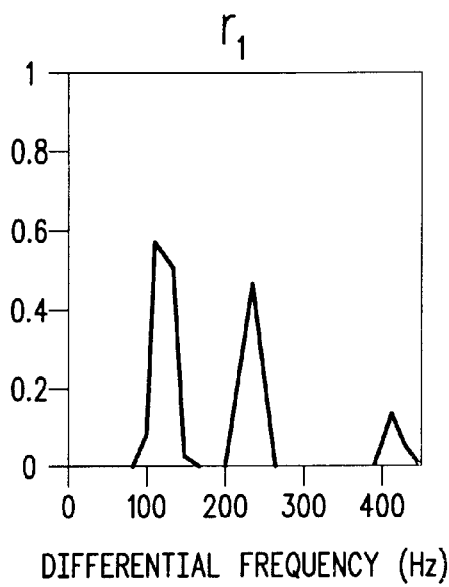
FIGS. 13–16 are differential frequency plots that show examples of auto-correlations functions generated by a Spectral Auto-correlation function of the speech analyzer-encoder, in accordance with the preferred embodiment of the present invention.
Figure 14:
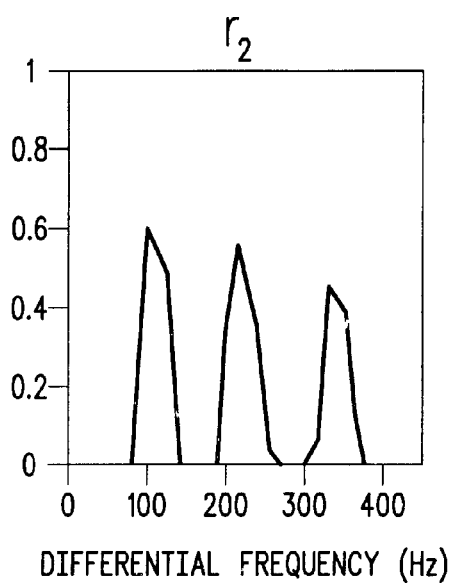
Figure 15:
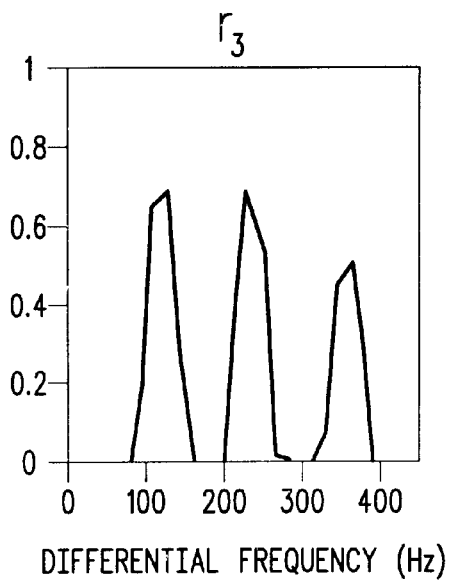
Figure 16:
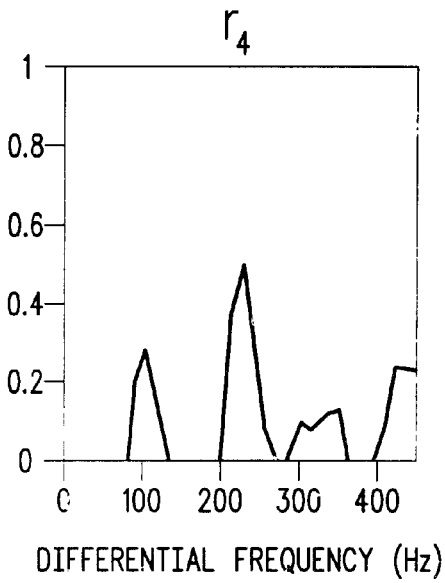

The reverse filtered spectrum Z, with elements $Z_k$, is obtained as:

$$Z_k = h_{127-k}^H * \log|Y_k|$$

where, * is used to denote convolution. The results of reverse Haar filtering the FFT logarithmic magnitude spectrum of a window of speech are illustrated in FIGS. 10–12. FIG. 10 is a timing diagram showing speech samples numbers 400 to 750 of a typical segment of speech, spanning approximately one window and having magnitudes varying from less than −5000 to greater than +5000. FIG. 11 shows a logarithmic frequency spectrum generated by the Logarithmic function 915 from a magnitude conversion performed by the Spectral Magnitude function 910 on the 512 point FFT output of the FFT function 425 generated from the windowed speech samples. FIG. 12 shows the reverse Haar filtered vector Z of the logarithmic frequency spectrum illustrated in FIG. 11.

The output of the Spectral Magnitude function 910 is also used to obtain pitch related spectral parameters within each of four defined frequency bands. The four defined frequency bands in this example have frequency ranges of 187.5 Hz to 937.5 Hz, 937.5 Hz to 1687.5 Hz, 1687.5 Hz to 2437.5 Hz, and 2437.5 These pitch related spectral parameters are needed for voicing classification and pitch detection. The pitch spectral parameters computed from the output of the Spectral Magnitude function 910 in each band are:

an absolute energy of the band,
a relative energy of the band,
an entropy of the band, and a weighted entropy of the band using an entropy of sub-bands within each band.

There are four frequency bands defined for these parameters. For each frequency band $l \in \{1,2,3,4\}$, the absolute energy, $u_l$, of band l is computed as follows:

$$u_l = \sum_{k=0}^{47} |Y_{K_l+k}|^2$$

where $K_1 = -36 + 48\, l$

The relative band energy is determined by the Band Energy Ratio function 925 as:

$$\varepsilon_l = \sqrt{\frac{u_l}{\max_{1 \le l \le 4}(u_l)}}$$

The band entropy is determined by the Band Entropy function 930 as:

$$e_l = \frac{a_l}{u_l} \sum_{k=0}^{47} |Y_{K_l+k}|^2 \log|Y_{K_l+k}|^2 - \log(u_l) + \log(48)$$

where the scalars $a_l$ are a function of the long term pitch $\bar{f}_0$, and are given by:

$$a_1 = \begin{cases} 1.10 & \text{if } \bar{f}_0 > 50 \\ 1.00 & \text{otherwise} \end{cases}$$

$$a_2 = \begin{cases} 1.08 & \text{if } \bar{f}_0 > 50 \\ 1.00 & \text{otherwise} \end{cases}$$

$$a_3 = \begin{cases} 1.08 & \text{if } \bar{f}_0 > 50 \\ 1.00 & \text{otherwise} \end{cases}$$

$$a_4 = \begin{cases} 1.04 & \text{if } \bar{f}_0 > 50 \\ 1.00 & \text{otherwise} \end{cases}$$

The weighted entropy of the $l^{th}$ band is given by:

$$e'_l = a_l \sum_{m=0}^{3} \left[ \sum_{k=12m}^{12m+11} |Y_{K_l+k}|^2 \log|Y_{K_l+k}|^2 \Big/ \sum_{k=12m}^{12m+11} |Y_{K_l+k}|^2 - \log \sum_{k=12m}^{12m+11} |Y_{K_l+k}|^2 + \log(12) \right]$$

wherein m denotes the sub-bands.

Each band auto-correlation is computed from the reverse filtered spectrum in the Spectral Auto-Correlation function 935 by the following procedure. First, two intermediate matrices, $R' = [r'_1, r'_2, r'_3, r'_4]$ and $R'' = [r''_1, r''_2, r''_3, r''_4]$ are used to obtain a spectral auto-correlation matrix, R, which contains the auto-correlation of the $l^{th}$ band as the $l^{th}$ column of the matrix R. The $l^{th}$ column of the first intermediate matrix, R' is obtained as follows:

$$r'_{l,n} = \frac{\sum_{k=1}^{60-n} Z_{3+58(l-1)+k} Z_{3+58(l-1)+k+n}}{0.5 \left( \sum_{k=1}^{60-n} Z^2_{3+58(l-1)+k} + \sum_{k=1}^{60-n} Z^2_{3+58(l-1)+k+n} \right)}$$

$$n = 0, \ldots, 28 \quad l = 1, \ldots, 4$$

The second intermediate matrix, R'' is found as follows:

$$r''_{l,n} = \begin{cases} r'_{l,n} & \text{if } r'_{l,n} \ge 0 \\ 0.1 r'_{l,n} & \text{otherwise} \end{cases}$$

The variable n is an index of differential frequency used to describe the band autocorrelation functions. Each n represents a differential frequency given by (the number of speech samples per second)/(the number of points in the FFT function 425) Hertz, which in this example is 8000/512 Hertz.

Now, R is found as follows $$r_{l,n} = \begin{cases} r''_{l,n} & \text{if } n > n_l^o \\ 0.1 \left[ \frac{1-n}{2+n_l^o} - 1 \right] & \text{otherwise} \end{cases}$$

where $n_l^o = \min_n [n: r_{l,n} < r_{l,n+1}]$.

Also, the maximum magnitude of spectral auto-correlation of each band is computed for later use. This maximum magnitude is computed given by:

$$r_l^{max} = \max_n [r_{l,n}]$$

FIGS. 13–16 are differential frequency plots that show examples of the spectral auto-correlation functions corresponding to each of the four frequency bands, in accordance with the preferred embodiment of the present invention. The differential frequency range covered in each of the FIGS. 13–16 is approximately 450 Hz.

5.4.2. 4-Band Voicing Classification

A binary "voiced"/"unvoiced" decision, or voicing decision, is made for each of the four frequency bands defined above.

The band voicing decision of band l, $b_l$, is determined by a 4-Band Voice Classification function 940 from $r_l^{max}$, $e_l$, and $e'_l$, preferably using a neural net, in the following manner, wherein $b_l$ denotes one of the four band voicing parameters 436 (FIG. 4):

$$b_l = \begin{cases} 1 & \text{if} \quad r_l^{max} > 0.6 \text{ or } e_l > 1.3 \\ 0 & \text{else if} \quad r_l^{max} < 0.2 \text{ or } e_l < 0.25 \\ \lfloor 0.5 + \text{logsig}[W^b \cdot \text{tansig}(W^B \cdot [r_l^{max}, c_l^e e_l'], d^B), d^b] \rfloor & \text{otherwise} \end{cases}$$

where logsig is the conventional "logistic sigmoid activation transfer function" and tansig is the conventional "hyperbolic tangent sigmoid activation transfer function"

$$\text{logsig}(x, y) = \frac{1}{1 + e^{-(x+y)}}; \quad \text{tansig}(x, y) = \frac{2}{1 + e^{-2(x+y)}} - 1$$

where $W^B$, $d^B$, $W^b$, and $d^b$ are predetermined constants, and $$c_l^e = \begin{cases} 1 & \text{if } l < 4 \\ 0.8 & \text{if } l = 4 \end{cases}$$

where $\xi$ is the root mean squared value of a frame as defined previously, and $\overline{\xi}$ is a long term average of $\xi^2$. Other inputs to this neural net are band relative energies ratios and band entropies of the four bands, and the maximum magnitudes of auto-correlations of the first three frequency bands, as described above.

In all, there are twelve inputs to this neural net. The inputs are grouped into a vector as follows:

$$q^u = [r_1^{max}, r_2^{max}, r_3^{max}, e_1, e_2, e_3, e_4, \epsilon_1, \epsilon_2, \epsilon_3, \epsilon_4, \sigma]$$

A frame voicing parameter 431 (FIG. 4) of the $\eta^{th}$ frame (the future frame), $v^c[1]$, is estimated by a neural net using vector $q^v$ as follows:

$$v^c[1] = \begin{cases} 0 & \text{if } \sigma < 0.03 \\ & \text{or } (\sigma < 0.1 \text{ and } \Gamma^{max} < 0.25) \\ & \text{or } (\sigma < 0.1 \text{ and } \Gamma^{max} < 0.25) \\ 1 & \text{else if } (\sigma > 0.3 \text{ and } r_1^{max} < 0.6) \\ & \text{or } (\sigma < 0.3 \text{ and } e_1 > 1 \text{ and } f_o[1] < 54) \\ \lfloor 0.5 + \text{logsig}(W^v \cdot \text{tansig}(W^V \cdot q^v, d^V), d^v) \rfloor & \text{else if } e_1 + 1.6 r_1^{max} > 0.927 \\ 0 & \text{otherwise} \end{cases}$$

5.4.3. Frame Voicing

5.4.3.1. Nomenclature

In this description of frame voicing and the descriptions that follow, a [1] suffix after a value indicates a "first future" frame, frame $\eta$. Model parameters for the first future frame, also referred to as simply the future frame, are computed in a particular iteration, while no suffix indicates a current frame, frame $\eta-1$, which is the previous frame, for which values, such as the pitch value, are determined by the speech analyzer-encoder 107 at the end of the particular iteration after the model parameters for the future frame have been computed, and a [−1] suffix indicates values related to the frame previous to the current frame. A "c" superscript denotes a pitch candidate or a value that is used for determining a pitch candidate for a current or future frame.

5.4.3.2. Frame Voicing Classification

For each speech frame, a binary "voiced"/"unvoiced" decision is made by a Frame Voicing Classification function 945. The Frame Voicing Classification function 945 uses a neural net to make this decision. The inputs to the neural network fall into four categories. The first input is a relative root mean squared energy of a frame. The relative root mean squared energy of a frame is defined as follows.

$$\sigma = \sqrt{\xi / \overline{\xi}}$$

where $W^V$, $d^V$, $W^v$, and $d^v$ are predetermined constants determined by conventional neural net training, and $\Gamma^{max}$ is computed as described below in section 5.4.4.1, "Generation of Pitch Detection Function". When the voicing parameter, v, associated with a particular frame has a value of 1, the frame is described as a voiced frame, and when the value is 0, the frame is described as an unvoiced frame.

5.4.3.3. Frame Voicing Smoothing

The voicing decision is completed when a smoothing procedure is performed by a Frame Voicing Smoothing function 950. The smoothing procedure is as follows:

if $v^c = 1$ and $v[-1] + v^c[1] = 0$ and $\sigma < 0.1$
    v := 0
end
if $v^c = 0$ and $v[-1] + v^c[1] = 2$ and $\sigma > 0.1$
    if $\sigma > 0.7 \min\{\sigma[-1], \sigma\}$ and $\Gamma^{max} > 0.4$
        v := 1
    end
end

5.4.4. Pitch Detection and Tracking

5.4.4.1. Generation of Pitch Detection Function

A "pitch detection function" (PDF), $\Gamma$, is computed by the Pitch Function Generation function 955 from the band auto-correlations, the band energy ratios, and the band voicing classifications. The fundamental frequency is then computed from the PDF. The PDF is computed as follows:

$$\Gamma_n = \begin{cases} M\max\left[0, |Y_n| - \max_{k=0}^{28}(|Y_K|) + P\right] & \text{if } r_1^{max} < Q \text{ and } \varepsilon_1 > R \\ r_{1,n} & \text{else if } \begin{array}{l}(r_1^{max} > 0.55 \text{ and } \hat{f}_o > 68) \\ \text{or } (r_1^{max} > 0.45 \text{ and } \hat{f}_o \le 68)\end{array} \\ c_1 r_{1,n} + c_2 r_{2,n} + c_3 r_{3,n} + c_4 r_{4,n} & \text{otherwise} \end{cases}$$

where n=0, . . . ,K; K is a number of values in the reverse Haar filtered vector Z, in this example, 28; M, P, Q, and R are preferably 0.4, 1.5, 0.25, and 1.4 respectively, but other values will provide some of the benefits of the present invention. $\hat{f}_0$ is a mid-term pitch value described in more detail below, and weighting factors $c_l$ are calculated as follows.

$$c'_1 = 1$$

$$c'_l = \begin{cases} 1 - 0.15(l-1) & \text{if } b_l = 1 \text{ and } r_l^{max} > 0.5 \\ 0 & \text{otherwise} \end{cases} \text{ for } l = 2, 3, 4$$

$$c_l = \frac{c'_l}{\sum_{l=1}^{4} c'_l}$$

The maximum magnitude of the PDF and the index of the maximum magnitude are needed for pitch detection and correction. They are computed as follows:

$$\Gamma^{max} = \max_n(\Gamma_n)$$

$$n^{max} = \arg\max_n(\Gamma_n)$$

5 5.4.4.2. Pitch Candidate Determination

Figure 17:
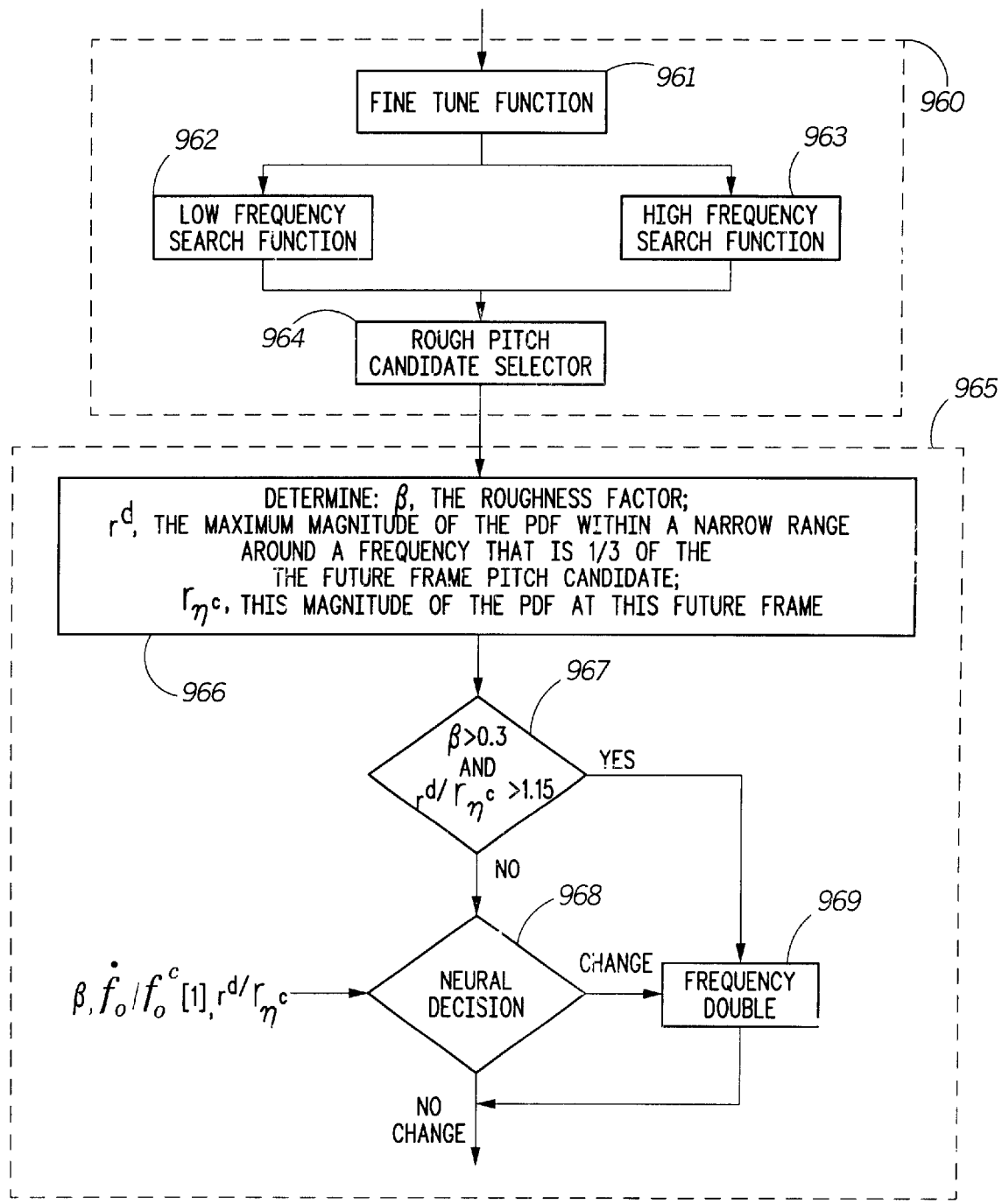
FIG. 17 is a flow chart that shows details of a Pitch Candidate Selection function and a Subharmonic Pitch Correction function of the speech analyzer-encoder.

Referring to FIG. 17, a functional block diagram of the Pitch Candidate Selection function 960 and the Subharmonic Pitch Correction function 965 are shown, in accordance with the preferred embodiment of the present invention. The Pitch Candidate Selection function 960 can be generally described as comprising a Fine Tune function 961 that determines a fine tune peak frequency, λ(n), of a relative peak of the PDF, a Low Frequency Search function 962 that identifies a smallest low frequency peak of the PDF using the Fine Tune function 961; a High Frequency Search function 963 that identifies a largest high frequency peak of the PDF using the Fine Tune function 961, and a Rough Pitch Candidate selector 964 that selects one of the smallest low frequency and largest high frequency local peaks as a future frame rough pitch candidate.

The Fine Tune function 961 performs a polynomial interpolation adjustment to determine the peak frequency of the relative peak.

The Low Frequency Search function 962 determines a peak frequency of the smallest low frequency peak of the PDF as the peak frequency of a relative peak that has a magnitude greater than a first predetermined proportion of a greatest peak magnitude of the PDF or that has a magnitude greater than a second predetermined proportion of the greatest peak magnitude of the PDF and for which a multiple of the fine tune peak frequency is within a predetermined frequency range of the frequency of the greatest peak magnitude of the PDF.

The High Frequency Search function 963 determines a peak frequency of the largest high frequency peak of the PDF as the peak frequency of a relative peak that has a magnitude greater than a predetermined proportion of the greatest peak magnitude of the PDF and for which a multiple of the fine tune peak frequency is within a predetermined frequency range of the frequency of the greatest peak magnitude of the PDF.

The Rough Candidate Selector 964 selects the largest high frequency relative peak as the rough pitch candidate when the smallest low frequency peak and largest high frequency peak do not match.

This is expressed mathematically as:

First, a function r(j,n) of integer j and n is defined as follows:

$$r(j,n) = (0.5\Gamma_{n+1} + 0.5\Gamma_{n-1} - \Gamma_n)(j/6)^2 + 0.5(\Gamma_{n+1} - \Gamma_{n-1})(j/6) + \Gamma_n$$

The Fine Tune function 961 generates λ(n) which is determined as:

$$\lambda(n) = n + \arg\left\{\max_{j \in \{-5,\ldots,5\}} [r(j,n)]\right\}/6$$

An index, $n^c$, for the peak frequency of the smallest low frequency peak is found as follows. It will be appreciated that the frequency of the smallest low frequency peak is found from the index by multiplying the index by the number of speech samples per second and dividing the result by the number of points in the FFT function 425 A first predetermined value, A, is preferably 0.7, a second predetermined, B, is preferably 0.4, and a third predetermined value, C, is 1.2. A is larger than B. The greatest peak magnitude of the PDF is identified as $\Gamma^{max}$. The frequency of the greatest peak magnitude of the PDF is identified as $n^{max}$.

$$n^c = \min_n \left\{ n: \Gamma_{n-1} \le \Gamma_n \ge \Gamma_{n+1} \text{ and} \right.$$

$$\Gamma_n > B\Gamma^{max} \text{ and } \left[\Gamma_n > A\Gamma^{max} \text{ or}\right.$$

$$\left.\left|\lambda(n) - \frac{n}{\lceil n^{max}/\lambda(n) + 0.5 \rceil}\right| < C\right]\right\}$$

An index, $n^m$, for the peak frequency of the largest high frequency peak is found as follows. A first predetermined value, D, is preferably 0.6, a second predetermined, E, is preferably 1.2.

$$n^m = \max_n \left\{ n: \Gamma_{n-1} \le \Gamma_n \ge \Gamma_{n+1} \text{ and} \right.$$

$$\left.\Gamma_n > D\Gamma^{max} \text{ and } \left|\lambda(n^c) - \frac{n}{\lceil n/\lambda(n^c) + 0.5 \rceil}\right| < E\right\}$$

The rough pitch candidate of the future frame is determined as follows. It will be appreciated that the following process selects the largest high frequency relative peak as the rough pitch candidate when the smallest low frequency peak and largest high frequency peak do not match (i.e., are not the same peak):

$$f_o^c[1] = \frac{6\lambda(n^m)}{\lfloor \lambda(n^m)/\lambda(n^c) + 0.5 \rfloor}$$

$f_o^c[1]$ is referred to as the future frame rough pitch candidate.

5.4.4.3. Pitch Adjustment

The Pitch Adjuster 978 performs the Subharmonic Pitch Correction function 965 using the future frame rough pitch candidate. The long term pitch value, $\bar{f}_o$, and the mid-term pitch value, $\dot{f}_o$, are updated and a Pitch Smoothing function 970 is performed, involving the corrected future frame rough pitch candidate and mid- and long term pitch values, resulting in the generation of a smoothed pitch value (the pitch estimate 441), $f_o$, for the current frame.

5.4.4.3.1. Pitch Candidate Correction

The future frame pitch candidate obtained by the Pitch Candidate Selection function 960 may need correction based on the spectral shape. To determine this, the Subharmonic Pitch Correction function 965 (FIG. 17) is used. First, two variables are initialized: $\beta=0$, $\lambda=0$ at every frame. $\beta$ is a roughness factor and $\lambda$ is a doubling flag. Then a test function 971 is performed to determine whether to use a roughness test, as follows:

If $$f_o^c[1] < 88 \text{ and } f_o^c[1] < 0.82 \dot{f}_o \text{ and } \left( \max_m (\log|Y_{k_m}|) - \log|Y_{k_l}| \right) > 3,$$

wherein the index $k_m$, which is directly related to the frequency of the $m^{th}$ harmonic, is found as follows:

$$k_m = \arg\left[ \max_{\lfloor (m-0.4)f_o^C[1]/6 \rfloor \leq k \leq \lfloor (m+0.4)f_o^C[1]/6 \rfloor} (\log|Y_k|) \right]$$

When the test result is False (No), the future frame pitch candidate is not changed. When the test results is True (Yes), a roughness test comprising a Determination function 966 (FIG. 10), is used to determine $r^d$, a maximum magnitude of the PDF within a narrow frequency range around a frequency that is one third of the future frame pitch candidate, as follows:

$$r^d = \max_{\lfloor f_o^C[1]/3 \rfloor - 1 \leq n \leq \lfloor f_o^C[1]/3 \rfloor + 1} (\Gamma_n)$$

The Determination function 966 also determines the roughness factor, $\beta$, as follows.

$$\beta = \frac{\sum_{m=1}^{\lfloor 180/f_o^C[1] \rfloor} |Y_{k_{2m+1}}| \left[ 0.5(\log|Y_{k_{2m+2}}| + \log|Y_{k_{2m}}|) - \log|Y_{k_{2m+1}}| \right]}{\sum_{m=1}^{\lfloor 180/f_o^C[1] \rfloor} |Y_{k_{2m+1}}|}$$

and wherein Y is FFT spectrum 426, the frequency transformed window, and $f_o^c[1]$ is the future frame pitch candidate.

The roughness factor can be generally described as being determined from the magnitudes of all harmonic peaks of a magnitude spectrum and magnitudes of all harmonic peaks of a logarithmic spectrum of the frequency transformed window. The roughness factor uses a difference between the value of every other harmonic peak in the logarithmic magnitude spectrum and an average of the values of the two peaks adjacent thereto to generate a roughness factor, $\beta$.

A high roughness decision function 967 doubles the future frame pitch candidate when the roughness factor $\beta$ exceeds a first predetermined value, in this example 0.3, and the maximum magnitude of the PDF, $r^d$, within a narrow frequency range around a frequency that is one third of the future frame pitch candidate $r^d$ exceeds a predetermined multiple, in this example 1.15, of the magnitude, $r_{n^c}$, of the PDF at the future frame pitch candidate. This is expressed mathematically as:

If $\beta > 0.3$ and $r^d/r_{n^c} > 1.15$ $f_o^c[1] := 2f_o^c[1]$

Set doubling flag $\lambda=1$

A Neural Decision function 968 determines whether to double the frequency using a neural network when the roughness factor does not exceed the first predetermined value or the maximum magnitude of the PDF, $r^d$, within a narrow frequency range around a frequency that is one third of the future frame pitch candidate does not exceed a predetermined fraction of the magnitude, $r_{n^c}$, of the PDF at the future frame pitch candidate, and when a ratio of the magnitude of the PDF function at the future frame pitch candidate to the greatest peak magnitude of the PDF is less than a second predetermined value. This is expressed mathematically as:

```
if β ≤ 0/3 or r^d /r_n^c ≤ 1.15
  And if r_n^c/r_n^m < 0.85
    t = logsig[W^p · tan sig(W^p ·q^v,d^p), d^p]
    if t > 0.5
      f_o^c[1] := 2f_o^c[1]
      Set doubling flag λ = 1
    end
  end
end
``` wherein $W^p$, $W^P$, $d^P$, and $d^p$ are predetermined constants determined by conventional back propagation neural network training. $W^p$, $W^P$ are matrix constants, $d^P$ is a vector constant, and $d^p$ is a scalar constant. The inputs to the Neural Decision function 968 are represented by $q^V$, a vector comprising three variables:

$\beta$, $\dot{f}_o/f_o^c[1]$, and $r^d/r_{n^c}$.

Otherwise, the future frame pitch candidate remains unchanged and the doubling flag $\lambda=0$.

The future frame pitch candidate, $f_o^c[1]$, after this correction process is performed, is termed the corrected future frame pitch value.

The output, t, of the neural network is therefore described as being based on inputs comprising the roughness factor, a ratio of the mid-term pitch value to the future frame pitch candidate, and a ratio of a maximum magnitude of the pitch detection function within a narrow frequency range around a frequency that is one third the future frame pitch candidate to the magnitude of the pitch detection function at the future frame pitch candidate. It will be appreciated that the unique use of the neural network provides improved accuracy in determining the pitch value for the frame, and it will be further appreciated that lesser improvements in the accuracy of the pitch value will result when the output of the neural network is based on fewer than all of the three inputs described above (but, of course, using at least one of them).

5.4.4.3.2. Long Term and Mid-term Averaging

Updating of the long term average of the pitch frequency (the long term pitch value), $\bar{f}_0$, the running mid-term average of the pitch frequency (the mid-term pitch value), $\dot{f}_0$, and the long term frame energy, $\bar{\xi}$, is described below.

$B=\{B_m: m=1, \ldots, 7\}$ is a state variable that is initialized to a predetermined value at the beginning of analysis of a message, and then updated during the following process in each frame iteration.

If $f_0^c[1] > 2 \max(\bar{f}_0, \dot{f}_0)$ $f_0^c[1] \leftarrow f_0^c[1]/\lfloor f_0^c[1]/\dot{f}_0 \rfloor$ else if $v=1$ and $r_{max}^{[1]} > 0.5$ and $\sigma > 0.25$ $\bar{s}:=(K^A\bar{s}+s)/(K^A+1)$ $\bar{f}_0:=(K^A\bar{f}_0 + f_0^c[1])/(K^A+1)$ $\dot{f}_0:=\dot{f}_0 - B_1 + f_0^c[1]/7$ $K^A:=K^A+1$ for $m=1:6 \; B_m:=B_{m+1}$ $B_7:=f_0^c[1]/7$ end wherein $f_0^c[1]$ is termed the future frame pitch value after this updating process.

5.4.4.3.3. Pitch Smoothing

Pitch smoothing is the final process the pitch goes through. As a first step in pitch smoothing, the Pitch Smoothing function 970 determines 3 reference values $f^f$, $f^b$ and $f^1$ as follows:

$$f^f = \begin{cases} f_o^c[1] & \text{if } v^c[1] \\ f_o^c & \text{elseif } \lfloor 6n^{max}/f_o^c \rfloor = 1 \text{ and } \Gamma^{max} > 0.65 \\ (\dot{f}_o + f_o[-2])/2 & \text{Otherwise} \end{cases}$$

$$f^1 = \begin{cases} f_o^c & \text{if } |f_o^c - \dot{f}_o| < |f_o^c[1] - \dot{f}_o| \\ f_o^c[1] & \text{otherwise} \end{cases}$$

$$f^b = \begin{cases} f_o^c & \text{if } \Gamma^{max} > 0.65 \text{ and } |f_o^c - \dot{f}_o| < |f_o^c[1] - \dot{f}_o| \\ f_o^c[1] & \text{elseif } \Gamma^{max} > 0.65 \text{ and } \lambda = 0 \\ \dot{f}_o/1.15 & \text{elseif } f^1 < \dot{f}_o \\ \dot{f}_o/1.15 & \text{otherwise} \end{cases}$$

wherein $f_0^c[1]$ is the future frame pitch value, and $n^{max}$ is the index of the maximum magnitude of the PDF.

It will be appreciated that, in accordance with the preferred embodiment of the present invention described in the above mathematical definition of the function, the Pitch Smoothing function 970 makes a selection of pitch values used to determine the pitch estimate. The selection of pitch values is based on parameters that include a frame voicing classification of a future frame, a previous smoothed pitch value, a global maximum value of the pitch detection function, and a doubling flag set during the pitch subharmonic correction.

The Pitch Smoothing function 970 then generates a smoothed pitch value, which is the pitch estimate 441 for the current frame, $f_0$, as follows:

Find 3-point median $\mu = \text{median}(f^b, f_o^c, f^f)$
if $|f_o^c - \mu|/\mu < 0.17$
    $f_o = f_o^c$
else
    $\gamma^L = \min(f^b, f^f)/1.17$
    $\gamma^U = \max(f^b, f^f)/0.83$
    if $f_o^c < \gamma^L$
        for m=2:4
            $t = mf_o^c$
            if $t > \gamma^L$ and $t < f^U$
                $f_o = t$
            end
        end
    elseif $f_o^c < \gamma^L$
        for m=2:4
            $t = f_o^c/m$
            if $t > \gamma^L$ and $t < \gamma^U$
                $f_o = t$
            end
        end
    end
end It will be appreciated that the Pitch Smoothing function 970 generates the pitch estimate as one of an integer multiple of a current frame pitch value, the current frame pitch value, and an integer sub-multiple of the current frame pitch value.

5.5. Spectral Modeling

The speech analyzer-encoder 107 spectral model parameters are based on the FFT of a short-time segment of speech. To attain a very low bit rate, only samples of the FFT magnitude spectrum at the harmonics of the fundamental frequency are coded and transmitted. These harmonic magnitudes utilize the largest portion of the bit budget of most MBE analyzer-encoders, and yet are the most important factor affecting the quality of the synthesized speech. Thus, reducing the amount of bits required to encode them, while maintaining a satisfactory quality of the decoded and synthesized message is vital for achieving lower bit rates. The encoded bit rates of the spectral harmonics are reduced by a combination of conventional and unique functions described herein, below, in accordance with the preferred embodiment of the present invention.

5.5.1. Harmonic Magnitudes Estimation

As described above, the FFT function 458 performs a conventional 512 FFT of an adjusted, weighted window of voice samples. The power spectrum of the first half (256 points) of the resulting FFT signal is then computed conventionally and harmonic magnitudes are estimated from this power spectrum by the Harmonic Magnitude Estimate function 465, using a conventional peak picking technique.

5.5.2. LP Spectral Fitting

The LP Spectral Fitting function 475 determines 10 auto-correlation values by conventional techniques from the harmonic magnitudes. A Levinson-Durbin recursion is then used to compute an initial $10^{th}$ order LP spectrum, and a conventional discrete all pole algorithm (DAP) is used by the LP Spectral Fitting function 475 to refine the spectral fit of the $10^{th}$ order LP spectrum, the coefficients of which are then normalized. These coefficients are called the LP coefficients, or LPCs 476, which are coupled to the LSF Conversion function 470 and the Dynamic Segmentation function 490. The LP Spectral Fitting function 475 also generates the frame gain parameter 478 that is coupled to the Gain Estimate function 460.

5.5.3. LP to LSF Transformation

The LPCs 476 are converted to line spectral frequencies (LSF) vectors 471 by the LSF Conversion function 470 using conventional techniques for finding the roots of sum and difference polynomials.

5.5.4. Speaker Normalization

Speaker normalization is done to help encode the LSFs 476 efficiently. The odd LSF coefficients for all the voiced frames of the first processing stage are averaged and quantized by the Speaker Normalization function 477 at the beginning of processing stage 2. The scalar quantized average values of the odd coefficients (collectively referred to as the speaker normalization vector 472) are used in the subsequent quantization of LSF vectors 471 starting at the beginning of the second processing stage.

Let $\Psi[\eta]$ be the LSF vector for the $\eta^{th}$ frame. Let $\eta^1$ be the number of frames buffered in processing stage 1 and let $\eta^v$ be the number of voiced frames buffered in processing stage 1. The LSF average vector $\Psi^n$ is now obtained as follows.

Initialization: $\eta^v = 0$
for i=0;i<5;i++

---

$\psi^n_i = 0$
end
for j=0;j<$\eta^1$;j++
  if v[j] = 1
    $\eta^v = \eta^v + 1$
    for i=0;i<5;i++
      $\psi^n_i = \psi_i[2j]$
  end
    end
end
for i=0;i<5;i++

$$\psi^n_i = \frac{\psi^n_i}{\eta^v}$$

end

---

The LSF average vector is then scalar quantized (i.e., each coefficient is replaced by a closest one of 32 predetermined values) thereby generating the speaker normalization vector $\hat{\Psi}^n$ 472.

5.6. Spectral Quantization

LSF vectors 471 for each current frame are quantized using vector quantization (VQ) techniques that include a unique speaker normalization technique for voiced frames. For unvoiced frames, the VQ technique used is a conventional one in which each LSF vector 471 is compared by the Spectral Codebook function 486 to entries in a codebook and the index corresponding to the best matching codebook entry is chosen by the Spectral Vector Quantization (VQ) function 488 to be the quantized value of the LSF vector 471, called the quantized LSF vector 489. For voiced frames, the normalization technique can be generalized as one in which coefficients in each LSF vector 471 are modified by subtraction of coefficients of the speaker normalization vector $\hat{\Psi}^n$ 472 before a quantized value of the LSF vector is determined. In the speech analyzer-encoder 107, the LSFs corresponding to voiced and unvoiced frames are quantized using different procedures. It will be appreciated that once the speaker normalization vector $\hat{\Psi}^n$ 472 has been determined at the beginning of processing stage 2, essentially all of the LSF vectors 471 stored during processing stage 1 can be quantized and stored in the bit stream buffer 499. This is the remaining portion of processing stage 2. Thereafter, only a few frames of LSF vectors 471 (in this example, 17) are stored, while the remainder of the voice message is quantized and enhanced by dynamic segmentation, in processing stage 3.

5 5.6.1. Unvoiced Frame LSF Quantization

The unvoiced LSF vectors 471 are quantized using a total bit budget of 9 bits per frame using conventional techniques. A 9-bit codebook with 512 entries is used for this purpose. The codebook is a matrix of 512 by 10 values. A weight vector is first computed using an inverse harmonic mean (IHM) method. A weighted mean square error (WMSE) is generated by the Spectral Codebook function 486 by comparing the unvoiced LSF vector 489 to every entry in the codebook. The index of the entry which has the minimum WMSE is chosen by the Spectral VQ function 488 as the quantized unvoiced LSF vector 489.

5.6.2. Voiced Frame LSF Quantization

The voiced LSF vectors 471 are quantized using a total bit budget of 22 bits per frame. A 12-bit voiced odd LSF codebook with 4096 entries and a 10-bit voiced even LSF codebook with 1024 entries are used for this purpose. The input $10^{th}$ order LSF vector is split into two vectors of 5 coefficients each, an odd LSF vector and an even vector LSF, by the Spectral Codebook function 486. The coefficients of the speaker normalization vector 472 are then subtracted from the coefficients of the odd LSF vector to give a speaker normalized odd LSF vector. A mean square error (MSE) is generated by the Spectral Codebook function 486 by comparing the normalized odd LSF vector to every table entry in the voiced odd LSF codebook. The index of the table entry which has the minimum MSE is chosen by the Spectral VQ function 488 as a quantized value of the odd LSF vector.

A normalized even LSF vector is then computed by the Spectral Codebook function 486, using the coefficients of the even LSF vector and coefficients of an odd vector found by adding the coefficients of the table entry identified by the quantized value of the odd LSF vector to the normalized speaker vector coefficients. More specifically, the coefficients of the normalized even vector, $\phi_i^e$, are determined as $$\tilde{\psi}_i^e = \frac{(\psi_i^e - \hat{\psi}_i^o)}{(\hat{\psi}_{i+1}^o - \hat{\psi}_i^o)}$$

wherein $\Psi_i^e$ represents the ith coefficient of an even LSF vector, and $\hat{\Psi}_i^o$ and $\hat{\Psi}_{i+1}^o$ represents the ith and (I+1)st coefficient of the odd vector found by adding the coefficients of the table entry identified by the quantized value of the odd LSF vector to the normalized speaker vector coefficients. The normalized even vector is then quantized using the 10 bit codebook and conventional MSE technique to find the best table entry. The resulting quantized even and odd LSF vectors (hereinafter generally referred to as just quantized LSF vectors) are further manipulated to further reduce the number of bits used to encode the voice message, while still maintaining satisfactory voice quality.

The unique speaker normalizing process reduces the variation in values of the vectors that must be quantized, allowing higher quality encoding while storing fewer quantized values in the spectral codebook than needed with prior art techniques.

5.7. Dynamic Segmentation

5.7.1. Overview

Dynamic segmentation is performed by the Dynamic Segmentation function 490 to minimize the amount of spectral information that is to be transmitted. This function is done only for vocoding rates 1 and 2. It will be appreciated that the voiced frames and unvoiced frames are independent of each other since different code books are used to quantize the LSF vectors of each type, and the resulting quantized vectors have different bit lengths. Each iteration performed by the Dynamic Segmentation function 490 is based on a sequence of consecutive frames that comprises only voiced or unvoiced frames taken from the sequence of all speech frames. As a next step in reducing the amount of bits that are transmitted in the encoded message, these frames are dynamically segmented into groups of frames having 'Anchor' frames at the beginning and end of each group. The quantized values of the frames in the middle are not encoded and transmitted, instead, the values are determined by interpolation by the communication receiver 114. The middle frames are therefore referred to as 'Interpolated' frames.

Every time the Dynamic Segmentation function 490 is called, it buffers a predetermined number of frames of information in a Dynamic Segmentation frame buffer, which in this example holds 17 frames of information including LSF vectors, voicing decisions and band voicing vectors, starting each iteration after the first with a frame that was determined as a most optimum anchor frame by the most recently completed iteration. This frame is called the current anchor frame. The Dynamic Segmentation function 490 computes from the information from a plurality of these 17 frames a next anchor vector, $y_i$, which corresponds to a next anchor frame. These 17 frames correspond to an actual sequence of frames $\eta_x$ through $\eta_x+16$, wherein x is v when the sequence is a voice sequence and x is u when the sequence is an unvoiced sequence. For purposes of the examples used herein, the sequence is a voiced sequence. The functions described herein work the same way for both voiced and unvoiced frame sequences, although predetermined parameters used in the functions typically have different values. Once the next anchor vector and frame are determined, the frames in the buffer are shifted to the left until the information for the next anchor frame is shifted to the beginning of the buffer. During the next call to the Dynamic Segmentation function 490, the buffer is updated with data only for the remaining frames in the buffer that have become empty by the left shifting. At the conclusion of this step, the next anchor frame has become the current anchor frame for a new iteration of the process.

The determination of the next anchor vector and frame is generally based on an optimization technique that preferably uses a Location Adjustment function 2100 and alternatively uses a Magnitude Perturbation function 1800. In these functions, frames are tentatively selected as anchor frames and then a set of quantized Line Spectral Frequency (LSF) vectors between two of the tentatively selected anchor frames are replaced by a corresponding set of LSF vectors that are generated by interpolation ("interpolated LSFs"). Distortion measurements (also referred to as distance measurements) are made by comparing the coefficients of the set of interpolated LSF vectors and corresponding Linear Predictive Coefficients (LPCs) and making a calculation based on the differences determined from the comparisons. The distortion measurements are used to select best anchor frames from the tentative anchor frames. The type of distortion measurement used is a conventional weighted distortion metric based on inverse harmonic mean, as described by U.S. Pat. No. 5,682,462, entitled "Very low bit rate voice messaging system using variable rate backward search interpolation processing", issued to Huang et al. on Oct. 28, 1997, and incorporated herein by reference. Different distortion thresholds (i.e., predetermined distances) are used when encoding at vocoding rate 1 and vocoding rate 2, and for encoding voiced and unvoiced frames. As stated earlier, the LSF vectors for the interpolated frames are not encoded into the compressed message. Instead, the communication receiver 114 derives them by interpolating between the two anchor frames that precede and succeed the interpolated frames. The Magnitude Perturbation function 1800 is described first because it is simpler and some of the unique and conventional concepts also apply to the Location Adjustment function 2100.

5.7.2. Magnitude Perturbation

Figure 18:
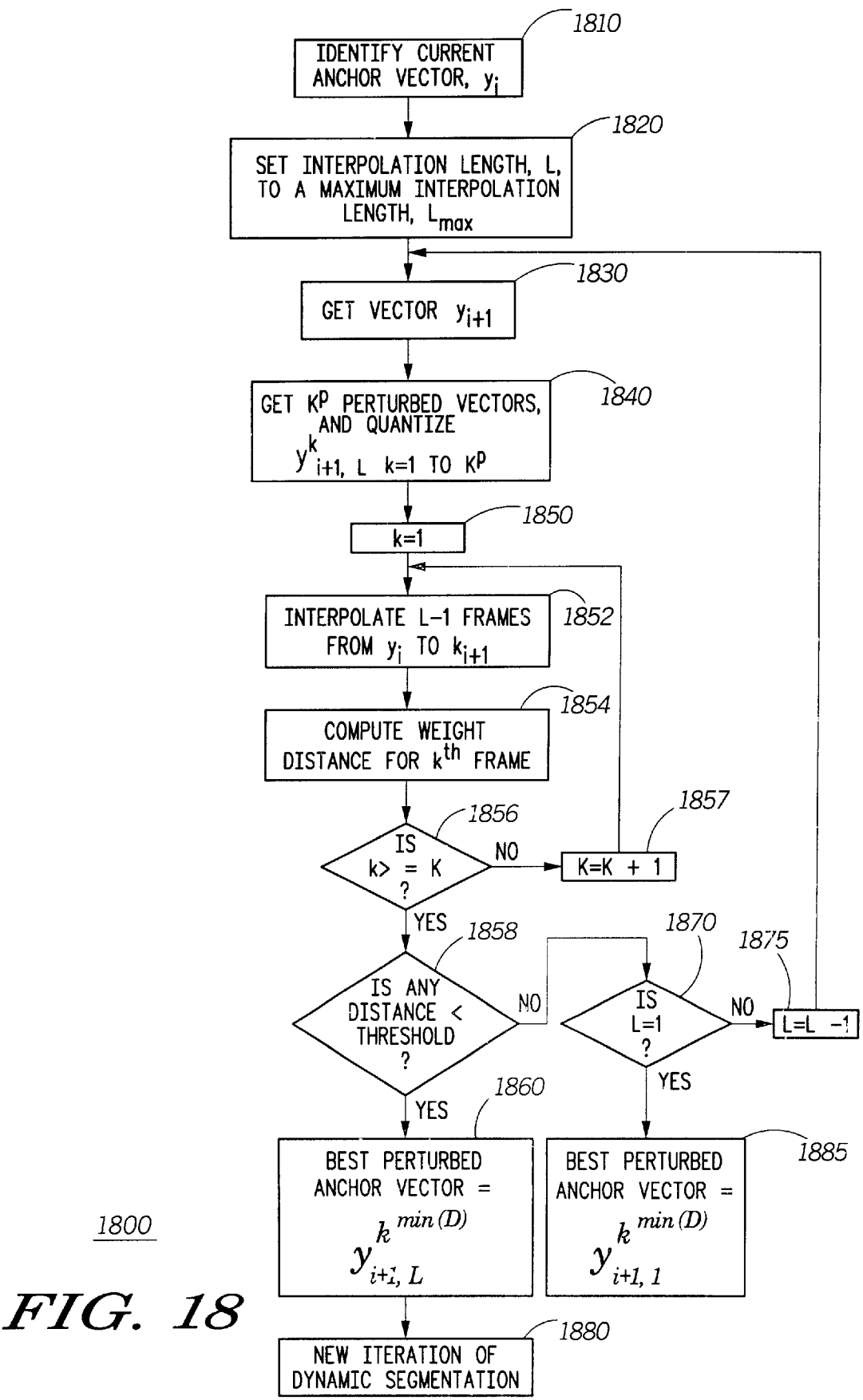
FIG. 18 is a flow chart that shows details of a Magnitude Perturbation function of the speech analyzer-encoder, in accordance with the preferred embodiment of the present invention.
Figure 19:
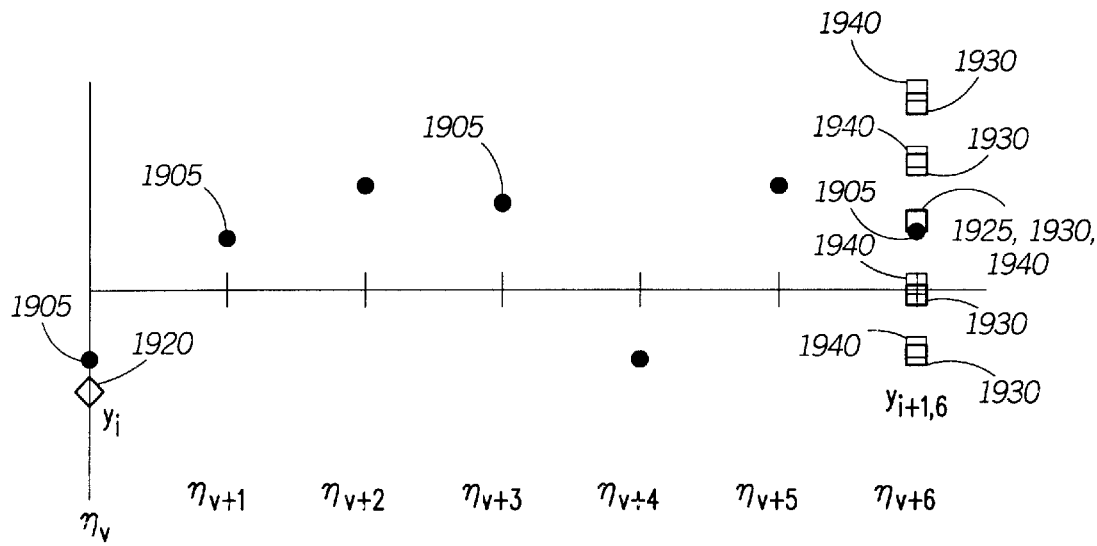
FIGS. 19 and 20 are plots of one dimensional speech parameter vectors that are used as examples of part of the Magnitude Perturbation function, in accordance with the preferred embodiment of the present invention.
Figure 20:
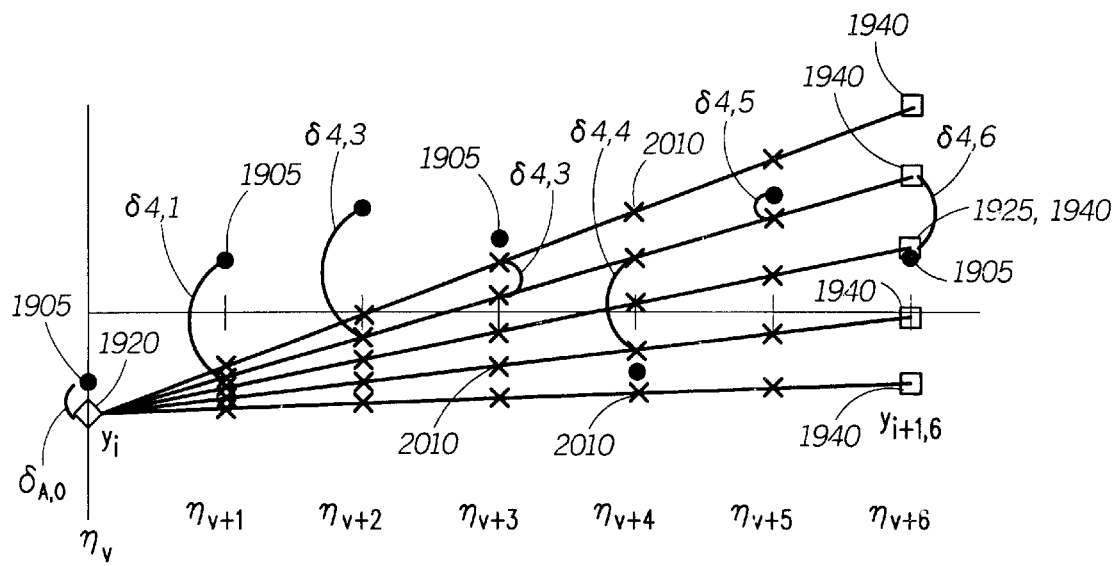

Referring to FIGS. 18, 19 and 20, a flow chart of the Magnitude Perturbation function 1800 is shown in FIG. 18, and vector diagrams of simplified examples of LSF vectors are shown in FIGS. 19 and 20, in accordance with an alternative embodiment of the present invention. After a particular voiced frame $\eta_v$ and a corresponding quantized LSF vector, $y_i$, have been identified at step 1810 (FIG. 18) as a current anchor frame and current anchor vector by a previous iteration of the Dynamic Segmentation function 490, an interpolation length, L, is set at step 1820 to a predetermined maximum interpolation length, $L_{MAX}$, which in this example is 8. At step 1830, a quantized LSF vector $y_{i+1,L}$ is identified as a target LSF vector, located at voiced frame $\eta_v+L$. The target LSF vector $y_{i+1,L}$ is then perturbed in magnitude by a plurality, $K^P$, of predetermined perturbation values at step 1840, producing a plurality, $K^P$, of perturbed LSF vectors (preferably including the target LSF vector). In this example, $K^P$ 32 5. In accordance with the preferred embodiment of the present invention, the perturbation values are obtained by adding predetermined LSF vectors of varying small magnitudes to the target LSF vector. In an alternative approach, the target LSF vector is perturbed by multiplying its coefficients by several different predetermined factors, such as 0.67, 0.8, 1, 1.25, and 1.5. Also at step 1840, a plurality of quantized perturbed LSF vectors that includes $K^P$ vectors, $y_{i+1,L}^k$ for k=1 to $K^P$, is generated by quantizing each perturbed LSF vector, in the manner described with reference to the Spectral Vector Quantization function 488. An example of the perturbation of the target LSF vector is shown in FIG. 19, which is a vector diagram that spans voice frames $\eta_v$ through $\eta_v+L$, wherein L has a value of 6 for this example. This value of 6 for L has been attained in this example after two iterations of step 1875 (described below). The current anchor vector, target LSF vector, and intervening LSF vectors in FIG. 19 are shown as one dimensional vectors for the sake of simplicity. The magnitude of the one coefficient 1905 for each LSF vector determined from speech samples (the current anchor vector, the intervening interpolated LSF vectors and the target LSF vector) is shown as a black circle in FIG. 19. It will be appreciated that there is a corresponding set of quantized LSF coefficients for each of these vectors as well, that are not shown in FIG. 19, except for the quantized value 1920 of the current anchor vector (shown as a diamond) and the quantized value 1925 of the target anchor vector (shown as a square). The magnitude of the one coefficient 1930 for each of the $K^P$ perturbed LSF vectors is shown as a dark outlined box. (The quantized value 1925 of the target anchor vector is also considered the magnitude 1930 of the one of the $K^P$ coefficients of the $K^P$ perturbed LSF vectors). The magnitude of the one coefficient 1940 for each quantized perturbed LSF vector for this example is shown as a light outlined box in FIG. 19. (The quantized value 1925 of the target anchor vector is therefore identical to a quantized value 1940 of a perturbed LSF vector).

At step 1850, k is initialized to 1 to select a first one of the plurality of quantized perturbed LSF vectors. Then coefficients of L−1 (5 in this example) interpolated LSF vectors that correspond to the L−1 frames between the current anchor frame $\eta_v$ and the target anchor frame $\eta_v+L$ are calculated at step 1852 by interpolating between the coefficients of the plurality of quantized perturbed LSF vectors, $y_{i+1,L}{}^k$, k=1 to $K^P$ and the coefficients of the current anchor vector. The interpolation is preferably a conventional linear interpolation between each coefficient of the plurality of quantized perturbed LSF vectors, $y_{i+1,L}{}^k$, k=1 to $K^P$, and the coefficients of the current anchor vector. For each value of k, a set of L interpolated LSF vectors is formed from the L−1 interpolated LSF vectors for the k th perturbation plus the quantized perturbed LSF vector, $y_{i+1,L}{}^k$ of the k th perturbation. A conventional weighted mean square estimate (WMSE) is calculated that is associated with the k th perturbation, at step 1854, using 1) differences between coefficients of the set of interpolated LSF vectors and the respective coefficients of the LPC vectors 476 associated with the intervening frames, 2) differences between coefficients of the (quantized) current vector and the respective coefficients of the LPC vector 476 associated with the current frame, and 3) and differences between coefficients of the (quantized, perturbed) target LSF vector and the respective coefficients of the LPC vector 476 associated with the target LSF vector, for corresponding frames. This WMSE is also referred to herein as the distance, $D_k$, for the k th perturbation. It will be appreciated that comparisons to other manifestations of the voice samples other than the LPC vectors 476 could be used for the comparison, such as the LSFs 471 or the normalized (but not quantized) LSFs, but with differing and generally less successful results. For this reason, the comparison can more generally be described as comparing coefficients of the interpolated vectors or the current anchor vector or target anchor vector to coefficients of corresponding sampled speech parameter vectors to determine the distance, $D_k$, and even more succinctly as comparing the interpolated vectors or the current anchor vector or target anchor vector to the corresponding sampled speech parameter vectors, to determine the distance $D_k$.

At step 1856, when k is not greater than $K^P$, k is incremented by 1 at step 1857 and another set of interpolated LSF vectors is determined, from which another distance, $D_k$, is generated. When k is greater than $K^P$ at step 1856, a plurality, $K^P$, of sets of interpolated LSF vectors and a plurality, $K^P$, of distances have been determined. FIG. 20 shows the linearly interpolated coefficients 2010 and the quantized perturbed coefficients 1940 of the plurality of sets of interpolated LSF vectors corresponding to k=1 to 5 and frames $\eta_v$ through $\eta_v+6$ for the example of FIG. 19. The values $\delta_{4,0}$ through $\delta_{4,6}$ shown in FIG. 20 represent differences between the coefficients 2010, 1940 of each of the set of interpolated LSF vectors and the respective coefficient 1905 of each of the respective LPC vector 476 that had been determined by the LP Spectral Fitting function 475, for k=4. In this example, there are 35 of these $\delta_{x,y}$ values that are used in the calculation of the 6 distances.

When k is greater than $K^P$ at step 1856, a test is performed at step 1858 to determine whether the plurality $K^P$ of distances meet a predetermined distortion criteria. In accordance with the alternative embodiment of the present invention, the distortion criteria is whether at least one of the distances is less than a predetermined distance threshold, $D_{THRESH}$. When the distortion criteria is not met at step 1858, and when L>1 at step 1870, then L is decremented by 1 at step 1875 and another target LSF vector is selected at step 1830, and another iteration is performed. When the distortion criteria is met at step 1858, then the quantized perturbed LSF vector for which the distance is a minimum, $y_{i+1,L}^{k^{min(D)}}$, at the target anchor frame $\eta_v+L$ is chosen at step 1860 as a best perturbed anchor vector $y_{i+1}^P$, and the frame is the best perturbed anchor frame $\eta_v+L^P$. When L=1 at step 1870, then the quantized perturbed LSF vector for which the distance is a minimum, $y_{i+1,1}^{k^{min(D)}}$ at frame $\eta_v+1$ is chosen at step 1885 as the best perturbed anchor vector, $y_{i+1}^P$ and the frame $\eta_v+1$ is the best perturbed anchor frame. The Dynamic Segmentation function 490 is continued at step 1880 by shifting the information for the best perturbed anchor frame into the first position of the Dynamic Segmentation frame buffer and starting a new iteration of the Dynamic Segmentation function 490.

It will be appreciated that the above described Magnitude Perturbation function 1800 can be modified to work in a forward tracking mode by making the first selection of the target anchor frame at $\eta_v+1$ and increasing the value of L as long as a distortion criteria is met, or until some maximum value of L occurs. The distortion criteria is whether none of the distances are less than the threshold value, and when this occurs, the Magnitude Perturbation function determines the best perturbed anchor value from a determination of the perturbed vector having the smallest distance in the previous iteration. Much the same benefits are achieved, but the backward tracking mode is simpler.

It will be further appreciated that the above described Magnitude Perturbation function could be extended to include $K^P$ perturbations of both the current anchor vector and the target LSF vector, for which there would be a plurality, $(K^P)^2$, of distances to compute, and that when a predetermined distortion criteria was met, then a new current vector and a best perturbed LSF vector would be identified by the pair of new current and best perturbed LSF vectors having the minimum distance.

5.7.3. Location Adjustment

Figure 21:
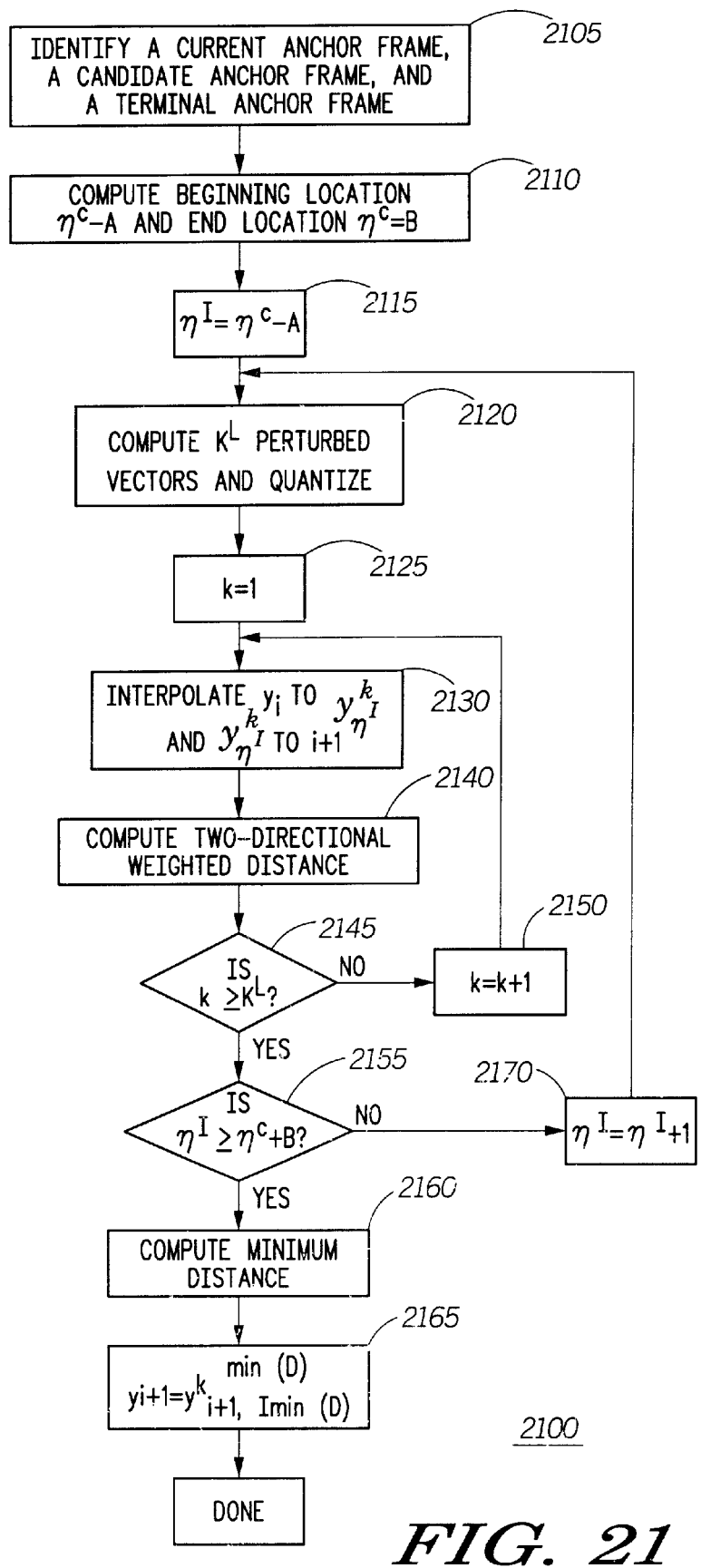
FIG. 21 is a flow chart that shows details of a Location Adjustment function of the speech analyzer-encoder, in accordance with the preferred embodiment of the present invention.

Referring to FIG. 21, a flow chart of the Location Adjustment function 2100 is shown, in accordance with the preferred embodiment of the present invention. At step 2105, a current anchor frame, $\eta_v$, a candidate anchor frame, $\eta_v^C$, and a terminal anchor frame, $\eta_v^T$, are identified. The current anchor frame is preferably identified as the current anchor frame $\eta_v$ that was used in the most recently completed iteration of the Location Adjustment function 2100. The candidate and terminal anchor frames are preferably identified using a conventional method in which a distance is calculated for a target vector and intervening interpolated vectors. The target vector is selected in a reverse tracking mode until the calculated distance is less than a predetermined distance, but it will be appreciated that other methods could be used to identify these frames for the Location Adjustment function 2100. For example, the terminal frame could be identified as $\eta_v+2L_{MAX}$, or the Magnitude Perturbation function could be performed to select the candidate anchor frame. The terminal vector is identified as $y_{i+2}$. After the current, candidate, and terminal anchor frames are identified, a beginning frame location is identified at a predetermined number, A, of frames before the candidate frame, and an ending frame is identified at a predetermined number, B, frames after the candidate frame, at step 2110. The values of A and B are 1 and 2 in this example. Another way to state this is that a subset of M quantized speech parameter vectors are selected about and including the candidate vector, and for which M=A+B+1. Then at step 2115 a frame index, $\eta_v^I$, is initialized to $\eta_v^C-A$. At step 2120 the magnitude of the quantized index vector, $y_{\eta^I}$ at $\eta_v^I$ is perturbed by $K^L$ predetermined values, generating a plurality, $K^L$, of perturbed LSF vectors, which are then quantized, generating a plurality, $K^L$, of quantized, perturbed index vectors, $y_\eta^k$, k=1 to $K^L$. This is done in a manner equivalent to that described above with reference to FIG. 18, step 1840. At step 2125, k is initialized to 1 to select a first one of the plurality of quantized perturbed LSF vectors. At step 2130, interpolated LSF vectors are generated between frames $\eta_v$ and $\eta_v^I$, and between frames $\eta_v^I$ and $\eta_v^T$. The interpolations are linear interpolations of the vector coefficients between the current vector, $y_{i+2}$, and the index vector, $y_\eta^k$, and also between the index vector, $y_\eta^k$, and the terminal vector, $y_{i+2}$, which are derived as described with reference to step 1852 of FIG. 18. A preceding weighted mean square estimate (WMSE), or preceding distance, is calculated at step 2140 using the current anchor vector, $y_i$, the index vector, $y_\eta^k$, and the intervening interpolated LSF vectors, in much the same manner as described with reference to step 1854 of FIG. 18. A succeeding weighted mean square estimate (WMSE), or succeeding distance is also calculated at step 2140 using the terminal anchor vector, $y_{i+2}$, the index vector, $y_\eta^k$, and the intervening interpolated LSF vectors. The preceding and succeeding distances are added together at step 2140, generating a two-directional distance, $D_{k,I}$ for the k th perturbation of the index vector. It will be appreciated that comparisons to other manifestations of the voice samples other than the LPC vectors 476 could be used for the comparison, such as the LSFs 471 or the normalized (but not quantized) LSFs, but with differing and generally less successful results. For this reason, the comparison can more generally be described as comparing coefficients of the interpolated vectors (or the current, or index, or terminal anchor vector) to coefficients of corresponding sampled speech parameter vectors to determine the two-directional distance, $D_{k,I}$, and even more succinctly as comparing the interpolated vectors (or the current, or index, or terminal anchor vectors) to the corresponding sampled speech parameter vectors, to determine the two-directional distance $D_{k,I}$. When k is not $\geq K^L$ at step 2145, k is incremented by 1 at step 2150 and another two-directional distance, $D_{k,I}$, is determined at steps 2130 and 2140 for the index vector. When $k \geq K^L$ at step 2145, then a test is made at step 2155 to determine whether $\eta' \geq \eta^C + B$, and when it is not, $\eta'$ is incremented by 1 and another index vector is perturbed and another set of $K^L$ two-directional distances, $D_{K,I}$, are determined. When $\eta' \geq \eta^C + B$, at step 2155, then the determination of $K^L * M$ two-directional distances, $D_{K^L,M}$, is completed. In one alternative embodiment, the comparisons for the current and terminal anchors are not used in the determination of each two-directional distance. In another alternative embodiment, preceding and succeeding distances are not determined individually; instead each two-directional distance is determined by using a comparison of each quantized, perturbed LSF vector and the related preceding interpolated vectors and the related succeeding interpolated vectors to their corresponding LPC vectors 476 (thus, only one comparison is made of each quantized, perturbed LSF vector to its corresponding LPC vector 476 in each two-directional distance.

Figure 22:
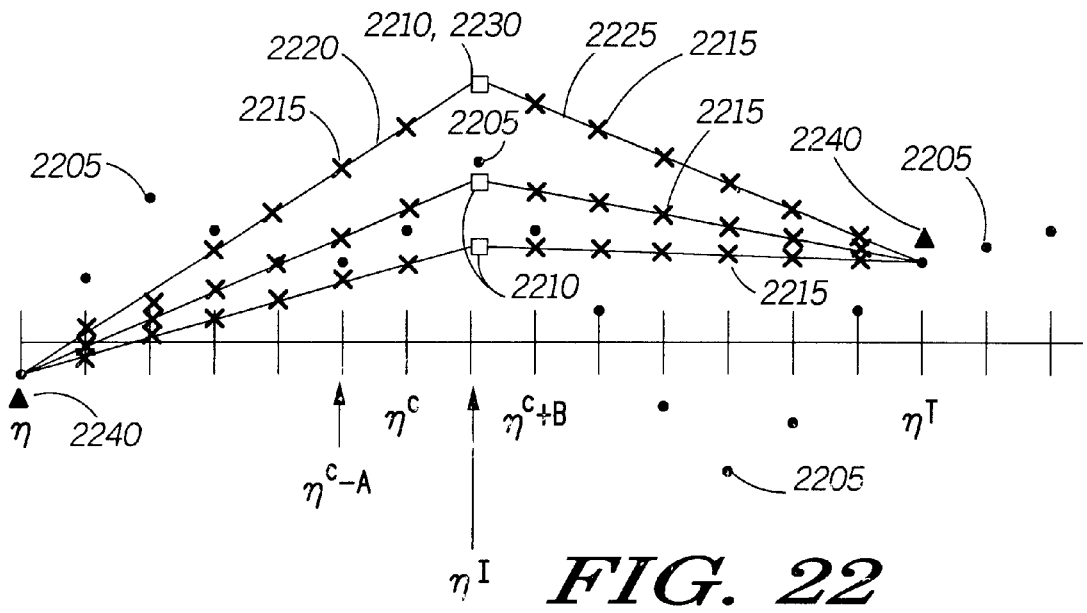
FIG. 22 is a plot of one dimensional speech parameter vectors that are used as an example of a part of the Location Adjustment function, in accordance with the preferred embodiment of the present invention.

Referring to FIG. 22, a vector diagram is shown of a simplified example of LSF vectors during the Location Adjustment function 2100 in accordance with the preferred embodiment of the present invention. The candidate frame, $\eta_v^C$, is located 6 frames after $\eta_v$, A=1, B=2, $K^L$=3, $\eta_v^T = \eta_v + 14$, and $\eta'$ has been incremented twice. The magnitudes 2205 of the one coefficient of each one-dimensional LPC vector stored in the 17-frame Dynamic Segmentation frame buffer are shown as black circles. The coefficients 2210 of the three quantized, perturbed index vectors are shown as boxes and the coefficients 2215 of the intervening vectors are shown as crosses. The coefficients 2240 of the current and terminal anchor vectors are shown as triangles. The coefficients 2215 on the line 2220, the coefficient 2230, and the current anchor vector coefficient 2240 are used with their corresponding coefficients 2205 to calculate the preceding distance for the $3^{rd}$ perturbation of the index vector at the position illustrated in FIG. 2200; the coefficients 2215 on the line 2225, the coefficient 2230, and the terminal anchor vector coefficient 2240 are used with their corresponding coefficients 2205 to calculate the succeeding distance for the $3^{rd}$ perturbation of the index vector at the position illustrated in FIG. 2200. These preceding and succeeding distances are added together to derive the two-directional distance for the $3^{rd}$ perturbation of the index vector at the position illustrated in FIG. 2000. There are a total of 4*3=12 distances determined by the Location Adjustment function in this example.

At step 2160 (FIG. 21), the minimum distance, $\min(D_{K^L,M})$, is determined, and the quantized, perturbed index vector, $y_{i+1,I^{min(D)}}^{k^{min(D)}}$ that generated that distance is selected at step 2165 as the next vector, $y_{i+1}$. The Location Adjustment function 2100 is completed, and the Dynamic Segmentation function 490 is completed by shifting the information for the next vector into the first position of the Dynamic Segmentation frame buffer and starting new iteration of the Dynamic Segmentation function 490.

It will be appreciated that both the Magnitude Perturbation function 1800 and the Location Adjustment function 2100 provide determinations of anchor vectors that are superior to prior art methods in which the quantized speech parameter vectors are tested without using magnitude perturbation, because a weighted distance is typically found by using these unique methods that is smaller than that found by prior art methods, without requiring a lesser amount of interpolated frames, on the average, between anchor frames.

5.8. Harmonic Residue Quantization

Harmonic Residue Quantization is performed by the Spectral VQ function 488. The harmonic residues are used to provide some additional detail about 5 of the highest harmonic magnitudes in the voiced frames of speech coded at vocoding rate 2 and vocoding rate 3. The interpolated/quantized LSFs are first converted back into LP coefficients. The LP spectrum is then evaluated at the $N_h$ harmonics of that frame to determine LP spectrum magnitudes, $A_n^I$. The original harmonic magnitudes for that frame are then interpolated to obtain values at the same frequency locations as $A_n^I$. The difference is computed at the harmonics of the interpolated/quantized spectrum which are the 5 largest in magnitude and is then quantized using VQ. Quantization for vocoding rate 2 and 3 uses an 8-bit codebook.

5.9. Quantization of Excitation Parameters

Quantization of excitation parameters, namely pitch and gain, are done by buffering the parameters over several frames.

In the case of pitch quantization, all rates follow the same quantization procedure. The pitch values for four consecutive voiced frames are buffered and then vector quantized.

In the case of gain, for rates 2 and 3, the half frame gain parameters are buffered over is four consecutive frames and then vector quantized. In the rate 1 mode the gain parameters are buffered over 8 frames, since there is only one gain value per frame, and then vector quantized. The parameters are buffered irrespective of whether the frames are voiced or unvoiced.

The quantization process is explained in more detail in the following sections.

5.9.1. Pitch Quantization

Pitch quantization is performed by the Vector Quantization function 482 on blocks of four pitch values. Since pitch values exist only for voiced frames, the pitch values have to be buffered up by ignoring unvoiced frames which might fall in between voiced frames. Let $f^b$ be the pitch buffer and let $G^f$ be a corresponding buffer containing gain values. The buffering of the pitch values is done as follows.

Let $\eta$ be the present frame number and let the pitch buffer, $f^b$, be empty.

```
Initialize j=0
for i=0;i<η^L - η;i++
    if v[η + i] = 1
        f_j^b = f_0[η + i]
        G^f_{2j} = G^L[η + i]
        G^f_{2j+1} = G^R[η + i]
        j = j + 1
    end
    if j = 4
        break
    end
end
```

Once the pitch values have been buffered to form a pitch block, a weight vector is computed as follows $$w_i^p = \log\left(\frac{(G_{2i}^f)^2 + (G_{2i+1}^f)^2}{\max((G_{2i}^f)^2 + (G_{2i+1}^f)^2)}\right) \text{ for } 0 \leq i < 4$$

A mean value of the pitch block normalized by the long term pitch average is computed as follows $$\bar{f}^b = \frac{1}{4\bar{f}_0} \sum_{i=0}^{3} f_i^b$$

Once the mean value of the normalized pitch block is obtained, it is quantized. Let $\zeta^p$ be the pitch mean codebook with 16 quantized levels. The quantized index representing $\bar{f}^b$ is obtained as follows.

$$\tilde{\Theta}^p = \underset{0 \leq n < 16}{\operatorname{argmax}}\left((\bar{f}^b - \zeta_n^p)^2\right)$$

The index $\Theta^p$ represents the quantized value of the mean value of the normalized pitch block and it is associated with the frame representing the first element of the pitch block.

Once the mean value is quantized, the pitch block is normalized by the quantized mean value so as to obtain the pitch shape block. This is done as follows $$f_i^s = \frac{f_i^b}{\zeta_{\Theta^p}^p} \text{ for } 0 \leq i < 4$$

The pitch shape block, $f^s$, is now quantized by first weighting the pitch shape block vector with the weight vector $w^p$, determined as shown above by an equation in this section, and comparing the resulting vector with all 512 entries in the pitch shape codebook $\zeta^p$ in a mean square error sense.

The quantized index representing $f^s$ is obtained as follows.

$$\Theta^p = \underset{0 \leq n < 512}{\operatorname{argmax}}\left(((f^s - \zeta_n^p)^T w^p)^2\right)$$

The index $\Theta^p$ represents the quantized value of the pitch shape block and it is associated with the frame representing the first element of the pitch shape block.

5.9.2. Gain Quantization

Gain quantization is performed by the Vector Quantizing function 484 on a block of four gain values. For rates 2 and 3, the half frame gain parameters are buffered over two consecutive frames and then vector quantized. In the rate 1 mode the gain parameters are buffered over four frames, since there is only one gain value per frame, and then vector quantized. The parameters are buffered irrespective of whether the frames are voiced or unvoiced.

Let $G^b$ be a block of the logarithm of four gain values and is obtained as follows. Let the present frame be $\eta$ and let the gain values till the frame $\eta-1$ be already quantized. $G^b$ is now obtained as follows.

```
Initialize: j=0
for i=0;i>η^L = η;i++
    if ℜ = 1
        G_j^b = log(G^L[η + i])
        j = j + 1
    end
    if ℜ > 1
        G_{2j}^b = log(G^L(η + i])
        G_{2j+1}^b = log(G^R[η + i])
        j = j + 1
    end
    if ℜ = 1 & j = 4
        break
    else if ℜ > 1 & j = 2
        break
    end
end
```

Let $w^g$ be a weight vector which is used to weight the gain values before quantization $$w_i^g = \begin{cases} 1.0 & \text{if } \max_{0 \leq j < 4}(G_j^b) < 1.6 \min_{0 \leq j < 4}(G_i^b) \\ \dfrac{G_i^b}{\max\limits_{0 \leq j < 4}(G_j^b)} & \text{otherwise} \end{cases} \text{ for } 0 \leq i < 4$$

The mean value of the gain block is computed as follows $$\bar{G}^b = \frac{1}{4} \sum_{i=0}^{4} G_i^b$$

Once the mean value of the gain block is obtained, it is quantized. Let $\zeta^g$ be the gain mean codebook with 16 quantized levels. The quantized index representing $\bar{G}^b$ is obtained as follows.

$$\Theta^g = \underset{0 \leq n < 16}{\operatorname{argmax}}\left((\bar{G}^b - \zeta_n^g)^2\right)$$

The index $\Theta^g$ represents the quantized value of the mean value of the gain block and it is associated with the frame representing the first element of the gain block.

Once the mean value is quantized, the gain block is normalized by the quantized mean value so as to obtain the gain shape block. This is done as follows $$G_i^s = \frac{G_i^b}{\zeta_{\Theta}^g} \quad \text{for } 0 \leq i < 4$$

The gain shape block, $G^s$, is now quantized by first weighting the gain shape block vector with the weight vector $W^g$, determined as shown above by an equation in this section, and comparing the resulting vector with all 512 entries in the gain shape codebook $\zeta^g$ in a mean square error sense.

The quantized index representing $G^s$ is obtained as follows.

$$\Theta^g = \underset{0 \leq n < 512}{\mathrm{argmax}}\left(((G^s - \zeta_n^g)^T w^g)^2\right)$$

The index $\Theta^g$ represents the quantized value of the gain shape block and it is associated with the frame representing the first element of the gain shape block.

5.10. Post-processing

The Post Processing function 492 eliminates excessive non-speech activity at the beginning, middle, and end of the message, in processing stage 4. This is described in the sections below, with reference to FIG. 23 which shows the function in flow chart format, in accordance with the preferred embodiment of the present invention.

5.10.1. End-pointing

The process of eliminating excessive non-speech activity at the beginning and end of a message is called end-pointing. This is done in a conventional manner by the end-pointing function 2310, using the voicing parameters for the frames.

Next excessive non-speech activity within the message is also eliminated.

5.10.2. Non-speech Activity Reduction

Non-speech activity within the message is reduced prior to transmission of the encoded message, to increase transmission efficiency, by a Non-Speech Activity Reduction function comprising all steps (steps 2320–2365) of the Post Processing function 492 except step 2310. Since the gain values are quantized in blocks of 2 or 4 frames, the non-speech activity reduction is done at the gain block boundaries, by eliminating one or more contiguous gain blocks.

The average unvoiced energy estimation value of the message is first determined by an Unvoiced Energy determination function at step 2320 that uses only the unvoiced frames to determine the average unvoiced energy estimation value, as follows:

$$G^U = \frac{1}{2N^u} \sum_{i=\eta^o}^{\eta^L} (G^L[i] + G^R[i])\bar{v}[i] \quad \text{where}$$

$$N^u = \sum_{i=\eta^o}^{\eta^L} \bar{v}[i]$$

and $$\bar{v}[i] = \begin{cases} 1 & \text{if } v[i] = 0 \\ 0 & \text{if } v[i] = 1 \end{cases}$$

The non-speech activity is now eliminated as follows. First sets of contiguous unvoiced frames, otherwise referred to as an unvoiced bursts, are detected by an Unvoiced Burst Detection function at step 2330. Then a beginning and ending frame of the unvoiced burst are identified, and if the number of unvoiced frames, $N^{UV}$, in the unvoiced burst is determined by a Unvoiced Burst Length function at step 2335 to exceed a pre-determined duration represented by $N^S$ unvoiced frames, that unvoiced burst is considered for non-speech activity elimination. When the number of unvoiced frames, $N^{UV}$, in an unvoiced burst is determined not to exceed $N^S$ by the Unvoiced Burst Length function, the analysis of the current unvoiced burst is ended and an analysis of the next unvoiced burst is initiated at step 2330. When a candidate unvoiced burst is considered for non-speech activity reduction, frames of the unvoiced burst earlier than and later than a middle frame are tested to identify whether any earlier frame and whether any later frame has an energy estimation value, $G^D$, that exceeds a first predetermined energy threshold or a second, lower, predetermined energy threshold, which in this example are $G^u$ and ½ $G^u$, respectively. The predetermined thresholds are predetermined fractions of the average unvoiced energy estimation value, $G^u$. These determinations are made by an Earlier First Gain function at step 2336, an Earlier Second Gain function at step 2337, a Later First Gain function at step 2338, and a Later Second Gain function at step 2339. One of the Adjustment functions at steps 2341–2343 then adjusts value $1^I$ to a first, second or third adjustment value according to the determination made at steps 2335, 2337, and one of the Adjustment functions 2344–2346 adjusts value $1^{II}$ to the first, second or third adjustment value according to the determination made at steps 2334, 2336. The adjustment values are preferably 0, 1, and 2, with greater values being associated with larger predetermined energy thresholds. A total adjustment value, $1^{TADJ}$, is the sum of $1^I$ and $1^{II}$. A Range function then determines at step 2350 whether $N^{UV}$ exceeds a total relaxation period $N^R$ that is equal to the sum of an adjusted beginning relaxation period having $N^B + 1^I$ frames, and an adjusted ending relaxation period having $N^E + 1^{II}$ frames, in which $N^B$ and $N^E$ represent predetermined minimum beginning and ending relaxation periods, respectively, and $N^S \geq N^B + N^E$. (In the preferred embodiment, $N^S = N^B + N^E$.) This can be stated alternatively as determining whether $N^{UV}$ exceeds $N^B + N^E$ by $1^{TADJ}$. The frames of the adjusted beginning relaxation period immediately succeed a sequence of voiced frames that immediately preceded the unvoiced burst, and the frames of the adjusted ending relaxation period immediately preceded a sequence of voiced frames that immediately succeed the unvoiced burst. When $N^{UV}$ exceeds the total relaxation period $N^R$ at step 2350, the range of frames that occur after the adjusted beginning relaxation period, up to the beginning of the adjusted ending relaxation period are identified as non-speech activity frames by the Non-Speech Activity Range Set function at step 2355. The range of the non-speech activity frames is further adjusted by Non-Speech Activity Gain Boundary Adjustment function at step 2360 to begin and end on gain quantization block boundaries and all the frames in the adjusted non-speech activity range are eliminated by the Non-Speech Activity Frame Removal function at step 2365. An analysis of a next unvoiced burst is then initiated at step 2330.

When the number of unvoiced frames in the unvoiced burst does not exceed the total relaxation period at step 2350, an analysis of next unvoiced burst is initiated at step 2330.

It will be appreciated that the identification of the non-speech activity portion of the unvoiced burst can be summarized as follows:

1) Identifying the non-speech activity portion as those frames between the adjusted beginning relaxation period of $N^B+1'$ unvoiced frames and the adjusted ending relaxation period of $N^E+1''$ unvoiced frames, wherein $1'$ and $1''$ are determined based on an energy estimation value of at least one of the unvoiced frames in the unvoiced burst.

2) Re-identifying the non-speech activity portion to have a beginning and ending co-incident with gain quantization block boundaries.

It will be further appreciated that fewer or more thresholds of gain could alternatively be used, such as one threshold or three thresholds, instead of two, and by replacing steps 2336–2346 with fewer or more steps. Letting the maximum value of $1'$ and $1''$ be represented by $1'^{MAX}$ and $1''^{MAX}$, respectively, it will be appreciated that a non-speech activity portion of the unvoiced frames are removed when the number of unvoiced frames is greater than a predetermined number ($N^B+1'^{MAX}+N^E+1''^{MAX}$). The non-speech activity portion includes at least those frames between ($N^B+1'^{MAX}$) frames immediately succeeding a sequence of immediately preceding voiced frames and ($N^E+1''^{MAX}$) frames immediately preceding a sequence of immediately succeeding voiced frames.

This process is performed on all the unvoiced bursts in the encoded message. This is done as a two step process, where the frames to be eliminated are determined in the first pass and during the second pass they are eliminated. The pseudocode given below describes this process in detail.

Initialization: $N^S=11$, $N^B=6$, $N^E=5$, $1'=0$, $1''=0$ $\Im^B=0$, $\Im^S=0$ and $\Im^E$ be a vector of binary decisions used to determine whether a particular speech frame is to be eliminated or not.

```
for i=η⁰;i<η^L;i++
    if v[i] = 0 & v[i - 1] = 1
        η^S = i
        ℑ^S = 1
    end
    if ℑ^S = 1 & (v[i] = 1 & v[i - 1] = 0)
        η^E = i - 1
        ℑ^B = 1
        ℑ^S = 0
    end
    if ℑ^B = 1
        if η^E - η^S > N^S
```

$$N^M = \left\lfloor \frac{\eta^E - \eta^S}{2} \right\rfloor$$

$$1^1 = 0$$

The following code determines the beginning frame that needs to be eliminated in the burst.

$$\eta^D = \eta^S + N^M$$
while $\eta^D > \eta^S + N^B$
    if $\dfrac{G^L[\eta^D] + G^R[\eta^D]}{2} > G^u$ $1^1 = 2$
        break
    else if $\dfrac{G^L[\eta^D] + G^R[\eta^D]}{2} > 0.5G^u$ $1^1 = 1$
    else -continued $$\eta^D = \eta^D - 1$$
    end
$\rho^S = \eta^S + N^B + 1^1$ The parameter $\rho^S$ is the beginning frame to be eliminated. This is further refined later to fall on a gain quantization block boundary.

The following code determines the ending frame that needs to be eliminated in the burst.

$$1^{II} = 0$$
$\eta^D = \eta^S + N^M$
while $\eta^D < \eta^E - N^E$
    if $\dfrac{G^L[\eta^D] + G^R[\eta^D]}{2} > G^u$ $1^{II} = 2$
        break
    else if $\dfrac{G^L[\eta^D] + G^R[\eta^D]}{2} > 0.5G^u$ $1^{II} = 1$
    else
        $\eta^D = \eta^D + 1$
    end
end
$\rho^E = \eta^E - N^E - 1^{II}$ The parameter $\rho^E$ is the ending frame to be eliminated. This is further refined later to fall on a gain quantization block boundary.

The following lines of code adjust the beginning and ending frames to be eliminated to fall on a gain quantization block boundary. This is done by checking the status of the gain shape index $\Theta^g$

```
if η^E - η^S ≥ N^S + 1^1 + 1^{11}
    while Θ^g[ρ^S] < 0
        ρ^S = ρ^S + 1
    end
    if Θ^g[ρ^E] < 0
        ρ^E = ρ^E - 1
    else
        while Θ^g[ρ^E] < 0
            ρ^E = ρ^E - 1
        end
        ρ^E = ρ^E - 1
    end
    if ρ^E - ρ^S > 0
        for i = ρ^S;i≤ρ^E;i++
            ℑ^E[i] = 1
        end
        ℑ^E[ρ^S - 1] = 1
        ℑ^E[ρ^E + 1] = 1
    end
end
ℑ^B = 0
end
end
```

The frames where the erase flag $\Im^E$ are marked 1 are discarded during the protocol packing process, the header information is correspondingly reduced. It will be appreciated that this process shortens the voice message that is reconstructed by decoding and synthesis.

In an alternative embodiment, after the non-speech activity frames are removed, the quantity of the non-speech activity frames is quantized using the same codebook used by the Quantizing function 480 that quantizes unvoiced LSF vectors, but having a subset of the indices for the codebook reserved, each reserved index indicating a predetermined (integral) number of non-speech activity frames that are removed. More than one such quantized values may be needed to represent a large range of non-speech activity. The resulting one or more quantized values are then stored in the Bit Buffer 499 and sent in the encoded message. When a message encoded in accordance with this alternative embodiment of the present invention is decoded, the non-speech frames are reinserted as silence, providing a somewhat more natural sounding message, but requiring a somewhat higher bit rate.

This alternative embodiment can be stated to comprise the following step in the speech encoder 107: Replace the removed non-speech activity portion with one or more quantized values that indicate the number of non-voice speech frames in the removed non-speech activity portion. In this step, the quantized value is an index of a subset of indices to a codebook. Indices in the subset indicate integer values of unvoiced frames, and the subset of indices is in a codebook that also includes templates of unvoiced speech parameter vectors.

This alternative embodiment can also be stated to comprise the following steps which are performed by a decoder-synthesizer in the communication receiver 114:

1) Recovering a quantized value indicating a number of non-speech activity frames removed from the encoded low bit rate digital voice message.

2) Inserting the same number of pause frames. The quantized pause frames comprise a predetermined quantized value that indicates a corresponding predetermined speech parameter vector template suitable for non-speech periods of a voice message.

Figure 24:
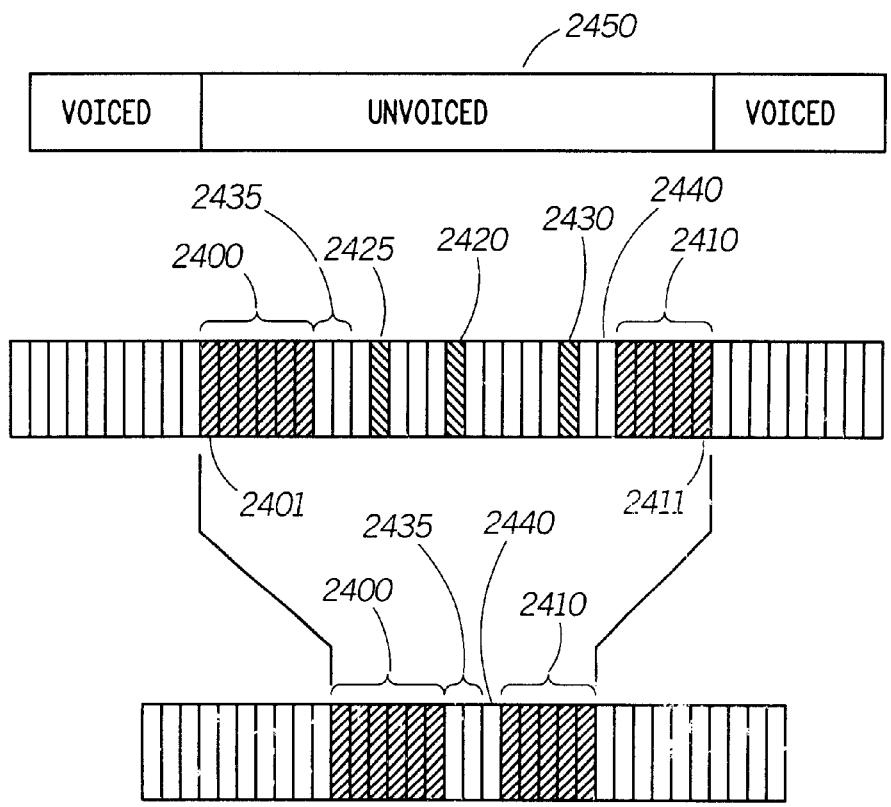
FIG. 24 is a timing diagram that shows an exemplary sequence of frames of a voice message being processed by the Non-Speech Activity Reduction function, in accordance with the preferred embodiment of the present invention.
Figure 23:
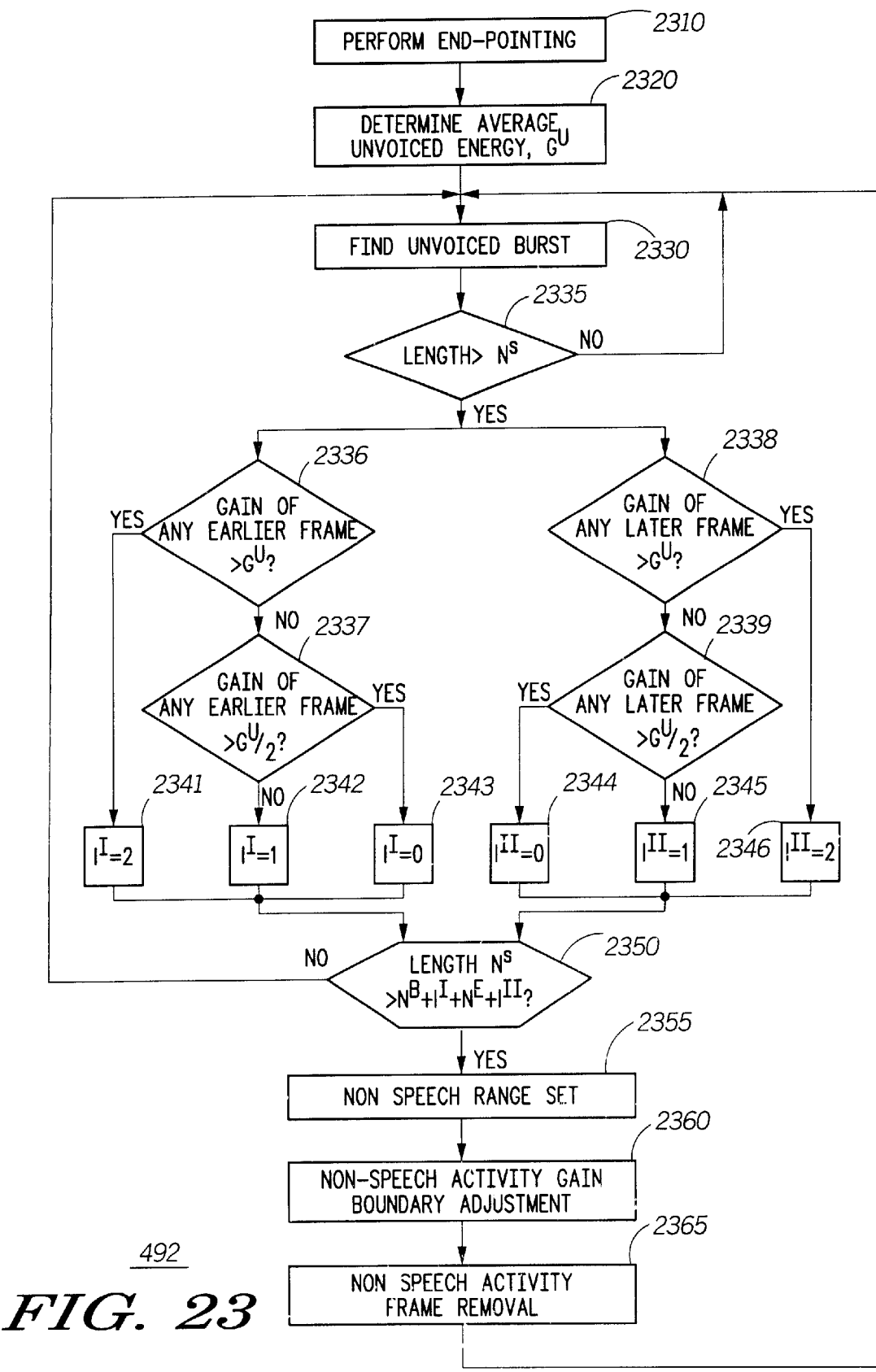
FIG. 23 is a flow chart that shows details of a Non-Speech Activity Reduction function of the speech analyzer-encoder, in accordance with the preferred embodiment of the present invention.

Referring to FIG. 24, a timing diagram is shown that represents an exemplary sequence of frames of a voice message being processed by the Post Processing function 492, in accordance with the preferred embodiment of the present invention. This is an example in which an unvoiced burst 2450 starts at a beginning frame 2401 and ends at ending frame 211, showing a minimum beginning relaxation period $N^B$ 2400, a minimum ending relaxation period $N^E$ 2410, and middle frame 2420. The energy estimation value of frame 2425 exceeds G", so $l'$ is set to 2 frames 2435. The energy estimation value of frame 2420 exceeds ½ G", so $l''$ is set to 1 frame 2440. After non-speech activity reduction, the frames 2400, 2435, 2440, 2410 that are encoded comprise $N^B+l'+N^E+l''$ frames; in accordance with the preferred embodiment of the present invention, the intervening frames are eliminated from the message. In accordance with the alternative embodiment of the present invention described above in this section, the quantity of intervening frames that have been eliminated (13) is indicated by one or more quantized quantity indicator (e.g., indicators for 8, 4, and 1 frames).

5.11. Protocol Packing and Message Transfer

When the non speech activity reduction is completed, processing stage 5 starts. Two functions are performed in processing stage 5: a Protocol Packing function 494 and an Encoder Message Transfer function 495. The Protocol Packing function 494 accomplishes a packing of the bit stream into a unique and very efficient low bit rate digital message format that optimizes the number of bits used to transfer the model parameter information to the communication receiver 114. This is followed by two message transfer functions, the Encoder Message Transfer function 496 (FIGS. 4, 35) in the speech analyzer-encoder 107 and the Decoder Message Transfer function 3600 (FIG. 36) in the speech decoder-synthesizer 116 of the communication receiver 114, by which the digital message is transferred to the communication receiver 114 using a unique technique that accomplishes the transfer of the message using the lowest bit rate that provides satisfactory decoding and synthesis when a channel is operating near its capacity.

5.11.1. Protocol Packing 5.11.1.1. Introduction

The message format follows an important principal of the vocoder model: speech is segmented and analyzed/synthesized in fixed length intervals (or frames ) 25 ms in length. Each of these frames is represented by a set of model parameters. In general, the model parameters are coded by means of integer indices which are coded as binary values. These indices are used to select the model parameters from predefined codebobks (which are available to both the encoder and decoder). Rather than transmitting explicit data values (requiring many data bits) it is only necessary to transmit a few bits, the indices of the needed data.

As described in earlier parts of this document, the following types of model parameters are derived on a frame by frame basis:

Global and Band voicing data;

Line Spectral Frequencies;

Gain factors;

Pitch; and

Harmonic residue.

Referring to FIGS. 25–32, message protocol diagrams show the bit packing format generated by the Protocol Packing function 494 of the speech analyzer-encoder 107 (which is alternatively referred to as simply a speech encoder 107) that is used for transmitting messages having vocoder rates 1, 2, and 3, in accordance with the preferred embodiment of the present invention.

5.11.1.2. Message Structure

Figure 25:
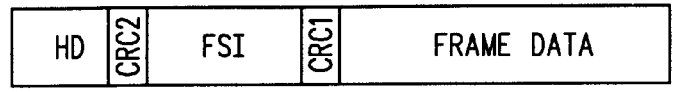
FIGS. 25–32 are protocol diagrams that show details of a message protocol that is used to transmit and receive messages that are encoded by the speech analyzer-encoder and decoded by a decoder-synthesizer, in accordance with the preferred embodiment of the present invention.

FIG. 25 shows the message protocol diagram for the complete message, which is applicable to vocoder rates 1, 2, and 3. The message comprises a Header, HD, a first Cyclic Redundancy Check code, CRC1, a Frame Status Indicators group, FSI, a second Cyclic Redundancy Check code, CRC2, and a Frame Data group, FRAME DATA.

The HD and FSI groups carry critical information to the recovery of the remainder of the message and require an error-free receipt. One of these two fields of error detection parity bits, CRC1 and CRC2, is added to HD and FSI, respectively by the Protocol Packing function 494. Both CRC1 and CRC2 are 12-bit parity codes created by a conventional generator polynomial, P(x), within the Protocol Packing function:

$$P(x)=1+x+x^2+x^3+x^{11}+x^{12}$$

5.11.1.2.1. Message Header

Figure 26:
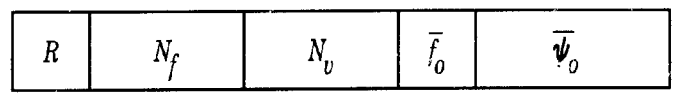

The header is shown in FIG. 26. It is applicable for vocoder rates 1, 2, and 3. The header field includes 5 parameters, each defined by a word:

R: 2 bit word, vocoder rate indicator. The mapping of R values to vocoder rates is as follows.

| R | Vocoder rate identification and speed |
|---|---|
| 01 | rate 1, approx. 700 bits per second (bps) |
| 10 | rate 2, approx. 1,100 bps |
| 11 | rate 3, approx. 1,300 bps |

$N_f$: 12 bit word, an integer value indicating the total number of frames in the current message. With the preferred frame size of the vocoder at 25 msec., $N_f$ defines a message of up to 102.375 seconds.

$N_v$: 12 bit word, an integer value indicating the total number of voiced frames in the message.

$\overline{f_0}$: 7 bit word that indicates the long term average of the fundamental frequency (pitch) of the current message. It is an index to an integer value ranging 27 to 154.

$\overline{\Psi_0}$: 25 bits, (five 5 bit words), a vector of the indices of mean values of the odd order line spectrum frequencies (LSFs) of voiced frames in the current message. The bit allocation to the indices of the five mean LSFs are as follows.

| | |
|---|---|
| $\overline{\Psi_1}$ | Bit 1 to Bit 5 |
| $\overline{\Psi_3}$ | Bit 6 to Bit 10 |
| $\overline{\Psi_5}$ | Bit 11 to Bit 15 |
| $\overline{\Psi_7}$ | Bit 16 to Bit 20 |
| $\overline{\Psi_9}$ | Bit 21 to Bit 25 |

5.11.1.2.2. Frame Status Indicator Group

Figure 27:
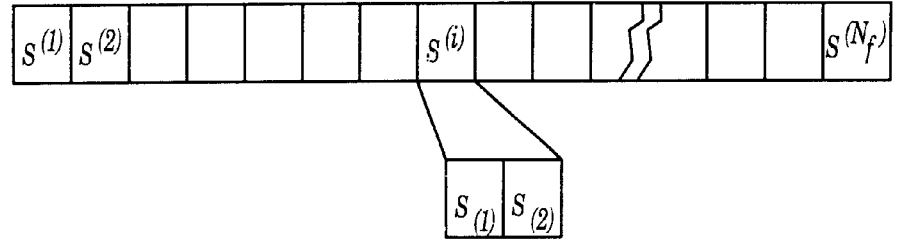
Figure 28:
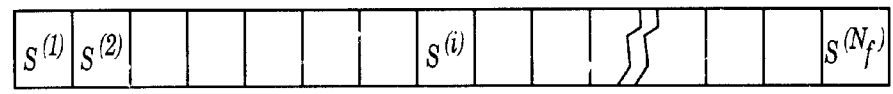

The FSI group comprises FSI fields that define the voicing status and the segmentation status (i.e., whether a frame is an anchor frame or an interpolated frame) of every frame in the current message. The length of the FSI group is dependent on the vocoder rate and $N_f$. The composition of the FSI Group is shown in FIG. 27 for vocoder rates 1 and 2, and in FIG. 28 for vocoder rate 3.

For vocoder rates 1 and 2 (FIG. 27), the FSI Group includes No Frame Status fields, each of which has a length of 2 bits. The first bit, $s_1$, of the $l^{th}$ Frame Status field, $s^{(i)}$, represents the voicing status of the $l^{th}$ frame. The second bit, $s_2$, of the $l^{th}$ Frame Status field represents the spectral interpolation status of the frame. The definition of values of $s_1$ and $s_2$ are as follows:

| $s_1$ | $s_2$ | Definition |
|---|---|---|
| 0 | 0 | Unvoiced, interpolated frame |
| 0 | 1 | Unvoiced, anchor frame |
| 1 | 0 | Voiced, interpolated frame |
| 1 | 1 | Voiced, anchor frame |

For vocoder rate 3 (FIG. 28), the FSI Group includes $N_f$ Frame Status fields, each of which has a length of 1 bit. The definition of values of the Frame Status field is as follows:

| | |
|---|---|
| $s^{(i)} = 0$ | Unvoiced |
| $s^{(i)} = 1$ | Voiced |

Figure 29:
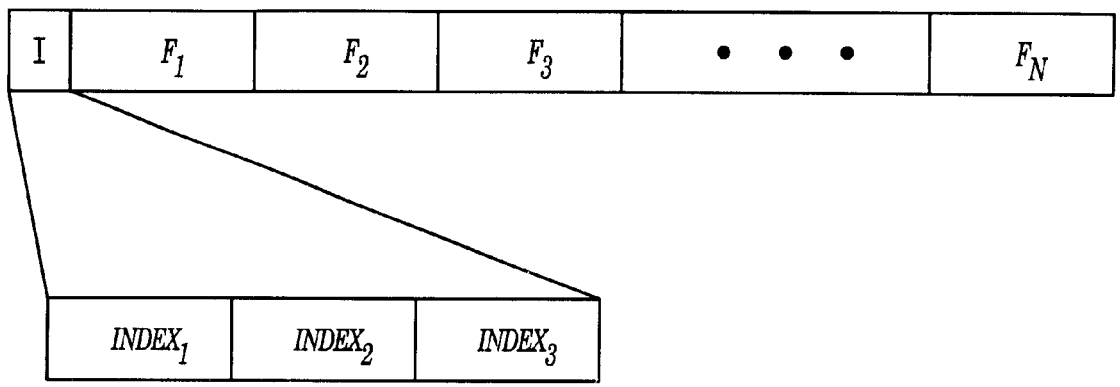

Thus, it can be appreciated that the types of indicators that are included in each Frame Status field (i.e., the quantity and definition of each of the indicators) are dependent on the vocoder rate 5.11.1.2.3. Frame Data Group An overview of the organization of the Frame Data group is shown in FIG. 29. The Frame Data group comprises fields. The first group is an Initialization field, I, that is necessarily included only in messages that are encoded at vocoder rates 1 and 2, but is included also in messages that are encoded at vocoder rate 3, for consistency in the decoding algorithm. Following the Initialization field are N Frame Data fields, which are identified as $F_1, F_2, F_3, \ldots F_N$, wherein N is the number of frames in the message, $N_f$, as indicated by information in the header.

5.11.1.2.3.1. Initialization Field

Referring again to FIG. 29, the Initialization field consists of three words of predetermined type and length. The first two words, $Index_1$ and $Index_2$, include the indices for the first quantized LSF for the first voiced frame. $Index_1$ is 12 bits long and $Index_2$ is 10 bits long. $Index_3$ includes the index of the quantized LSF for the first unvoiced frame and is 9 bits long. In the Frame Data fields, every anchor frame, except the last voiced and last unvoiced anchor frame, includes one set of LSF indices: $Index_1$ and $Index_2$ for voiced frames, or $Index_3$ for unvoiced frames. Each set of LSF indices comprises the index information that is associated with the next anchor frame of the same type (voiced or unvoiced). This arrangement uniquely allows the decoder 116 to obtain the information necessary to generate the interpolated LSF vector values that are between an anchor frame being currently decoded and the next anchor frame, using the other data in the frame being currently decoded (e.g., the gain data) that is associated with that frame, without having to alter its pointers to "look-ahead" through the Frame Data Group, which includes variable length Frame Data Fields, thereby saving processing steps that would otherwise be required to determine the LSF data in the next anchor frame. This arrangement can be uniquely characterized as one in which the Indices for both the first voiced anchor LSF vector and the first unvoiced anchor LSF vector precede any other type of model parameter information in the Frame Data group.

5.11.1.2.3.2. Frame Data Fields

Each Frame Data field comprises a set of data words. Each data word provides a value or values for one type of model parameter (i.e., Band voicing data, Line Spectral Frequencies, Gain factors, Pitch, and Harmonic residue), and the data word is defined to have a type according to the model parameter. The following list shows are the types and lengths of the data words:

| | |
|---|---|
| GAIN (Quantized Gain) | 13 bits |
| PITCH (Quantized Pitch) | 13 bits |
| BV (Quantized Band Voicing) | 2 or 3 bits |
| RES (Quantized Harmonic Residue) | 8 bits |
| $VLSF_1$, ($1^{st}$ Voiced Quantized Line Spectral Frequency) | 12 bits |
| $VLSF_2$ ($2^{nd}$ Voiced Quantized Line Spectral Frequency) | 10 bits |
| ULSF (Quantized Unvoiced Line Spectral Frequency) | 9 bits |

The type, presence, and length of the words in each set of data words depend on the vocoder rate, the value of the indicators in the Frame Status fields, and implicit counters based on the frame number, as detailed below.

5.11.1.2.3.2.1. Frame Data Field—Vocoder Rate 1 Messages

Figure 30:
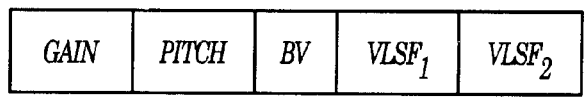
Figure 31:
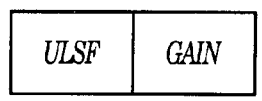

FIG. 30 shows the largest set of data words that occur in a voiced Frame Data field of a vocoder rate 1 message. FIG. 31 shows the largest set of data words that occur in a unvoiced Frame Data field of a vocoder rate 1, 2, or 3 message.

The GAIN data word includes a 4 bit index and a 9 bit index. The computation of these indices is described above in section 5.9.2, Gain Quantization. At vocoder rate 1, the GAIN data word conveys an average gain value for each of four sequential and consecutive frames, whether they are voiced or unvoiced. Accordingly, the GAIN data word is included in every fourth Frame Data field of the voiced and unvoiced types (FIGS. 30, 31).

The PITCH data word also includes a 4 bit index and a 9 bit index. The computation of these indices is described above in section 5.9.1, Pitch Quantization. The PITCH data word is computed over a block of four sequential, but not necessarily consecutive, voiced frames. Alternatively, this can be explained as computing the PITCH data word by ignoring the unvoiced frames. Accordingly, the PITCH data word is included in every fourth voiced Frame Data field (FIG. 30). For unvoiced frames, a pitch value is determined from the 7 bit word, $\overline{f_0}$ in the header, and no PITCH data word is included in unvoiced Frame Data fields (FIG. 31).

The BV data word is included as a two bit data word in all voiced frames when the vocoding rate is 1 (FIG. 30). No BV data word is included in unvoiced Frame Data fields (FIG. 31). The encoder and decoders both treat voicing band 1 as being voiced in all voiced frames, and not voiced in unvoiced frames. For vocoder rate 1 messages, the first of the two bits in the BV data word indicates whether voicing band 2 is treated as being voiced or not, and the second of the two bits indicates whether voicing bands 3 and 4 are both treated as being voiced or not.

Voiced Quantized Line Spectral Frequency data words, $VLSF_1$ and $VLSF_2$, are both included in every voiced anchor Frame Data field except the last one. An unvoiced Quantized Line Spectral Frequency data word, ULSF, is included in every unvoiced anchor Frame Data field except the last one. No Line Spectral Frequency data words are included in interpolated Frame Data fields. The Quantized Line Spectral Frequency data words in a voiced or unvoiced anchor frame indicate the values of the Quantized Line Spectral Frequency vectors associated with the next anchor frame of the respective voiced or unvoiced type. This allows for more efficient processing of the interpolated vectors in the decoder, as described above. The values of the Line Spectral Frequency vectors for interpolated frames are thereby determined from the Quantized Line Spectral Frequency data words obtained from the preceding and current anchor Frame Data fields.

5.11.1.2.3.2.2. Frame Data Field—Vocoder Rate 2 Messages

Figure 32:
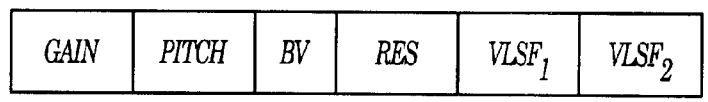

FIG. 32 shows the largest set of data words that occur in a voiced Frame Data field of a vocoder rate 2 message.

The GAIN data word is the same length as for vocoder rate 1; 13 bits. The computation of the GAIN data word is described above in section 5.9.2, Gain Quantization. The GAIN date word conveys average gain information for each half of two frames. The GAIN data word for vocoder rate 2 messages is computed over a block of two sequential and consecutive frames, whether they are voiced or unvoiced. Accordingly, the GAIN data word is included in every second Frame Data field of the voiced and unvoiced types (FIGS. 31, 32).

The PITCH data word is encoded and included in voiced Frame Data fields for vocoder rate 2 messages identically to vocoder rate 1 messages.

The BV data word is included as a three bit data word in all voiced frames when the vocoding rate is 2 (FIG. 32). No BV data word is included in unvoiced Frame Data fields (FIG. 31). The encoder and decoders both treat voicing band 1 as being voiced in all voiced frames, and treated as not being voiced in unvoiced frames. For vocoder rate 2 messages, each of the three bits in the BV data word indicates whether a respective voicing band, 2, 3, and 4, is treated as being voiced or not.

Voiced and Unvoiced Quantized Line Spectral Frequency data words, $VLSF_1$, $VLSF_2$, ULSF, are treated identically as for vocoder rate 1 messages.

The RES data word is included in every voiced Frame Date field and is not included in any unvoiced Frame Data field at vocoder rate 2.

5.11.1.2.3.2.3. Frame Data Field—Vocoder Rate 3 Messages

Vocoder rate 3 messages differ from vocoder rate 2 messages only in that there are no interpolated frames; every frame is encoded as an anchor frame. The rules for including data word types, and for the length of those data word types, based on vocoder rate, voiced/unvoiced status and on a count of the voiced or unvoiced or all frames are the same as for vocoder rate 2 messages.

5.11.1.3. Additional Description of the Preferred Embodiment and Alternative Embodiments It will be appreciated that a number of quantifiable aspects of the preferred embodiment can be altered to accommodate variations in the desired recovered speech quality, variations in the phase and frequency characteristics of the link through which the as data word bit length, differences in processing capabilities of the logic and/or processors chosen for use in the encoder and decoder, and cost of the vocoding system.

As examples, the gain and pitch parameters can be calculated over more frames or fewer frames; other model parameters can be calculated over multiple frames; model parameters other than band voicing can have quantized levels and associated bit lengths that vary depending on vocoding rate (different codebooks are used for different quantization levels); and model parameters can be included or excluded depending on not only a multiple frame count but also on an interpolation status.

The uniqueness of the present invention is more generally expressed as a method used in the speech encoder of the communication system 100 to generate an encoded message from a digitally compressed voice message having N frames, in which the analyzer-encoder 107 sets values of words of a header of the encoded message, wherein the values of the words define N and define a vocoder rate used for the encoded message; the analyzer-encoder 107 sets a state of each Frame Status Indicator in each Frame Status field of N Frame Status fields that are transmitted after the header of the encoded message; and the analyzer-encoder 107 assembles N Frame Data fields. Each of the Frame Data fields comprises a set of data words. The N Frame Data fields follow the N Frame Status fields. Each set of data words conforms to at least one of the vocoder rate and the states of the Frame Status Indicators. This statement means that the (model parameter) types of data words, the presence of data words, and the length of the data words in the set of data words is dependent on either the vocoder rate or the state of the Frame Status Indicators, or both the vocoder rate and the state of the Frame Status Indicators. A quantization level of at least one type of data word conforms to the vocoder rate. An example of this in the preferred embodiment is the BV data word. The presence of a predetermined set of data words in a particular Frame Data field is indicated by a frame number of the particular Frame Data field, wherein the frame number is modulo determined, and wherein the modulo determination has a count basis and a number base. An example of this is the GAIN data word in the preferred embodiment, for which the count basis is the count of all Frame Data fields up to and including the particular Frame Data field and the number base is a number (2 or 4) that is dependent on the vocoder rate.

Each Frame Status field comprises an interpolation indicator only when the vocoder rate is one of a predetermined set of vocoder rates. In the preferred embodiment, the predetermined set of vocoder rate(s) is vocoder rates 1 and 2. The presence of a set of data words in a particular frame is indicated by a state of the corresponding interpolation indicator, when the vocoder rate is one of the predetermined set of vocoder rate(s). As an example, this set of the data words in the preferred embodiment is least one quantized line spectral frequency word.

Alternatively, or additionally, the presence of a set of data words in a particular frame is indicated by a state of the voice/unvoiced indicator and a frame number that is modulo determined, the modulo determination having a count basis and a number base. An example of this is the PITCH data word, for which the count basis is a count of frames for which the state of the corresponding voiced/unvoiced indicator indicates voiced and the number base is 4.

It will be appreciated that the protocol structure that results from the above described encoding by the speech encoder 107 is a highly efficient protocol that encodes the highly compressed voice information that is generated by the conventional and unique methods described in prior sections of this document, while at the same time avoiding the use of unnecessary overhead synchronization information.

5.11.2. Decoding the Low Bit Rate Encoded Digital Voice Message in the Communication Receiver 5.11.2.1. Block Diagram of the Communication Receiver Referring to FIG. 33, an electrical block diagram of the communication receiver 114 that is used in the communication system 100 is shown, in accordance with the preferred embodiment of the present invention. The communication receiver 114 comprises an antenna 3301, a power switch 3308, a radio receiver circuit 3305, a radio transmitter 3330, a processor 3310, and a user interface 3321. The radio receiver circuit 3305 is a conventional receiver utilized for receiving radio signals transmitted by a radio communication system and intercepted by the antenna 3301. The power switch 3308 is a conventional switch, such as a MOS (metal oxide semiconductor) switch for independently controlling power to the radio receiver circuit 3305 and radio transmitter circuit 3330 under the direction of the processor 3310, thereby providing a battery saving function. The transmitter 3330, receiver 3305, power switch 3308, and antenna 3301 are conventional components for a two way personal communication receiver, such as the PageWriter© 2000 pager manufactured by Motorola, Inc., Schaumburg, Ill.

The processor 3310 is used for controlling operation of the communication receiver 114. Generally, its primary function is decode the demodulated signal 235 provided by the radio receiver circuit 3305 and process received messages from the decoded signal, storing them and alerting a user of each received message. When the message is an encoded low bit rate digital voice message, the processor 3310 also synthesizes the audio message for presentation by speaker 3326 (included in the user interface 3321). To perform this function, the processor 3310 comprises a DSP microprocessor 3316 coupled to a conventional memory 3318 having nonvolatile and volatile memory portions, such as a ROM (read-only memory) and RAM. One of the uses of the memory 3318 is for storing messages received from the radio communication system in the digital form in which they are received, until the message is to be presented to a user. Another use o the memory 3318 is for storing one or more selective call addresses utilized in identifying incoming personal or group messages to be processed by the communication receiver 114.

When a message has been decoded and has been determined to be for the communication receiver 114, and the message is stored in the memory 3318, the processor 3310 activates the alerting device 3322 (included in the user interface 3321) which generates a tactile and/or audible alert signal to the user. The user interface 3321, which further includes, for example, a conventional LCD display 3324 and conventional user controls 3320, is utilized by the user for processing the received messages. This interface provides options such as reading, deleting, locking, and audio presentation of messages.

The decoder-synthesizer 116 is implemented by a decoder-synthesizer portion 3319 of the memory, by the DSP microprocessor 3316, and by associated conventional peripheral circuits (not shown in FIG. 33), such as input-output buffers. The decoder-synthesizer portion 3319 of the memory comprises a set of unique non-volatile program instructions and tables and volatile storage locations that are used in combination to control the DSP microprocessor 3316 to perform the functions of the speech decoder-synthesizer 116 (also called the speech decoder 116). It will be appreciated that the tables in the decoder portion of the memory 3319 include tables needed to reconvert the quantized speech model parameters back into vectors that can be used to synthesize a replication of the voice message. It will be further appreciated that the DSP microprocessor 3316 could replaced by a standard multi-purpose processor having appropriate peripheral circuits, and that each step, function, or process described herein with reference to speech decoder-synthesizer 116 can alternatively be described as a combination of at least a microprocessor and a memory, wherein the microprocessor is coupled to the memory and is controlled by programming instructions in the memory to perform the step, function, or process.

It will be appreciated that the communication receiver 114 that has been described in this section 5.11.2.1, Block Diagram of the Communication Receiver, is representative of a class of one and two-way communication receiving products that could be designed to decode the low bit rate digitized voice messages in the manner described in sections 5.10.2, Non-Speech Activity Reduction and this section 5.11.2 Receiving the Digitally Compressed Message, and that the transmitter 3330 is not required except for the unique method of message transfer described in section 5.11.3, Message Transfer. Thus a one way receive only pager having an appropriate processor and sufficient processing power could be used to receive, decode, and synthesize a vocoder rate 1, 2 or 3 message.

5.11.2.2. Decoding the Low Bit Rate Digital Voice Message

Figure 34:
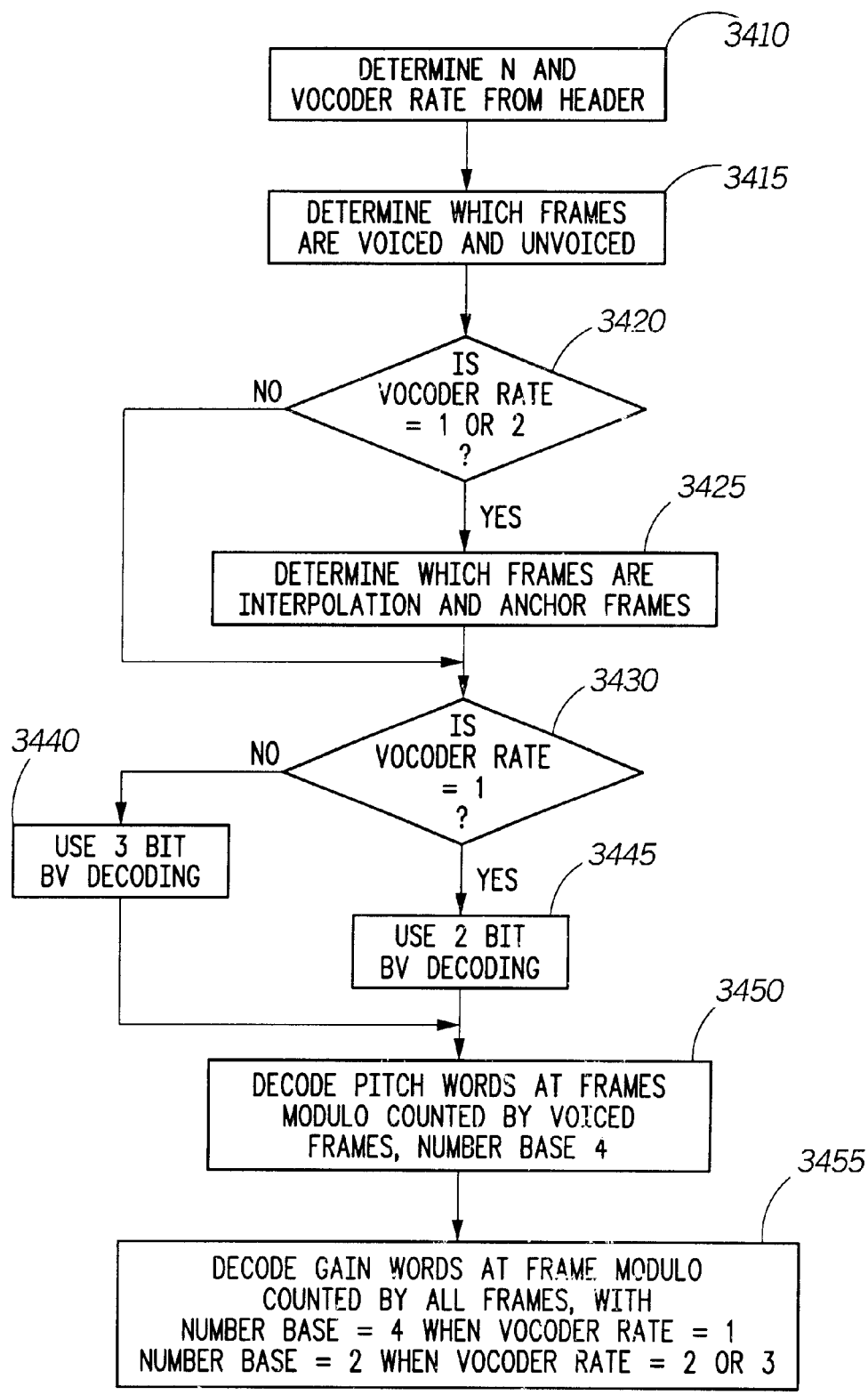
FIG. 34 is a flow chart that shows details of a Decoder function of the communication receiver, in accordance with the preferred embodiment of the present invention.

Referring to FIG. 34, a flow chart shows details of a Decoder function of the communication receiver 114, in accordance with the preferred embodiment of the present invention. When the communication receiver 114 intercepts a signal that includes a digital message and the processor 3310 has determined by a conventional process from an address portion (not described in detail herein) of the message that the message is intended for processing by the communication receiver, the processor 3310 determines from the header of the message at step 3410 the vocoder rate of the message, the number of frames in the message, N, the number of voiced frames in the message, the fundamental pitch of the message, and the quantized mean values of the odd order line spectral frequencies of the voiced frames of the message. The processor 114 then processes the Field Status Indicator Group and then performs the decoding of the Frame Data Group. One of ordinary skill in the art will understand from the above description of the encoding, with reference to FIGS. 1–32, but especially FIGS. 25–32, how to decode the message, which because of the unique nature of the message, is accomplished by:

1) Decoding values of words of a header of the encoded message, wherein the values of the words define a quantity of frames in the voice message, N, and define a vocoder rate used for the encoded message.

2) Decoding a state of each indicator of a set of indicators in each Frame Status field of N Frame Status fields that are received after the header of the encoded message.

3) Decoding N Frame Data fields, wherein each of the Frame Data fields comprises a set of data words, and wherein the N Frame Data fields follow the N Frame Status fields, and wherein types of data words in each set of data words conform to at least one of the vocoder rate and the states of the indicators. The meaning of "types of data words in each set of data words conform to at least one of the vocoder rate and the states of the indicators" is the same as described above in section 5.11.1.3, Additional Description of the Preferred Embodiment and Alternative Embodiments.

Further functions and details of the decoding process follow.

The words and the data words each have one of a set of predetermined lengths. The decoder 116 determines the types of indicators included in each frame status field from the vocoder rate at step 3420. A quantization level of at least one type of data word is determined by the vocoder rate at step 3430 for proper decoding of the associated type(s) of word(s) (Band Voicing words in accordance with the preferred embodiment of the present invention).

The presence of a predetermined subset of data words (Gain and Pitch words in accordance with the preferred embodiment of the present invention) in a particular frame data field is determined by a frame number of the particular frame data field, wherein the frame number is modulo determined, and wherein the modulo determination has a count basis and a number base, at steps 3450 and 3455. An interpolation indicator in each frame status field is used at step 3425 to determine an interpolation status of each frame only when the vocoder rate is determined at step 3420 to be one of a predetermined set of vocoder rates.

5 5.11.3. Transfer of the Encoded Message to the Communication Receiver

When a speech message is to be transferred to a communication receiver 114 of a messaging system, its transmission is commanded by the paging terminal 106 in response to a command of the Encoded Message Transfer function 495 in a first transmission of the low bit rate digital voice message that has been vocoded at vocoder rate 1, rate 2, or rate 3. The vocoder rates support the decoding and synthesis of a speech message having a quality that corresponds to the vocoder rate. The vocoder rates are designed to generate a speech message that is interpretable at all the rates, but for which the interpretation of lower rate messages is more difficult under adverse conditions, such as 1) ambient noise or sounds that accompany the voice message that is analyzed and encoded, 2) errors induced in the encoded digital voice message during transmission, and 3) ambient noise or sounds that occur simultaneously with the presentation of the decoded, synthesized voice message. The vocoder rate for the first transmission is preferably chosen by rules that use vocoder rate 1 as the default rate. Vocoder rate 2 or vocoder rate 3 is chosen for the first transmission only when a sufficiently low traffic rate exists on the transmission channel or conditions exist that predict a low probability of success for message sent using vocoder rate 1, such as a probable location of the communication receiver 114 that has high RF path losses, or a probable location of the communication receiver 114 in a audibly noisy environment, or 3) in low traffic conditions. Some of these situations can call for the use of vocoder rate 2 on the first transmission, while others call for the use of vocoder rate 3 on the first transmission. When the vocoder rate for the first transmission has been determined, the message is encoded at the determined vocoder rate and transmitted. The encoding is performed as described above in section 5.11.1, Protocol Packing, except that the header also includes a message identification number (message ID) of a conventional type (not shown in FIGS. 25–26). When errors are received in the header of the encoded message by the communication receiver 114, the communication receiver 114 returns a "non-acknowledgement" message or, when the communication receiver 114 cannot determine that the message is intended for itself, the communication receiver 114 fails to acknowledge the message at all, In either of these two circumstances, the paging terminal 106 retransmits the same message with the same message ID, encoded at the same vocoder rate, in a manner typical of a retransmission system. For purposes of this description, this type of message retransmission is called a NACK retransmission. If the message is not received after several attempts, the system controller aborts further transmissions, and awaits another event (such as a long time delay or receipt of a message from the communication receiver 114) before trying to send the same message gain, in a conventional manner.

5.11.3.1. Encoder Message Transfer function of the Paging Terminal

If the message header is successfully decoded by the communication receiver 114, then the communication receiver 114 acknowledges, decodes and synthesizes the message, using interpolation for synthesizing vocoder rate 1 and 2 messages to determine the values of LSFs between anchor frames, and determining band voicing, harmonic residues, gain values, and pitch values (as appropriate and available) by information sent in the encoded message. Such an acknowledged message is called an ACK'D message for purposes of this description. The vocoder rate of the received message is preferably presented to a user of the communication receiver 114 by the communication receiver 114 so that if, when the synthesized speech message is presented to the user, the user can request an upgrade of his received message. In accordance with the preferred embodiment of the present invention, the user is able to explicitly request a vocoder rate 2 or a vocoder rate 3 upgrade of his message. For purposes of this discussion, the explicitly requested vocoder rate is called the requested rate. Using a unique technique described herein below, an incremental message is encoded and transmitted by the paging terminal 106. The header of the incremental message identifies the message ID of the message being upgraded. When the incremental message is successfully decoded by the communication receiver 114 and used to generate a synthesized message at a higher vocoder rate (e.g., vocoder rate 2), there remains a possibility that the user of the communication receiver 114 may desire the receipt and synthesis of the message using yet a higher rate (i.e., vocoder rate 3). For purposes of this description, the vocoder rate provided by the most recently ACKED message (either a first transmission or an incremental message used in conjunction with earlier messages of the same message ID) is called the sent rate.

Figure 35:
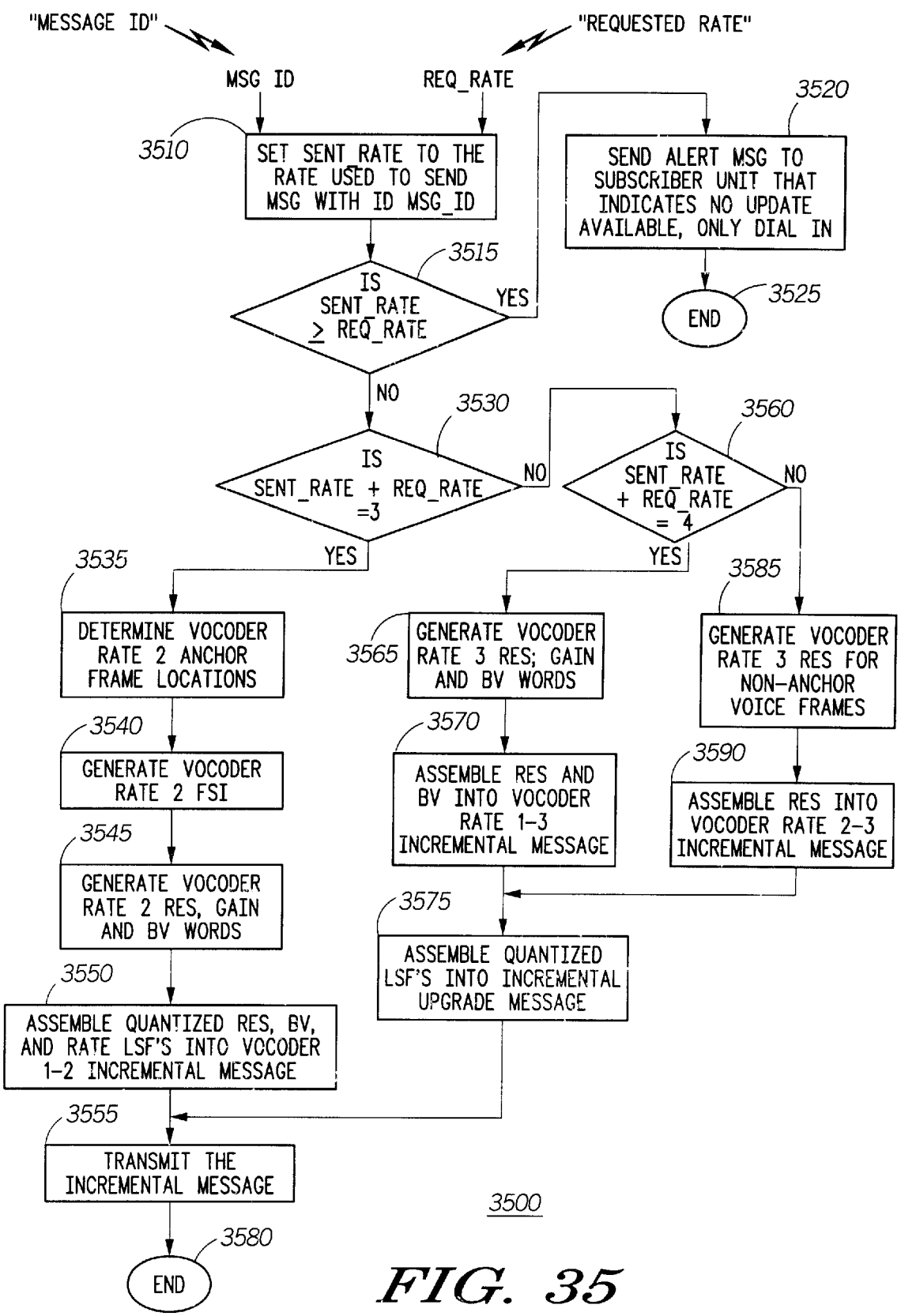
FIG. 35 is a flow chart that shows details of an Encoder Message Transfer function of the speech analyzer-encoder, in accordance with the preferred embodiment of the present invention

Referring to FIG. 35, a flow chart of the Encoder Transfer Message function 3500 is shown, in accordance with the preferred embodiment of the present invention. When the paging terminal 106 receives the requested rate for a particular message ID, a temporary value REQ_RATE is set to the requested rate and SENT_RATE is set to the sent rate for the particular message, at step 3510. When a determination is made at step 3515 that SENT_RATE is greater than or equal to REQ_RATE, the paging terminal 106 sends an alert message to the communication receiver 114 at step 3520 that indicates that no upgrade is available except for the user to use another telecommunication mode (such as dialing into the communication system and hearing the original or synthesized message over wireline), and the function ends at step 3525. When the determination at step 3515 is that SENT_RATE is less than REQ_RATE, then a determination is made at step 3530 whether SENT_RATE+ REQ_RATE equals 3. When SENT_RATE+REQ_RATE equals 3, it will be appreciated that the vocoder rate of the first (and sent) message was 1 and that the requested rate is 2.

At step 3535, locations of anchor frames and quantized values of interpolated speech parameter vectors for the message are determined for a vocoder rate 2 encoding, using techniques described above in section 5.7, Dynamic Segmentation. Alternatively, the locations and interpolated vectors for a vocoder rate 2 message can be generated and stored during the Protocol Packing function, and retrieved at step 3535. A Frame Status Indicator (FSI) group is generated at step 3540 for a header of a vocoder rate 2 incremental message, using the format described above in section 5.11.1, Protocol Packing, with reference to FIGS. 25 and 27. Alternatively, the FSI group for a vocoder rate 2 message can be generated and stored during the Protocol Packing function, and retrieved at step 3540. Then harmonic residue (RES) words for a vocoder rate 2 message, and three bit band voicing (BV) words are generated for every voiced frame of the message, and GAIN words for a vocoder rate 2 or 3 message are generated, at step 3545. Alternatively, the RES, BV, and GAIN words can be generated and stored during the Protocol Packing function, and retrieved at step 3545. The RES and BV words are packed in sequential pairs at step 3550, into a Frame Data group of the vocoder rate 2 incremental message. Each GAIN word is included with the RES and BV words for an appropriate corresponding frame (the GAIN words are not in every frame) The quantized LSFs for any of the vocoder rate 2 anchor frames that are not also vocoder rate 1 anchor frames are retrieved from storage and assembled into the Frame Data group of the vocoder rate 2 incremental message at step 3550, at the locations of the RES and BV words for corresponding frames. The format of the Frame Data group is as described above in section 5.11.1, Protocol Packing, with reference to FIGS. 25, 29, and 32, except that no Initialization field is required because the communication receiver 114 retains that information from the earlier vocoder rate 1 message, and Gain and Pitch words are not sent. Also, the message identification (ID) .number is included in the header. It will be appreciated that the communication receiver 114 is able to use the FSI group from the earlier received vocoder rate 1 message and the FSI group of the vocoder rate 2 incremental message to identify the anchor frames for the vocoder rate 2 message that are not also anchor frames for the vocoder rate 1 message, and to identify the voiced frames, so as to be able to properly identify the quantized LSF, RES, and BV words. At step 3555, the assembled vocoder rate 1-2 incremental message is transmitted to the communication receiver 114, and the Encoder Message Transfer function 495 ends at step 3580. It will be appreciated that the vocoder rate 1-2 incremental message is typically very much shorter than the completely encoded vocoder rate 2 message for the same speech message, and allows the communication receiver 114 to synthesize the speech message at vocoder rate 2 without the communication system having had to transmit a rate 2 message. It will be further appreciated that, while not necessary because the requesting communication receiver can retain the requested upgraded quality level, an increment identifier can be added to the message. When at step 3530, SENT_RATE+REQ_RATE is not 3, it will be appreciated that the requested rate is 3. When SENT_RATE +REQ_RATE is determined to be 4 at step 3560, then the sent rate is 1. (When SENT_RATE +REQ_RATE is determined not to be 4 at step 3560, then the sent rate is 2.) When SENT_RATE +REQ_RATE is determined to be 4, the RES words for a vocoder rate 2 message and three bit BV words are generated for every voiced frame of the message, and GAIN words for a vocoder rate 2 or 3 message are generated, at step 3565, and packed in sequential pairs at step 3570 into a Frame Data group of a vocoder rate 1-3 incremental message. Alternatively, the RES, BV, and GAIN words can be generated and stored during the Protocol Packing function, and retrieved at step 3570. Each GAIN word is included with the RES and BV words for an appropriate corresponding frame (the GAIN words are not in every frame) After step 3570 the quantized LSFs for every vocoder rate 1 non-anchor frame are retrieved and assembled into the Frame Data group of the vocoder rate 1-3 incremental message at step 3575. Each quantized LSF is assembled at the corresponding frame location of the RES and BV words that are assembled at step 3570. The format of the Frame Data group is as described above in section 5.11.1, Protocol Packing, with reference to FIGS. 25, 29, and 32, except that no Initialization field is required because the communication receiver 114 retains that information from the earlier vocoder rate 1 message, and no Gain and Pitch words are sent (also, no RES and BV words are sent when the sent message was a vocoder rate 2 message). Also, no FSI group is sent in a vocoder rate 3 incremental message, because the communication receiver 114 is able to use the FSI group from the earlier received vocoder rate 1 or vocoder rate 2 message to identify the voiced frames. Also, the message identification (ID) number is included in the header. The locations of all anchor and non-anchor frames in the vocoder rate 1-3 message are determined by the communication receiver 114 from the locations of anchor frames that were determined from prior sent messages. At step 3555, the assembled incremental message is transmitted to the communication receiver 114, and the Encoder Message Transfer function 495 ends at step 3580. It will be appreciated that the vocoder rate 1-3 incremental message is typically very much shorter than a completely encoded vocoder rate 3 message for the same speech message, and allows the communication receiver 114 to synthesize the speech message at vocoder rate 3 without the communication system having had to transmit a complete vocoder rate 3 message.

When SENT_RATE+REQ_RATE is determined not to be 4 at step 3560, then the requested rate is 3 and the sent rate is 2. The RES words are generated for every non-anchor voiced frame of the rate 2 vocoder message, at step 3585, and packed at step 3590 into a Frame Data group of a vocoder rate 2-3 incremental message. Alternatively, the RES words for the non-anchor frames of a vocoder rate 3 message can be generated and stored during the Protocol Packing function, and retrieved at step 3585. It will be appreciated that a RES word for a quantized, interpolated, non-anchor frame is typically different than that of the corresponding uninterpolated, quantized LSF vector. After step 3590, the quantized LSF vectors for every vocoder rate 2 non-anchor frame are retrieved and assembled into the Frame Data group of the vocoder rate 1-3 incremental message at step 3575. Each quantized LSF vector is assembled at the corresponding frame location of the RES words that are assembled at step 3590. The format of the Frame Data group is as described above in section 5.11.1, Protocol Packing, with reference to FIGS. 25, 29, and 32, except that no Initialization field is required because the communication receiver 114 retains that information from the earlier vocoder rate 2 message, and no Gain and Pitch words are sent. Also, no FSI group is sent in a vocoder rate 2-3 incremental message, because the communication receiver 114 is able to use the FSI group from the earlier received or reconstructed vocoder rate 2 message to identify the voiced frames. Also, the message identification (ID) number is included in the header. The locations of all anchor and non-anchor frames in the vocoder rate 2-3 message are determined by the communication receiver 114 from the locations of anchor frames that were determined from prior sent messages. At step 3555, the assembled incremental message is transmitted to the communication receiver 114, and the Encoder Message Transfer function 495 ends at step 3580. It will be appreciated that the vocoder rate 2-3 incremental message is typically very much shorter than a completely encoded vocoder rate 3 message for the same speech message, and allows the communication receiver 114 to synthesize the speech message at vocoder rate 3 without the communication system having had to transmit a complete vocoder rate 3 message.

It will be further appreciated that, while not necessary because the requesting communication receiver 114 can retain the requested upgraded quality level and knows the level from which it is upgrading, an increment identifier can be added to the message.

It will be appreciated that the preferred embodiment of the present invention is a specific example of a method for transferring low bit rate digital voice messages using incremental messages that can be described by the following steps:

1) Generating from an analog voice signal representing the voice message a series of digital samples organized as frames;

2) Generating from the series of digital samples a set of speech model parameters including quantized speech model parameters for each frame (e.g., at least one of quantized Line Spectral Frequencies, Harmonic Residue, gain, pitch, and band voicing parameters), and including or not including un-quantized speech model parameters (e.g., none or one or more of LPCs or unquantized LSFs, Harmonic Residue, gain, pitch, or band voicing parameters), the set encoding the voice signal at a first voice quality (e.g., that achieved by vocoder rate 3).

3) Generating a first derived set of speech model parameters (e.g., vocoder rate 1 parameters) from the set of speech model parameters, the first derived set encoding the voice signal at a second voice quality (e.g., that achieved by vocoder rate 1) that is less than the first voice quality, wherein the first derived set is derived from a first subset of the set of speech model parameters (e.g., vocoder rate 1 interpolated LSFs are derived from the quantized LSFs; the subset does not include harmonic residues).

4) Transmitting a compressed message comprising the first derived set of speech model parameters and a message identifier.

5) Generating a second derived set of speech model parameters (e.g., the parameters for a vocoder rate 1-2 incremental message) that can be used with the first derived set to generate a third voice quality (e.g., the voice quality that is associated with a vocoder rate 2 message) that is higher than the second voice quality, wherein the second derived set is substantially derived from speech model parameters in the set of speech model parameters that were not used to generate the first derived set (e.g., harmonic residues, three bit band voicing, and vocoder rate 2 anchor LSFs).

6) Transmitting an incremental message (e.g., the vocoder rate 1-2 incremental message) comprising the second derived set and including the message identifier.

It will also be appreciated that the preferred embodiment of the present invention can alternatively be described by the following steps:

1) Generating from an analog voice signal representing the voice message a series of digital samples organized as frames.

2) Generating from the series of digital samples a first set of speech model parameters including quantized model speech parameters for each frame, the first set encoding the voice signal at a first voice quality (e.g., the voice quality that is associated with a vocoder rate 1 message) and a first vocoder rate (e.g., at vocoder rate 1).

3) Transmitting the low bit rate digital voice message comprising the set of speech model parameters.

4) Generating a second set of speech model parameters from the series of digital samples, that can be used with the first set to synthesize a second voice quality (e.g., the voice quality that is associated with a vocoder rate 3 message) that is higher than the first voice quality, wherein the second set can be transmitted at a rate substantially lower than a vocoder rate (e.g., vocoder rate 3) of a single encoded message for the second voice quality; and 5) Transmitting an incremental message comprising the second set.

In an alternative embodiment of the present invention, the harmonic residue vectors are generated for vocoder rate 3 using a first quantization level as described above in section 5.8, Harmonic Residue Quantization (256 values, 8 bit indices), and using a second quantization for vocoding rate 2 (e.g., 32 values, 5 bit indices). The indices for the first and second quantization level are for a common table of quantized values, and the indices for the second quantization level are a subset of the indices for the first quantization level, the subset being those indices of the first quantization having a value of zero in a predetermined number of their least significant bits. When an incremental message to upgrade from vocoder rate 2 to vocoder rate 3 is generated, a difference value for each harmonic residue is determined by the difference between the vocoder rate 3 index (quantized harmonic residue) and the vocoder rate 2 index (quantized harmonic residue) determined for each harmonic residue, with the difference being clamped to a predetermined maximum. It will be appreciated that most such difference values will be within a range given by the difference in significant length of the first and second indices (e.g., 3 bits in this example). The index difference value for each harmonic residue is then sent. (e.g., using 3 bits), instead of sending the actual vocoder rate 3 quantized harmonic residue (e.g., 8 bits in this example). This alternative embodiment of the present invention can be generalized as follows:

1) Generating a set of speech model parameters for each frame, each set including a vector parameter of a first type (e.g., harmonic residue).

2) Quantizing the vector parameter of the first type in each frame by determining a first index of first quantization level (e.g., 8 bits) that indicates a table vector that is closest in value to the vector parameter of the first type in each frame. The first derived set of speech model parameters (described above with reference to step 3, "Generating a first derived set of speech model parameters . . . ") includes vector parameters of the first type determined by a second index having a second quantization level that is less than the first quantization level.

One aspect of the preferred embodiment of the present invention can be expressed as one in which the first derived set comprises a subsequence of vector parameters of a first type (e.g., the subsequence of quantized VLSFs associated with anchor frames) selected from a sequence of vector parameters of the first type (i.e., in this example, quantized VLSFs) that are from the set of quantized speech model parameters, wherein the sequence of vector parameters of the first type comprises one vector parameter of the first type from each frame (e.g., all quantized LSFs), and wherein the preferred embodiment shows one way that the selection (of LSFs associated with anchor frames) can be performed; i.e., by dynamic segmentation.

5.11.4. Decoder Message Transfer Function of the Communication Receiver

Figure 33:
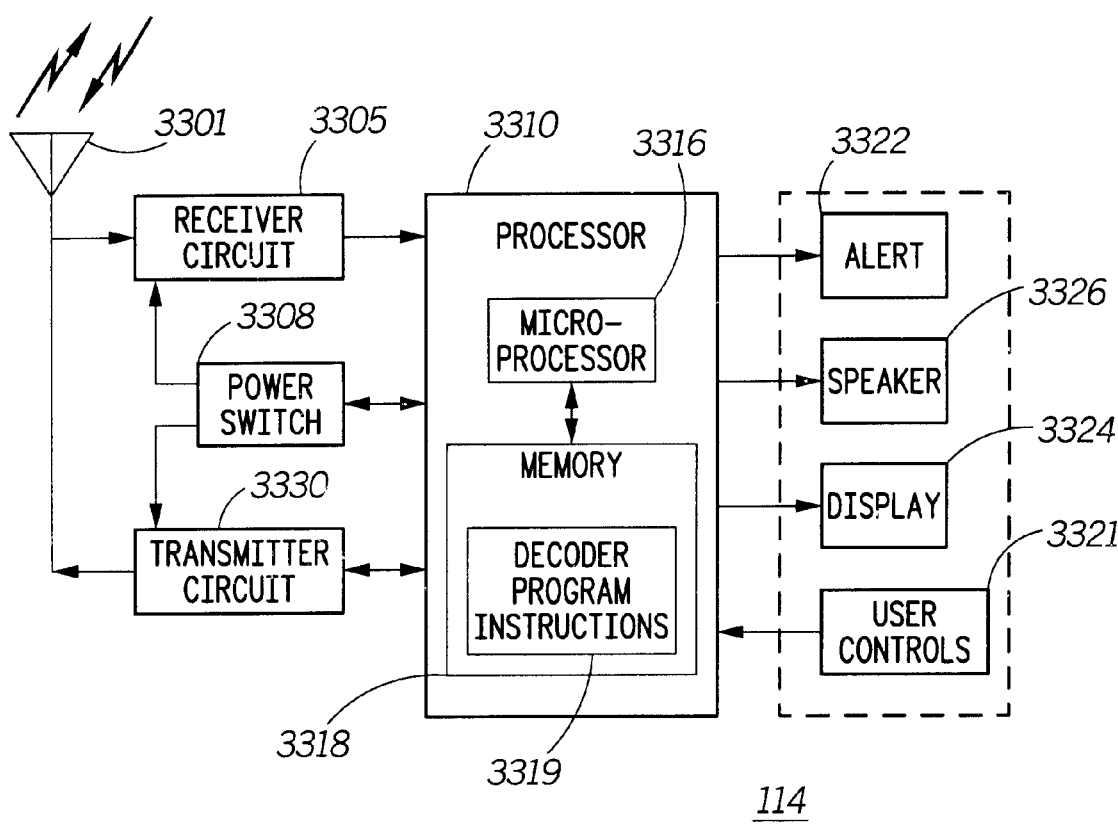
FIG. 33 is an electrical block diagram of a communication receiver that is used in the communication system, in accordance with the preferred embodiment of the present invention.
Figure 36:
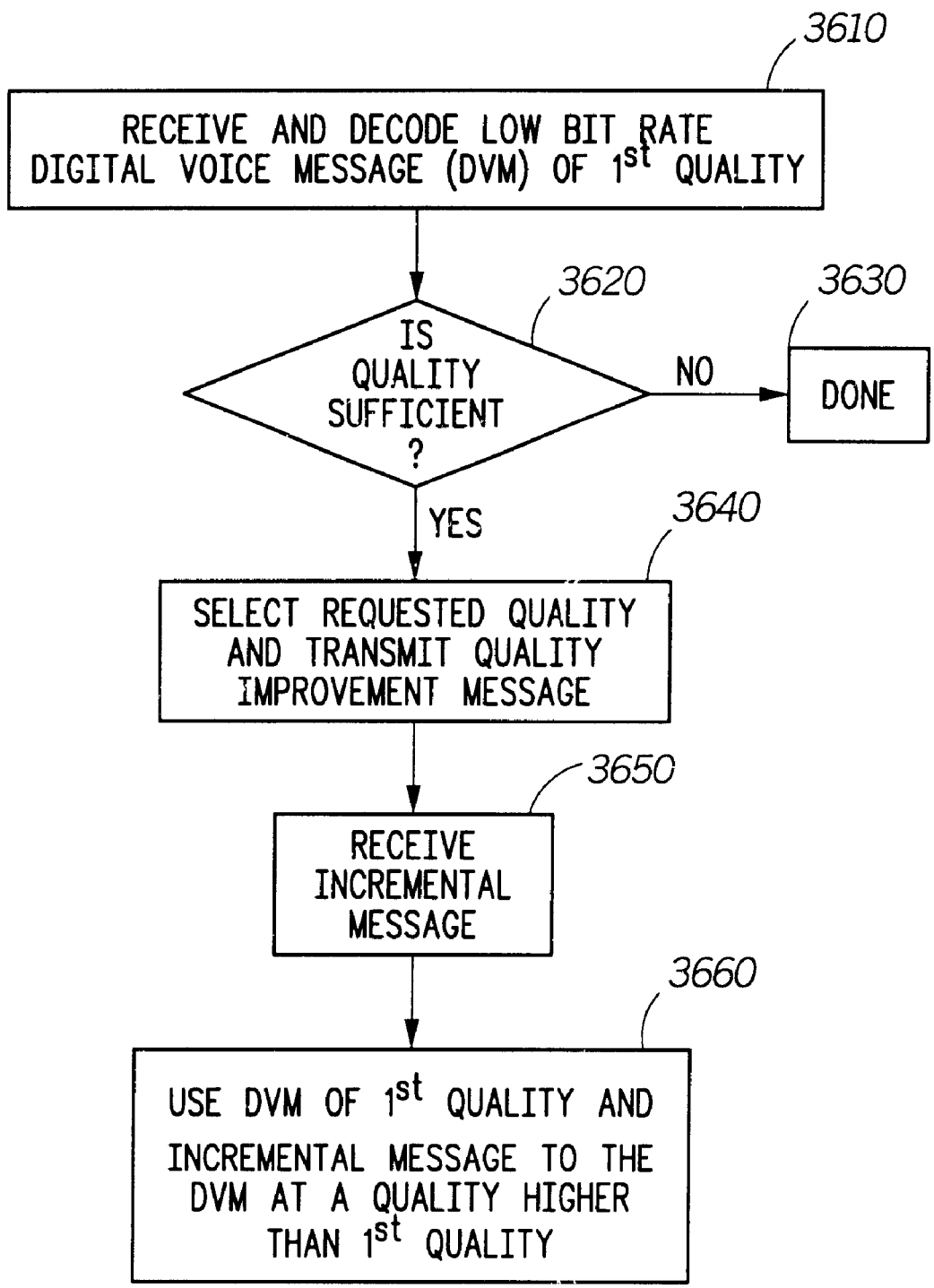
FIG. 36 is a flow chart that shows details of a Decoder Message Transfer function of the communication receiver.

The communication receiver 214 must be a two-way communication receiver, i.e., one that includes a transmitter, to perform the Decoder Message Transfer function described herein. The communication receiver described with reference to FIG. 33 is the preferred embodiment of the required two-way communication receiver, but other types could be adapted for the present invention. The processor 3310 of the communication receiver 214 performs the following steps that are unique to the Decoder Message Transfer function 3600, which are shown in FIG. 36, in accordance with the preferred embodiment of the present invention:

1) Receive and decode at step 3610 a low bit rate digital message comprising a first set of derived speech model parameters that encode the voice message at a first voice quality and a message ID.

2) Transmit a quality improvement request including the message ID at step 3640 when a determination is made by the user at step 3630 from the decoded message that a higher quality message is desired.

3) Receive an incremental message including the message ID at step 3650 comprising a second set of derived model parameters.

4) Decode the voice signal at a voice quality that is higher than the first voice quality by using the first and second derived sets of speech model parameters.

Thus, it can be seen that this unique technique of generating incremental messages allows a speech message to be encoded and sent at a low vocoder rate providing a first voice quality, and then, when a higher quality voice message is desired, an incremental upgrade message can be transmitted to achieve the higher quality voice message without having to transmit a lengthy compressed message that completely encodes the speech message in the manner providing the higher quality voice message that does not use incremental upgrading messages.

What is claimed is:

1. A system controller comprises a speech encoder that dynamically segments frames of a low bit rate digital voice message, wherein speech model parameters have been generated in a sequence of frames, the speech model parameters including quantized speech spectral parameter vectors; and wherein the speech encoder comprises a central processor coupled to a memory that controls the central processor to:

a) select a first quantized speech spectral parameter vector as a current anchor vector;

b) select a second quantized speech spectral parameter vector located a predetermined number of frames (LMAX) from the current anchor vector as a target speech parameter vector; and c) perturb the target speech parameter vector to derive a plurality (K) of perturbed speech parameter vectors.

2. A method used in a speech encoder for dynamically segmenting frames of a low bit rate digital voice message, wherein speech model parameters have been generated in a sequence of frames, the speech model parameters including quantized speech spectral parameter vectors, said method comprising the steps of:

a) selecting a first quantized speech spectral parameter vector as a current anchor vector;

b) selecting a second quantized speech spectral parameter vector located a predetermined number of frames (LMAX) from the current anchor vector as a target speech parameter vector; and c) perturbing the target speech parameter vector to derive a plurality (K) of perturbed speech parameter vectors.

3. The method according to claim 2, further comprising the steps of:

d) quantizing each of the plurality (K) of perturbed speech parameter vectors;

e) interpolating between the current anchor vector and each of the plurality (K) of quantized perturbed speech parameter vectors to derive a plurality (K) of sets of interpolated speech parameter vectors;

f) comparing each set of the plurality (K) of sets of interpolated speech parameter vectors to corresponding sampled speech parameter vectors to derive a plurality (K) of distances;

g) testing the plurality (K) of distances against a predetermined distance, and h) selecting one of the plurality (K) of quantized perturbed speech parameter vectors as a best perturbed speech parameter vector when at least one of the plurality of distances is less than the predetermined distance.

4. The method according to claim 3, wherein each set of the plurality (K) of sets of interpolated speech parameter vector includes the current anchor vector and one of the plurality (K) of quantized perturbed speech parameter vectors.

5. The method according to claim 3, wherein the best perturbed speech parameter vector is used as the current anchor vector for a next iteration of steps c) through h).

6. The method for providing a low bit rate speech transmission according to claim 3, wherein the predetermined number of frames, LMAX, is 8.

7. The method according to claim 3, further comprising:

i) selecting as the target speech parameter vector a second quantized speech parameter vector located a predetermined number of frames (A) nearer to the current anchor vector when none of the plurality (K) of distances is less than the predetermined distance;

j) repeating steps c) through h);

k) selecting one of the plurality (K) of quantized perturbed speech parameter vectors as a best perturbed speech parameter vector when at least one of the plurality (K) of distances is less than the predetermined distance; and l) repeating steps i) through l) when none of the plurality (K) of distances is less than the predetermined distance.

8. The method according to claim 7, wherein the predetermined criteria is that none of the plurality (K) of distances is less than the predetermined distance.

9. A method used in a speech encoder for dynamically segmenting frames of a low bit rate digital voice message, wherein speech model parameters have been generated in a sequence of frames, the speech model parameters including quantized speech spectral parameter vectors, said method comprising the steps of:

a) selecting a first quantized speech spectral parameter vector as a current anchor vector;

b) selecting a second quantized speech spectral parameter vector located a predetermined number of frames (LMAX) from the current anchor vector as a target speech parameter vector;

c) perturbing the target speech parameter vector to derive a plurality, K, of perturbed speech parameter vectors;

d) quantizing each of the K perturbed speech parameter vectors;

e) interpolating between the current anchor vector and each of the plurality (K) of quantized perturbed speech parameter vectors to derive K sets of interpolated speech parameter vectors;

f) comparing each set of the K sets of interpolated speech parameter vectors to corresponding sampled speech parameter vectors to derive K distances;

g) testing the K distances against a predetermined distance, and h) selecting one of K quantized perturbed speech parameter vectors from a previous frame as a best perturbed speech parameter vector when none of the plurality of distances is less than the predetermined distance.

10. The method according to claim 9 wherein the predetermined number of frames, LMAX, is 8.

11. The method according to claim 9, further comprising:

i) selecting a second quantized speech parameter vector located one frame farther from the current anchor vector as the target speech parameter vector when at least one of K distances is less than the predetermined distance;

j) repeating steps c) through h);

k) selecting one of a plurality of quantized perturbed speech parameter vectors from a previous frame as a best perturbed speech parameter vector when none of the K distances is less than the predetermined distance; and l) repeating steps i) through l) when at least one of the K distances is less than the predetermined distance.

12. A method used in a speech encoder for dynamically segmenting frames of a low bit rate digital voice message, wherein speech model parameters have been generated in a sequence of frames, the speech model parameters including quantized speech spectral parameter vectors, said method comprising the steps of:

a) selecting from quantized speech parameter vectors a current anchor vector, a candidate speech parameter vector, and a terminal anchor vector;

b) selecting a subset of M quantized speech parameter vectors about and including the candidate vector; and c) perturbing each selected quantized speech parameter vector of the subset of M quantized speech parameter vectors to generate K*M perturbed speech parameter vectors.

13. The method according to claim 12, further comprising the steps of:

d) quantizing each of the K*M of perturbed speech parameter vectors;

e) interpolating between the current anchor frame and each of the plurality (K*M) of quantized perturbed speech parameter vectors to derive a related one of K*M sets of preceding interpolated vectors;

f) interpolating between each of the K*M of quantized perturbed speech parameter vectors and the terminal anchor vector to derive a related one of K*M sets of succeeding interpolated vectors;

g) comparing each vector in the K*M sets of preceding and K*M sets of succeeding interpolated vectors to corresponding sampled speech parameter vectors to derive K*M two directional distances; and h) selecting as a next anchor vector a perturbed speech parameter vector of the K*M perturbed speech parameter vectors having a lowest distance of the K*M two directional distances.

14. The method according to claim 13, wherein the step g) of comparing comprises the steps of:

i) generating one of K*M preceding distances for each selected quantized perturbed speech parameter vector by comparing each selected quantized perturbed speech parameter vector and a related one of the preceding interpolated vectors to corresponding sample speech parameter vectors;

j) generating one of K*M succeeding distances for each selected quantized perturbed speech parameter vector by comparing each selected quantized perturbed speech parameter vector and a related one of the succeeding interpolated vectors to corresponding sample speech parameter vectors;

k) summing pairs of the K*M preceding and succeeding distances for which a preceding and succeeding distance correspond to a common one of the K*M perturbed speech parameter vectors to derive the K*M two directional distances.

15. The method according to claim 14, wherein in the step i) of generating, a preceding distance for each selected quantized perturbed speech parameter vector is generated by including a comparison of the current anchor vector to a corresponding sample speech parameter vector, and wherein in the step j) of generating, a succeeding distance for each selected quantized perturbed speech parameter vector is generated by including a comparison of the terminal anchor vector to a corresponding sample speech parameter vector.

16. The method according to claim 13, wherein in the step g) of comparing, each of the K*M two directional distances is generated by the step of:

i) deriving each of the K*M two directional distances by comparing each selected quantized perturbed speech parameter vector and a related one of the preceding interpolated vectors and a related one of the succeeding interpolated vectors to corresponding sample speech parameter vectors.

17. The method according to claim 16, wherein in the step i) of deriving, a two directional distance for each selected quantized perturbed speech parameter vector is generated by including a comparison of the current anchor vector and the terminal anchor vector to corresponding sample speech parameter vectors.

* * * * *